United States Patent [19]
Rao

[11] Patent Number: 5,121,478
[45] Date of Patent: Jun. 9, 1992

[54] WINDOW SYSTEM WITH INDEPENDENTLY REPLACEABLE WINDOW FUNCTIONALITY

[75] Inventor: Ramana B. Rao, Palo Alto, Calif.
[73] Assignee: Xerox Corporation, Stamford, Conn.
[21] Appl. No.: 614,957
[22] Filed: Nov. 15, 1990

Related U.S. Application Data

[63] Continuation of Ser. No. 242,087, Sep. 8, 1988, abandoned.
[51] Int. Cl.$^5$ ............................................. G06F 15/20
[52] U.S. Cl. ........................................................ 395/157
[58] Field of Search ......... 364/518, 521, 900 MS File

[56] References Cited

U.S. PATENT DOCUMENTS

| | | | |
|---|---|---|---|
| 4,598,384 | 7/1986 | Shaw et al. | 364/900 |
| 4,658,351 | 4/1987 | Teng | 364/200 |
| 4,688,167 | 8/1987 | Agarwal | 364/200 |
| 4,713,754 | 12/1987 | Agarwal et al. | 364/200 |
| 4,769,636 | 9/1988 | Iwami et al. | 340/724 |
| 4,783,648 | 11/1988 | Homma et al. | 340/724 |
| 4,806,919 | 2/1989 | Nakayama et al. | 340/721 |
| 4,807,142 | 2/1989 | Agarwal | 364/200 |
| 4,827,404 | 5/1989 | Barstow et al. | 364/200 |
| 4,829,294 | 5/1989 | Iwami et al. | 340/623 |
| 4,890,098 | 12/1989 | Dawes et al. | 340/724 |
| 4,890,257 | 12/1989 | Anthias et al. | 364/900 |
| 4,914,568 | 4/1990 | Kodosky et al. | 364/200 |
| 4,914,607 | 4/1990 | Takanashi et al. | 364/521 |
| 4,962,475 | 10/1990 | Hernandez et al. | 364/900 |
| 4,974,173 | 11/1990 | Stefik et al. | 364/521 |
| 4,982,344 | 1/1991 | Jordan | 364/521 |
| 5,008,853 | 4/1991 | Bly et al. | 364/900 |

FOREIGN PATENT DOCUMENTS

| | | |
|---|---|---|
| 0210554 | 2/1987 | European Pat. Off. |
| 0247827 | 12/1987 | European Pat. Off. |
| 0249399 | 12/1987 | European Pat. Off. |
| 274087A | 7/1988 | European Pat. Off. |
| 303290A | 2/1989 | European Pat. Off. |
| 0333619 | 9/1989 | European Pat. Off. |

OTHER PUBLICATIONS

Krasner, G. E., and Pope, S. T., "A Cookbook for Using the Model-View-Controller User Interface Paradigm in Smalltalk-80," *Journal of Objected Oriented Programming*, Aug./Sep. 1988, pp. 26-49.

Rao, R., "Towards Interoperability and Extensibility in Window Environments via Object Oriented Programming", Master's Thesis, Dept. of Electrical Eng. and Computer Science, Massachusetts Institute of Technology, Jun. 1987.

Scheifler, R. W. and Gettys, J., "The X Window System", *ACM Transactions on Graphics*, vol. 5, No. 2, Apr. 1986, pp. 79-109.

*NeWs Preliminary Technical Overview*, Sun Microsystems, Mountain View, Calif., Oct. 1986.

"Window", *ViewPoint Programmer's Manual*, Xerox Corporation, Sep. 1985, pp. 50-1 to 50-16.

Bobrow, D. G., DeMichiel, L. G., Gabriel, R. P., Keene, S. E., Kiczales, G., and Moon, D. A., *Common Lisp Object System Specification*, published pursuant to approval of the ANSI X3J13 Committee, Jun. 15, 1988, pp. 1-1 through 1-48 and 2-1 through 2-94.

*Primary Examiner*—Gary V. Harkcom
*Assistant Examiner*—Mark K. Zimmerman

[57] ABSTRACT

A workspace data structure, such as a window hierarchy or network, includes functional data units that include data relating to workspace functionality. These functional data units are associated with data units corresponding to the workspaces such that a functional data unit can be replaced by a functional data unit compatible with a different set of functions without modifying the structure of other data units. Each workspace data unit may have a replaceably associated functional data unit called an input contract relating to its input functions and another called an output contract relating to its output functions. A parent workspace's data unit and the data units of its children may together have a replaceably associated functional data unit, called a windowing contract, relating to the windowing relationship between the parent and the children. The data structure may also include an auxiliary data unit associated between the data units of the parent and children windows, and the windowing contract may be associated with the auxiliary data unit. The contracts can be accessed and replaced by a processor in a system that includes the data structure. The contracts can be instances of classes in an object-oriented programming language, and can be replaceably associated by pointers associated with the system objects. Alternatively, a contract can be replaceably associated through dynamic multiple inheritance, with the superclasses of each workspace class including one or more contract classes such that changing the class of an instance of a workspace class serves to replace the contract.

8 Claims, 4 Drawing Sheets

WINDOW SYSTEM WITH INDEPENDENTLY REPLACEABLE WINDOW FUNCTIONALITY

This is a continuation of application Ser. No. 07/242,087, filed Sep. 8, 1988, now abandoned.

BACKGROUND OF THE INVENTION

The present invention relates to a system that presents windows or other workspaces on a workstation's display to provide a graphical user interface. More specifically, the present invention relates to a window system that can present plural windows at a time, each window providing a user interface for a respective application.

A wide variety of graphical user interfaces are available for personal computers and other computer workstations. Rao, R., "Towards Interoperability and Extensibility in Window Environments via Object Oriented Programming," Master's Thesis, Dept. of Electrical Eng. and Computer Science, Massachusetts Institute of Technology, June, 1987, examines existing window environments in chapters 1 and 2 and provides a preliminary design for an object-oriented window environment in chapter 3. Section 2.2 analyzes the functionality of a window system into window management, input handling, output handling, and window environment support; pages 32–33 discuss a hierarchical arrangement of windows, also called a window tree, and the use of nesting of windows. Section 2.3 discusses issues in window environment design; pages 51–52 discuss how Smalltalk, X, NeWS, and User Interface Management Systems (UIMS) separate user interface from underlying services; pages 55–56 discuss window placement, including the tradeoff between tiling and overlapping windows. Section 3.2.1 discusses the windowing model of the proposed design, describing at pages 66–67 a transformation mapping points in each child visual plane to points in its parent visual plane and a hierarchy of visual planes connected by visual worlds called a visual plane tree or a visual universe; the parent, the children, and the transformations are the elements of a visual world, and a set of constraints on how the elements are related, together with policies for maintaining these constraints, is called the visual world's contract. Section 3.2.2 discusses application of the visual world model, with pages 72–73 comparing tiling and overlapping. Section 3.3 discusses design issues, including the choice to design for Common Lisp Object System (CLOS). Section 3.4 discusses window management; section 3.4.1 describes visual planes; section 3.4.2 describes visual worlds, explicitly representing a relationship between a parent visual plane and a set of children visual planes; and section 3.4.3 describes contracts distributed between the parent and the child visual planes, considers whether contracts should be reified, and notes that explicity representations of contracts could be useful as points to attach functionality such as error recovery. Sections 3.7.1–3.7.4 describe contracts for bordering a viewer, for managing overlapping viewers, for managing tiling viewers, and for maintaining a scrollable viewer. Chapter 4 discusses obtaining flexibility through object-oriented programming.

Scheifler, R. W. and Gettys, J., "The X Window System," *ACM Transactions on Graphics*, Vol. 5, No. 2, April 1986, pp. 79–109, describe the X Window System's system substrate, which provides device-independent graphics. The system includes a hierarchy of windows, described in section 4. Within a window, its subwindows can be stacked in any order, with arbitrary overlaps. Although a window can extend outside the boundaries of its parent, those portions are never displayed.

*NeWS Preliminary Technical Overview*, Sun Microsystems, Mountain View, Calif., October 1986, describes NeWS, another window system. Pages 37–38 discuss how clients with different conventions can coexist in NeWS. Pages 42–43 describe canvases that exist in a hierarchy, with a child of a canvas having the capabilities of its parent.

"Window," *ViewPoint Programmer's Manual*, Xerox Corporation, September 1985, pp. 50-1 to 50-16, describes a tree of windows, in section 50.1.2, within which a window may have an ordered list or stack of its child windows. Each window has a pointer to its parent, a pointer to the next sibling of its parent, and a pointer to the window's topmost child. Section 50.2.4 describes window tree manipulation.

Bantz et al., EP-A 210,554, describe a method of windowing image data maintained in a hierarchical data tree structure. The complete image is defined at the root node and sub-images of the complete image are defined at lower order nodes, with the primitive images being defined at the leaf nodes. FIG. 4 shows a traverse function that searches the tree structure.

Kikuchi et al., EP-A 247,827, describe a computer system with a multiwindow presentation manager that displays overlapping windows on a screen. As shown and described in relation to FIG. 1, a section of memory connected to the display device stored window coordinate data specifying the positions and sizes of the independent windows on the screen; another section of memory connected to a cursor display unit stores present-cursor position data representing the latest coordinates of the cursor on the screen. If the present-cursor position data and the window coordinate data indicate that the cursor moves into one of the windows, that window is automatically moved in front of the other windows, as shown and described in relation to FIG. 3.

Noguchi et al., EP-A 249,399, describe multiwindow control techniques that provide an icon window display area with precedence over other display areas, as shown and described in relation to FIGS. 1 and 9. When a window is concealed by one or more other windows, it is reduced to a predetermined size and displayed in the icon window display area, as shown and described in relation to FIG. 8. The windows are controlled in accordance with a window control table and other tables and buffers as shown and described in relation to FIGS. 3 and 4a–4d. The window control table includes an item corresponding to each window and indicating its position and other information.

Agarwal et al., U.S. Pat. No. 4,713,754, describe a data structure for a document processing system, within which each page is subdivided into nonoverlapping areas, each comprised of one or more types of layers. FIGS. 6 and 7 show the document files structure.

SUMMARY OF THE INVENTION

The present invention makes it possible to provide a window system in which window functionality, including each window's input and output functions and the functions that manage the relationship between related windows, may be selected independently of the window hierarchy. This facilitates the integration into a single user interface of applications with graphical user interfaces that depend on incompatible sets of functions, with the graphical user interface of each application being presented to a user in its own window according to its own functionality. Furthermore, if an application presents subwindows within its window, the relationships of those subwindows to the application's window and to each other can be governed by a set of functions that is incompatible with the sets of functions governing the relationships of subwindows within other application windows.

One aspect of the invention is based on the recognition of a basic problem in managing multiple windows or other workspaces. Some conventional systems provide multiple windows using a data structure that includes a respective data unit corresponding to each window. Each window's respective data unit conventionally has the same underlying structure as other window data units, to facilitate production of the data structure, and the underlying structure of window data units conventionally includes or provides for inclusion of data relating to functionality, whether that of a single window or of a set of related windows. A window data unit having a particular structure can only be used with sets of functions with which that structure is compatible. Therefore, the underlying structure of window data units limits the extent to which functionality can be changed: A different set of functions cannot be selected that is incompatible with the structure of the window data units.

This problem can be solved by including data relating to window functionality in data units that can be replaced independently of the underlying structure of window data units and also independently of the underlying structure of the data structure that includes the window data units. This aspect is based on the discovery of techniques for including functional data units in the data structure; each functional data unit includes data relating to functionality of a set of windows and is replaceably associated with the data units of those windows. The data in each functional data unit can then be used in providing functionality of the set of windows with whose data units it is associated. Functionality can be selected by accessing and replacing a functional data unit by another functional data unit that is compatible with a different set of functions.

One technique according to the invention is applicable to data relating to a single window's functionality, such as its sets of input and output functions. A functional data unit that includes data relating to a window's sets of input or output functions can be replaceably associated with that window's data unit within the data structure. The window's data unit can provide a placeholder within the data structure that has little or no data that restricts the window's functionality. As a result, functionality can be changed by replacing the functional data unit with another functional data unit compatible with a different set of functions, independently of the underlying structure of the window's data unit and of the window system data structure.

Another technique according to the invention is applicable to data relating to functionality of a set of windows, such as a windowing relationship in which a set of windows called children are related by being nested in another window called the parent. A functional data unit that includes data relating to a set of functions that manage a windowing relationship or other relationship between windows can be replaceably associated with the data units of all of the related windows. Furthermore, if the data structure includes an auxiliary data unit associated with the data units of all the windows in the set, the functional data unit can be replaceably associated with the auxiliary data unit. The auxiliary data unit can thus provide a neutral relationship so that data units of the related windows need not include data restricting the relationship. As a result, the functionality can be changed by replacing the functional data unit with another functional data unit compatible with a different set of functions managing relationships, independently of the underlying structure of the related windows' data units and of the window system data structure.

The following description, the drawings and the claims further set forth these and other objects, features and advantages of the invention.

DETAILED DESCRIPTION

A. General Features

Figure 1:
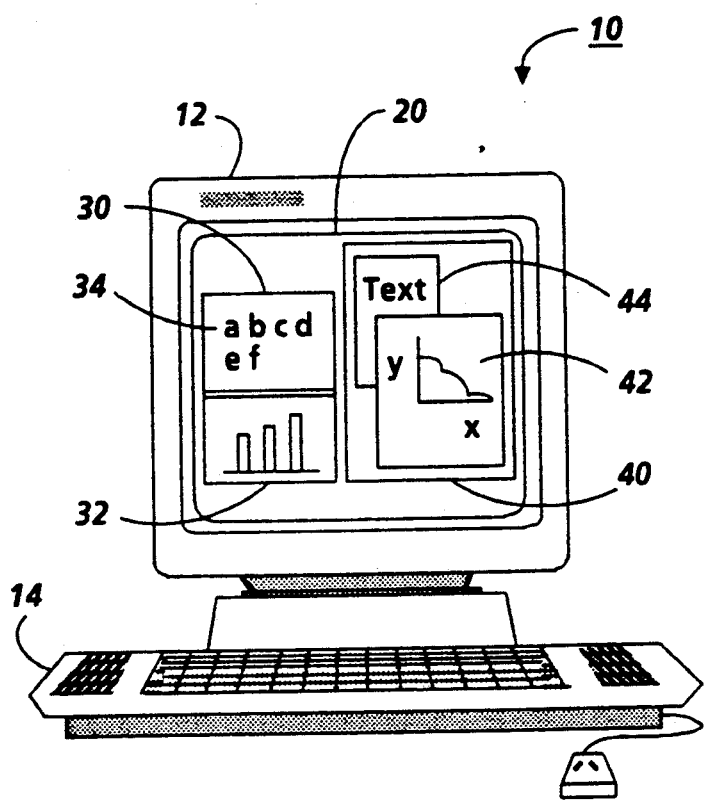
FIG. 1 is a schematic diagram of a workstation presenting windows in accordance with the invention.
Figure 2:
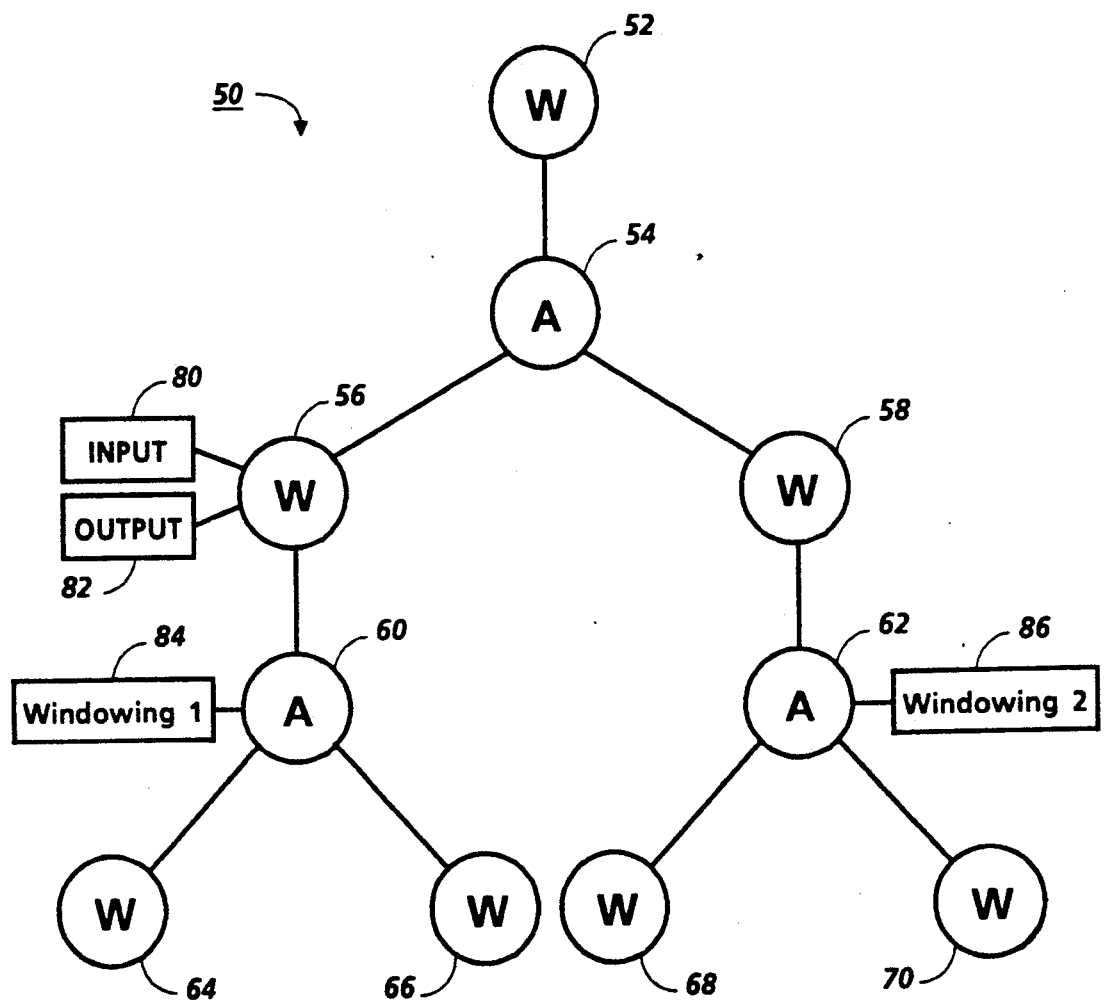
FIG. 2 is a schematic diagram representing a data structure that includes an auxiliary data unit and functional data units according to the invention.

General features of the invention can be understood from FIGS. 1 and 2. FIG. 1 shows windows that can have independently replaceable functionality on a workstation's display. FIG. 2 shows a data structure with an auxiliary data unit to facilitate windows that can have independently replaceable functionality.

FIG. 1 shows workstation 10 with display 12 and keyboard/mouse 14. Display 12 is shown presenting a number of windows. Window 20 is outermost, and can, for example, present the graphical user interface provided by a special purpose application called a desktop manager. Within window 20 are windows 30 and 40, each of which is a subwindow of window 20 and each of which can present the graphical user interface of a respective application that makes use of the window system. In other words, the user can provide inputs to the respective application of one of windows 20 and 30 through signals directed to that window, with the respective application providing output for display in that window.

FIG. 1 also illustrates how different sets of windowing functions could be independently selected and used. The windowing functions governing windows 20, 30, and 40 could be different from the windowing functions governing windows 30, 32, and 34 or governing windows 40, 42, and 44. For example, the windowing functions of window 20 and its children could simulate the windowing calls of the X Window System ("X"), so that a desktop manager designed for X could be readily ported to this environment. On the other hand, the windowing functions of window 40 and its children could simulate the windowing calls of the Interlisp-D window system, which has a built-in desktop manager. And the windowing functions of window 30 and its children could be lightweight functions for providing tiled subwindows. Any of these sets of windowing functions could be selected and used independently of the other windowing functions.

In addition, each window in FIG. 1 could have different functionality. Windows 34 and 44 could each have a simple output service capable only of providing text output, for example a TTY output service, while windows 32 and 42 have a more complete output service that supports geometric shapes and curves. Windows 34 and 44 could have input services that only notify them of keyboard events, while windows 32 and 42 could have input services that also notify them of mouse events. The input or output functionality of each window could similarly be selected independently of the functionality of other windows.

FIG. 2 is a schematic representation of data structure 50, which could be used to provide windows with independently selected functionality as in FIG. 1. Data structure 50 is hierarchical, with nodes corresponding generally to each window in FIG. 1. The uppermost node in data structure 50 is workspace data unit 52, corresponding to window 20. Associated between it and the next level of workspace data units is auxiliary data unit 54, with which are associated workspace data units 56 and 58, corresponding to windows 30 and 40, respectively. Auxiliary data units 60 and 62 are in turn associated with workspace data units 56 and 58, respectively. Finally, auxiliary data units 60 and 62 are associated respectively with workspace data units 64 and 66 and with workspace data units 68 and 70, corresponding to windows 32, 34, 42 and 44, respectively.

In addition to this hierarchy of workspace and auxiliary data units, data structure 50 includes associated data, some of which is shown in FIG. 2. Workspace data unit 56 illustratively has associated functional data units 80 and 82, respectively including data relating to input and output functions of window 30. Auxiliary data unit 60 has associated functional data unit 84, illustratively including data relating to a first windowing relationship among windows 30, 32, and 34. Similarly, auxiliary data unit 62 has associated functional data unit 86, illustratively including data relating to a second windowing relationship among windows 40, 42, and 44.

Data units 80, 82, 84, and 86 are merely illustrative, of course, and each workspace data unit and auxiliary data unit could have associated functional data units similar to those shown associated with workspace data unit 56 and with auxiliary data units 60 and 62.

The manner in which associated functional data units 80, 82, 84, and 86 are shown in FIG. 2 also illustrates that any one of them could be replaced, without other modifications to the data structure, whether workspace data units, auxiliary data units, or other functional data units. Furthermore, each of these functional data units can be successfully utilized by a corresponding set of functions, and each could be replaced by a different functional data unit that could be utilized by a different set of functions. In other words, functional data units 80, 82, 84, and 86 are independently replaceable.

Generalizing from the features illustrated in FIGS. 1 and 2, the following conceptual framework is helpful in understanding the broad scope of the invention. This conceptual framework is a modification and extension of that set forth in the following copending, coassigned U.S. patent applications, all of which are incorporated herein by reference (collectively "the workspace applications"). Ser. No. 030,766, entitled "User Interface with Multiple Workspaces for Sharing Display System Objects," filed Mar. 25, 1987; Ser. No. 127,997, entitled "Multiple Shared Virtual Workspaces," filed Dec. 2, 1987; Ser. No. 195,230, entitled "Accelerating Link Creation," filed May 18, 1988, now issued as U.S. Pat. No. 4,982,344; and Ser. No. 241,525, entitled "Private Regions within a Shared Workspace," filed Sept. 7, 1988. The terms defined below have the meanings indicated throughout the specification and in the claims.

A wide variety of display systems for data processing systems are available including, for example, various graphical user interfaces, but, despite their diversity, these systems tend to have certain common characteristics. One fundamental common characteristic is that a display produces human perceptions. In this application, the term "display feature" refers to any human perception produced by a display.

A "workspace" is a display feature within which other display features appear to have respective relative positions. A window is an example of a workspace. A workspace can have a visible boundary on the display, as windows 20, 30, 32, 34, 40, 42, and 44 illustrate. On the other hand, a workspace need not have a visible outer boundary and need not be contiguous. "Presenting" a workspace that includes plural display features produces the human perception of the display features in respective positions relative to each other.

As used herein, the term "workspace" includes a "virtual workspace," defined in some of the workspace applications as a workspace that is not completely viewed at a given time. Presentation of a virtual workspace produces the human perception of a workspace that exists but is only partially viewed or is not always viewed. The size of workspaces within a given display system may thus range from the smallest extent within which the system's display can present other display features in respective relative positions to the largest extent that can be managed by the system.

A workspace or set of workspaces can have several kinds of "functionality." For example, inputs directed to a workspace by the user can be delivered in accordance with a characteristic input service. Similarly, outputs can be presented within a workspace in accordance with a characteristic output service. Also, a relationship between members of a set of workspaces can be managed according to a characteristic service for managing that relationship. In general, workspace functionality includes all of the characteristic services a workspace or set of workspaces may have. Each service could, for example, be a set of functions that can be called by an application.

Workspaces can be "related" in various ways. One workspace can be "presented within" another workspace, meaning that a display feature within it appears to have a respective position relative to other display features within that other workspace. Two workspaces can "overlap," meaning that a part of one of them obscures a part of the other. Two workspaces can be "tiled," meaning that both are presented within some third workspace, but in mutually exclusive parts of the third workspace, one for each of the tiled workspaces. The workspaces in a set of virtual workspaces can be "alternatives," meaning that one of the set can be displayed even though the others are not visible. Two sets, each including one or more virtual workspaces, can be "linked," in the sense that a user viewing one set can make a request to view the other set. In short, the variety of relationships between workspaces is practically unlimited.

A workspace is "nested" in another workspace when it is only presented within the extent of that other workspace, with no part of it outside that other workspace, and when, if presentation of the other workspace ceases, presentation of the nested workspace also ceases. A special type of relationship between workspaces is a "windowing relationship," meaning a relationship that governs a workspace, called the "parent," and a set of other workspaces nested within it, called its "children." A windowing relationship, for example, governs how the space within the parent is divided among the children, including the ordering, positioning, and sizing of the children. An "ancestral relationship" is a relationship among a set of workspaces, each of which is a parent of at most one other workspace in the set and a child of at most one other workspace in the set; for example, a grandparent, parent, and child could have an ancestral relationship. A "sibling relationship" is a relationship between two or more children that are in a windowing relationship.

Another common characteristic of display systems is a correspondence between data within the data processing system and display features. In this application, a "data structure" is any combination of interrelated data. A "data unit" is a data structure that is accessible as a unit by the data processing system.

A "workspace data structure" is a data structure that corresponds to a set of related workspaces. A "workspace data unit" is a data unit within a workspace data structure that corresponds to a subset of workspaces when the data structure is mapped onto the corresponding set of workspaces. The present invention can be applied, for example, to workspace data structures that includes at least some workspace data units corresponding to a single workspace each. Each of the workspace data units in data structure 50 in FIG. 2, for example, corresponds to a single workspace.

A data unit is "included" in another data structure by making it accessible based on the location or contents of other data in that other data structure. Two data units are "associated" with each other whenever either of them is accessible based on the location or contents of the other. For example, two data units may be associated with each other by including one within the other, by including both in a third data unit, or by including a third data unit in both. Also, two data units can be associated by including an item of data in one that can be used to access the other, such as a pointer or handle. Or two data units can be associated by positioning them in adjacent locations or in locations with a known separation. In general, two data units can be associated by associating both with a third data unit in any way. For example, two data units that are system objects in an object-oriented system can be associated by including pointers in each to a third system object, by including a pointer to each in the third system object, or by including any other combination of pointers that associates each with the third system object.

A "functional data unit" is a data unit that includes data structured so that it can be utilized by a set of functions. The functional data unit is "compatible" with any set of functions that can utilize its data.

A functional data unit in a data structure is "replaceably associated" with another data unit in that data structure when it can be separately replaced by another functional data unit with a different structure and therefore compatible with different sets of functions, without modifying the structure of other data units in the data structure. For example, a system object in an object-oriented system is typically replaceably associated with other system objects that have pointers to it, because the pointers can be changed without changing the structure of those other objects. Similarly, a part of a system object that is an instance of multiple classes may be replaceably associated with other parts of the system object if that part is inherited from one of the superclasses of that object and the class of the object can be dynamically changed, as discussed below.

We now turn to consider in greater detail an implementation of the general features illustrated in FIGS. 1 and 2.

B. Independently Replaceable Contracts

Figure 3:
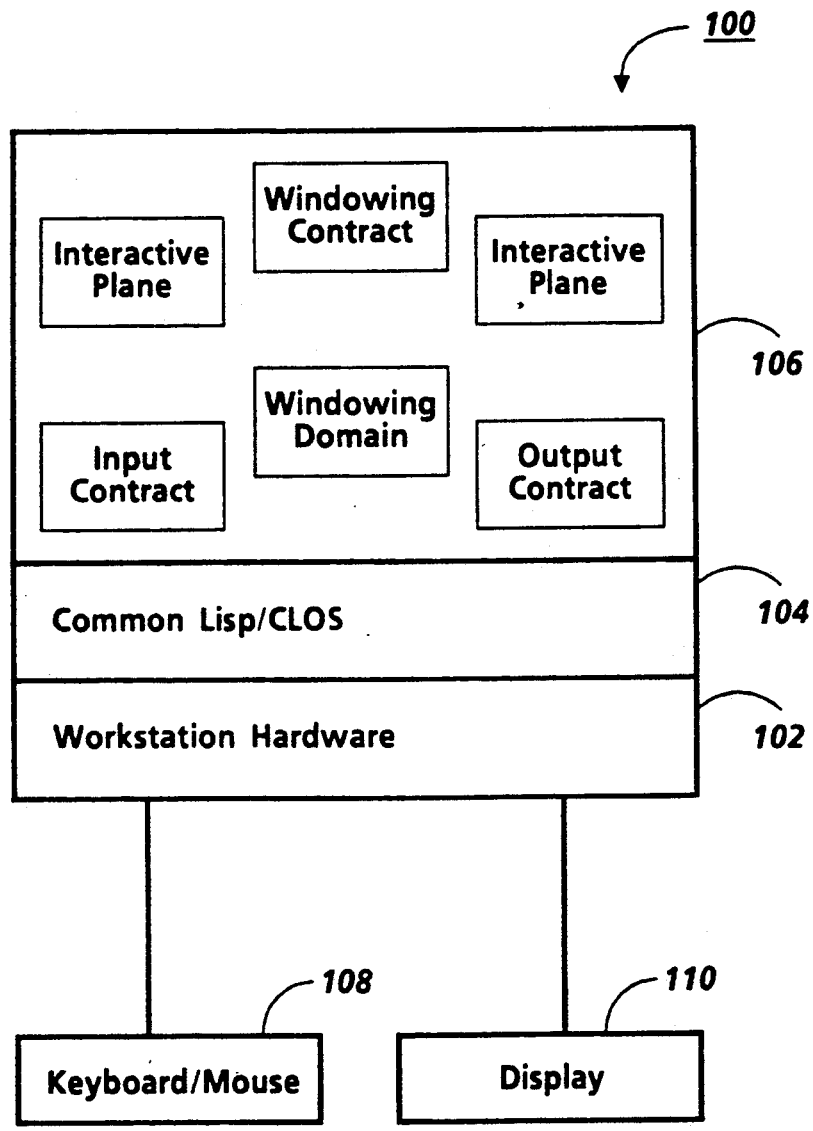
FIG. 3 is a schematic diagram showing components of a system including a data structure according to the invention.
Figure 4:
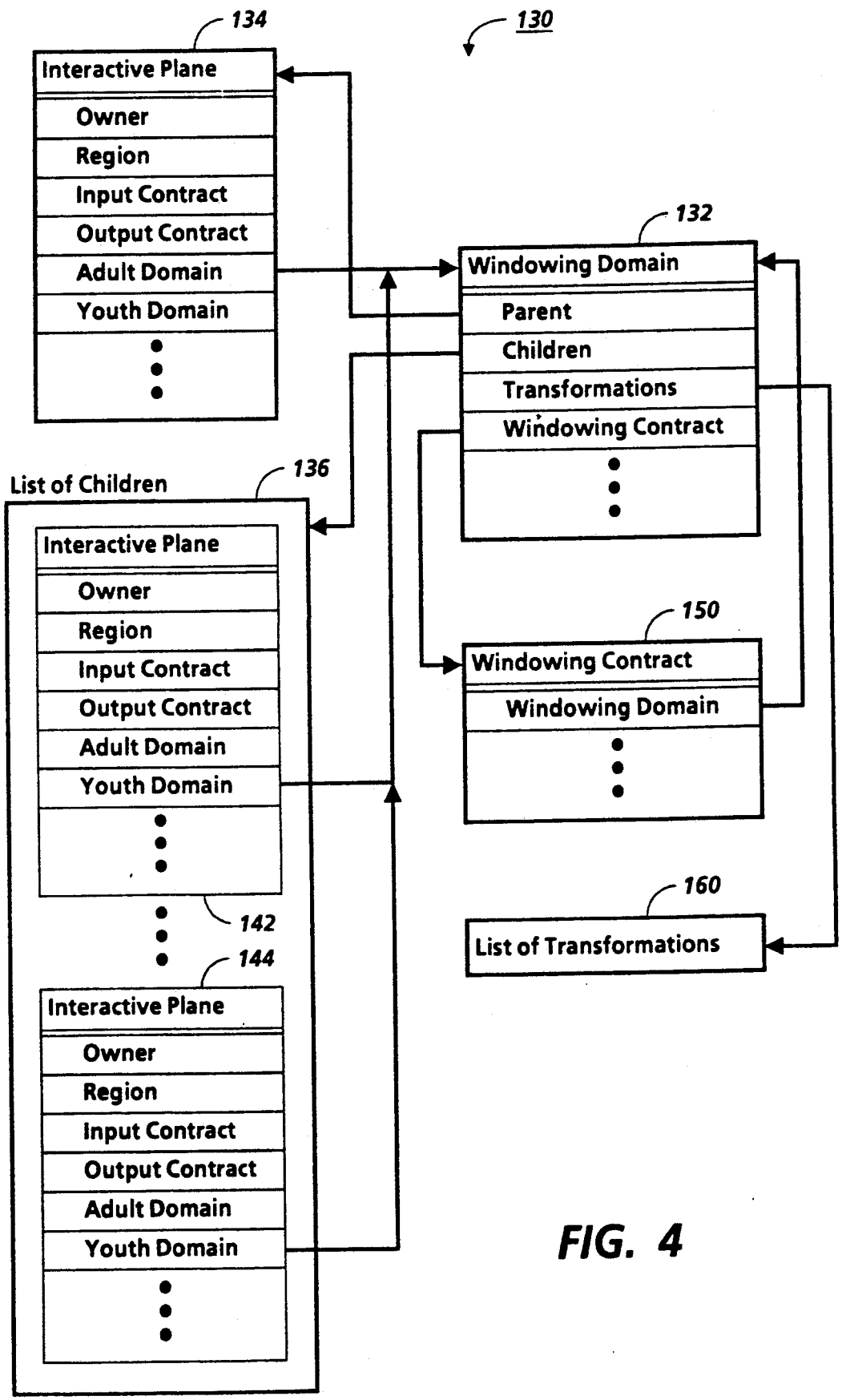
FIG. 4 is a schematic block diagram showing structure and relations between data units within the data structure in FIG. 3.

Appendices A and B are object-oriented code illustrating implementation of the invention and written in Common Lisp extended with the Common Lisp Object System (CLOS) described in Bobrow, D.G., DeMichiel, L.G., Gabriel, R. P., Keene, S. E., Kiczales, G., and Moon, D. A., *Common Lisp Object System Specification*, published pursuant to approval of the ANSI X3J13 Committee, Jun. 15, 1988, pp. 1-1 through 1-48 and 2-1 through 2-94, incorporated herein by reference. Appendix A is an abbreviated code excerpt illustrating basic features of a system that provides independently replaceable functional data units, referred to as the Silica kernel. Appendix B illustrates a more complete implementation, referred to as Silica. FIG. 3 illustrates components of a system running Silica. FIG. 4 illustrates data units in a data structure produced by running Silica.

System 100 in FIG. 3 includes workstation hardware 102 with a processor running software 104 supporting Common Lisp extended with CLOS. For example, Common Lisp/CLOS 104 could include a conventional Common Lisp implementation, available from a number of vendors, together with Portable Common Loops (PCL/CLOS), currently available from a number of vendors or by contacting PCL/CLOS Coordinator, Xerox Palo Alto Research Center, Palo Alto, Calif. In addition, Common Lisp/CLOS 104 could include a display system, such as the X Window System, NeWS, or the Display Streams Interface in Xerox Lisp.

System 100 also includes Silica system 106, which results from running Silica. Silica system 106 includes system objects or data units that are instances of the classes defined by Silica code, illustratively including interactive planes, a windowing domain, and several system objects called contracts, including an input contract, an output contract, and a windowing contract. The structure and relations of these sytem objects are discussed in greater detail below in relation to FIG. 4.

System 100 also includes keyboard/mouse 108 and display 110. A Common Lisp application can make requests to Silica code that result in operations involving Silica system 106. For example, an application could make a request for creation of an interactive plane system object. In addition, the application may direct requests to contract objects. If the Common Lisp application is a desktop manager, these requests may involve obtaining data from Silica system 106 for use in interpreting inputs from keyboard/mouse 108 or for use in presenting outputs on display 110. If the Common Lisp application is another application whose graphical user interface is presented in a window on display 110, these requests could include requests to an output contract or input contract.

FIG. 4 is a representation of part of a data structure 130 that could exist within Silica system 106 during execution of an application, such as a desktop manager, with a graphical user interface providing multiple windows. Each window would be presented on display 110 as a subwindow within the window presenting the application's graphical user interface. The representation in FIG. 4 generally conforms with the features illustrated by the code of Appendix A.

Data structure 130 includes windowing domain 132, a system object that is an instance of the class "windowing-domain" defined in Appendix A. Windowing domain 132 is an example of an auxiliary data unit that is associated with a parent window's data unit and the data units of the children windows of that parent window. The parent window's data unit is interactive plane 134, a system object that is an instance of the class "interactive-plane" defined in Appendix A. The children window's data units are included in list of children 136, and each of them is also an instance of the class "interactive-plane," as illustrated by interactive planes 142 and 144. If the display features presented on display 110 were mapped onto data structure 130, a parent window would map onto interactive plane 134, while each of its children windows would map onto the interactive planes in children list 136.

Data structure 130 also includes a number of data units that are system objects referred to as "contracts." The input contracts, output contracts, and windowing contracts are instances respectively of subclasses of the classes "input-contract," "output-contract," and "windowing-contract," shown in abbreviated form in Appendix A. As shown in Appendix A, the classes "input-contract" and "output-contract" could both have the superclass "plane-contract"; the class "windowing-contract" could have the superclass "relationship-contract"; and both "relationship-contract" and "plane-contract" could have the superclass "contract." The role of a contract is to provide data that is used in relation to one or more associated system objects and to provide methods for interpreting requests from an application. More specifically, an input contract provides data used in interpreting input signals directed to an interactive plane; an output contract provides data used in providing output for display of an interactive plane; a windowing contract provides data used to govern a windowing relationship between interactive planes, such as a parent-child or child-child relationship.

Each contract is associated with one or more of the interactive planes, either directly or through windowing domain 132. Interactive planes 134, 142, and 144 each have an associated input contract and an associated output contract. Windowing contract 150 is associated through windowing domain 132 with interactive plane 134 and with all of the interactive planes in list of children 136.

Each input contract and output contract could, for example, be associated directly with a respective interactive plane through a pointer associated with the interactive plane, and each input contract and output contract could also have an associated pointer back to the respective interactive plane, as in Appendix A. In CLOS, these pointers fill "slots" in an instance of a class, the slots being inherited from the class. Therefore, the class "interactive-plane" has slots for a pointer to an instance of the class "input-contract" and for a pointer to an instance of the class "output-contract," as shown in FIG. 4 and in Appendix A, and the classes "input-contract" and "output-contract" each have a slot for a pointer to an instance of the class "interactive-plane."

The class "interactive-plane" has several other slots: One slot can contain a pointer to an owner, meaning an application that presents its graphical user interface in the window or other workspace provided by an instance of the class "interactive-plane." Another slot can contain a pointer to a region, meaning a description of the set of points within a window or other workspace and a reference framework such as a coordinate system; for example, the set of points can be a rectangle or a set of rectangles, or a path as defined in PostScript or InterPress. Two other slots can contain respective pointers to an adult domain and a youth domain, each an instance of the class "windowing-domain"; FIG. 4 shows how these slots allow for association of a windowing domain between a parent interactive plane and its children, with the adult domain pointer of interactive plane 134 and the youth domain pointers of interactive planes 142 and 144 and any other interactive planes on list of children 136 all leading to windowing domain 132.

Conversely, the class "windowing-domain" includes slots that allow for association between a parent interactive plane and its children. One slot can contain a pointer to a parent that is an instance of the class "interactive-plane," while another contains a pointer to children, meaning a list of children that are instances of the class "interactiveplane." Thus, the parent slot of windowing domain 132 contains a pointer to interactive plane 134 while its children slot contains a pointer to list of children 136.

Rather than being associated through pointers, each input contract and output contract could alternatively be replaceably associated with a respective interactive plane through a dynamic multiple inheritance mechanism like that of CLOS. In other words, a class could be constructed that includes among its superclasses the class "interactive-plane" and subclasses of "input-contract" and "output-contract," so that it would inherit the slots of those classes. Then by changing an instance of the class so that it has a different constructed class, the structure of the instance would be dynamically updated.

Windowing contract 150, on the other hand, is associated with interactive planes 134, 142, and 144 indirectly through windowing domain 132. The class "windowing-domain" has a slot that can contain a pointer to an instance of the class "windowing-contract." Similarly, the class "windowing-contract" has a slot that can contain a pointer to an instance of the class "windowing-domain." In FIG. 4, windowing domain 132 and windowing contract 150 are associated in this manner. The association of windowing domain 132 with interactive planes 134, 142, and 144, as described above, completes the association of windowing contract 150 with the interactive planes.

In each association described above, the contract is replaceably associated, meaning that each contract can be separately replaced without changing other data units in the data structure. The steps to replace a contract could include accessing the contract being replaced and replacing it with another contract. This could be done by code within Silica system 106, which would be executed by the processor in workstation hardware 102 in response to a request to replace a contract. Appendix A includes several generic functions, in abbreviated form, under the heading "Kernel Events" that can be used to change a contract in one of several ways. The illustrated functions include "change-windowing-contract," "enact-windowing-contract," "repeal-windowing-contract," "change-input-contract," and "change-output-contract," and these functions in turn can call one or more functions for a particular contract, such as "contract-enacted" or "contract-repealed." The function "change-windowing-contract," for example, calls the function "contract-repealed" for the current windowing contract of a windowing domain; then it sets up a pointer to the new windowing contract before calling the function "contract-enacted" for the new windowing contract.

Appendix A also includes generic functions that notify a contract when an interactive plane or windowing domain with which it is associated is changed. In other words, if the skeletal data structure formed by interactive planes and windowing domains is modified, certain contracts will be affected and should therefore be notified. In response to notification, a contract should perform a method that determines whether it is still valid and, if not, initiates appropriate steps to modify or replace it. Appendix A illustrates that only four such notification functions, shown in abbreviated form, are necessary—"enable-plane," "disable-plane," "setf region," and "setf transformation." This limited set of functions elegantly handles notification.

The functions "enable-plane" and "disable-plane" are duals as their names suggest. An interactive plane that is disabled remains in the skeletal data structure, but it is inactive, meaning that it receives no input and provides no output, a state in which it can be manipulated. Therefore, no messages are thereafter provided to its input and output contracts, and its branch of the data structure is not displayed until it is enabled again. Each of the functions "enable-plane" and "disable-plane" thus includes notifications to four contracts—the windowing contracts associated respectively with the windowing domains for which the interactive plane is a child and a parent and the interactive plane's associated output and input contracts.

The function "setf region" modifies the contents of the region slot of an interactive plane, and then provides notifications to the same four contracts as described above. The function "setf transformation," on the other hand, only provides notifications to three contracts—the windowing contract associated with the windowing domain for which the interactive plane is a child and its associated output and input contracts. This is because the transformation of an interactive plane's region onto the region of its parent does not affect the relationship it has with its own children.

As shown in FIG. 4 and Appendix A, the transformations can be associated with windowing domain 132 through a pointer in its transformations slot, the pointer leading to list of transformations 160. List of transformations 160 provides a transformation for each interactive plane in list of children 136, and each can be a linear transformation such as a translation, a rotation, a scaling, or any combination of these. Together, the region of an interactive plane and its transformation define its position and extent within the region of its parent interactive plane.

Appendix A also illustrates in abbreviated form how an output contract could respond to notifications from the functions "setf region" and "setf transformation." Among the functions provided by the kernel are "calculate-output-clipping-region," which transforms a child's region onto its parent's region, clips any parts that do not fit within the parent's region, and continues transforming and clipping upward through the data structure; "calculate-output-transformation," which transforms a child's region onto its parent's region and continues transforming upward through the data structure; and "recursively-enabled," which checks whether a child is enabled, and then checks whether its parent and parent's parent, etc. are enabled upward through the data structure. These kernel functions can be used respectively by a function "output-region-changed," which is called by the function "setf region"; a function "output-transformation-changed," called by "setf transformation"; and a function "output-allowed?," called by every output function. The output contract should also provide a mechanism that can be used by windowing contracts to call the owner of the associated interactive plane to repaint portions of the plane that are invalidated.

Appendix B is an example of an implementation of the invention, although it differs in some respects from Appendix A. The code in Appendix B could run with PCL/CLOS and CLX, the Common Lisp language bindings to X v11.

C. Miscellaneous

The invention could be implemented in many other ways. For example, the implementation in FIG. 4 shows input, output, and windowing contracts, but functional data units of other kinds could be used. For example, data relating to input and output functions could be combined into an input/output contract. On the other hand, data in a windowing contract could be distributed into one type of contract with data relating to a parent-child relationship and into another type with data relating to a relationship among children.

The invention has been described primarily in relation to windows, but can also be applied to any other kind of workspace. Windows are typically thought of as rectangular, but the invention could be applied to a workspace of any shape or character, including a workspace that includes several or many non-contiguous parts or that is partially or wholly transparent.

The invention has been described in relation to a hierarchical system. Although developed for a hierarchical implementation, the invention could also be applied to non-hierarchical systems or to systems that are only partially hierarchical. In particular, the invention is readily applicable to systems that are predominantly hierarchical but provide some non-hierarchical relationships between workspaces. An example of a non-hierarchical workspace relationship that is fully compatible with the invention would be a transition link enabling a user viewing a workspace to request a transition to begin presentation of another workspace. Data relating to such a non-hierarchical relationship could be included in a functional data unit replaceably associated with the linked workspace data units according to the invention.

The code in Appendix A and Appendix B uses Common Lisp/CLOS, but the invention need not be implemented in an object-oriented system or in Common Lisp/CLOS, and could be implemented in a wide variety of programming languages and environments. Furthermore, the invention could be implemented for use with any display system capable of providing windows or other workspaces or just basic graphics and input capabilities, including, for example, the X Window System, NeWS, or the Display Streams Interface in Xerox Lisp.

In addition to the operations directly relevant to the invention, the same system could perform the functions of building the hierarchical workspace data structure, maintaining it, transforming it to produce a display, and obtaining information from it about the current state of the workspace hierarchy. Furthermore, the system could also provide a programmer's interface enabling a programmer to modify the system.

A system according to the invention could be used with any display server or components providing display services, although the system's workspace data structure may make it unnecessary to use a data structure that the display server or services would otherwise provide. A system according to the invention could thus insulate an application from features of the display server or services that would otherwise restrict presentation of the application's graphical user interface. Furthermore, a standard set of calls could be established by which an application could provide requests to a system according to the invention, the requests calling for operations involving the workspace data structure. The system according to the invention could be written to operate on any of a number of workstations, in which case an application using this standard set of calls could also present its graphical user interface on any of those workstations without modification.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

```
;;; -*- Mode: Lisp; Package: User; Base: 10.; Syntax: Common-Lisp -*-
;;;
;;; "Formal Semantics" of Silica Kernel
;;;
;;; Copyright (c) 1988 by Xerox Corporation.  All rights reserved.
;;;

(in-package 'silica)

;;;
;;; Essential Data Structures
;;;

;;;
;;; Interactive Planes
;;;

(defclass interactive-plane (kernel-object)
   (

;; The owner and region slots may contain any kind
    ;; of object that satisfy the required protocols.
    ;; Contracts that a plane enters define the
    ;; protocol that these objects must be able to
    ;; handle.
    (owner :accessor plane-owner :initarg :owner)
    (region :accessor plane-region :initarg :region)

;; These contracts determine the input and output interface of
    ;; the plane.
    (input-contract :accessor input-contract)
    (output-contract :accessor output-contract)

(adult-domain :accessor adult-domain)
    (youth-domain :accessor youth-domain))
   (:documentation "An abstract surface for doing input and output."))

(defmethod youth-contract ((interactive-plane interactive-plane))
   (windowing-contract (youth-domain interactive-plane)))

(defmethod adult-contract ((interactive-plane interactive-plane))
```

```
   (windowing-contract (adult-domain interactive-plane))))
(defmethod interactive-plane-transformation
    ((interactive-plane interactive-plane))
  (windowing-domain-get-transformation (child-domain interactive-plane)
                  interactive-plane))
;;;
;;; Windowing Domains
;;;

(defclass windowing-domain (kernel-object)
   (
    ;; The parent and children are planes.  The transformations are
    ;; objects which must meet the dictates of the windowing domain's
    ;; contracts.
    (parent :initform nil  :initarg :parent
       :accessor windowing-domain-parent)

;; Each child has a transformation that determines how the coordinate
system
    ;; of the child is related to the coordinate system of the parents.
Namely
    ;; the child region transformed determines the region the child occupies
on
    ;; the parent plane.
    (children :initform nil :initarg :children
         :accessor windowing-domain-children)
    (transformations :initform nil :initarg :transformations
          :accessor windowing-domain-transformations)

;; Windowing contract determines constraints and effects of adding,
    ;; removing, changing parents or children as well as the constraints and
    ;; effects of changing the regions or transformations of various planes.
    (windowing-contract :initform nil
           :accessor windowing-contract))
   (:documentation "An auxiliary class for representing one level of the
visual
plane hierarchy"))
;;;
;;; The Silica Kernel provides mechanisms for generating and maintaining
;;; hierarchies of interactive-planes and windowing-domains.

;;;
;;; Interactive Plane Construction and Installation.
;;;
(defun make-interactive-plane
    (&key region owner input-contract output-contract
     parent transformation make-adult-domain?)
  ;; Makes windowing domains as necessary.
  ;; If parent then sets up that domain.
  ;; If make-adult-domain? sets up a domain with this plane as parent in
  ;; anticipation of new planes being made below or be added to the visual
  ;; domain.
  ;; Uses region, owner, and input and output contracts to set up
  ;; an interactive plane.
  ;; An alternative design would be to pass in input and output contract
  ;; classes.  These could be used classes to construct a class with these
  ;; and others as superclasses.  Since the class of the returned plane
could
  ;; be changed dynamically, the choice of input and output class can also
be
  ;; changed dynamically.
  )
```

```
(defun install-root (interactive-plane something-to-install-on)
  ;; can install a plane hierarchy on a screen or on another window system.
  ;; something-to-install-on could be, for example, a display-server object
  ;; that encapsulates the requirements of the kernel for a place to attach
  ;; an interactive plane hierarchy.
  )
;;;
;;; Basic Definition of Contracts
;;;

(defclass contract ()
  ())

(defclass plane-contract (contract)
  ())

(defclass relationship-contract (contract)
  ())

(defclass windowing-contract (relationship-contract)
  (windowing-domain :accessor windowing-domain))

(defclass output-contract (plane-contract)
  (interactive-plane :accessor interactive-plane))

(defclass input-contract (plane-contract)
  (interactive-plane :accessor interactive-plane))
;;;
;;; KERNEL EVENTS
;;; Below a set of "kernel event" generic functions are defined. In
particular,
;;; two sets of events are defined:
;;; 1) a protocol for changing the contracts used by a plane or a domain.
;;; 2) a notification protocol that defines how contracts are notified of
;;; changes to the skeletal interactive-plane tree.
;;;

;;;
;;; Kernel Events Set #1: Contract Changes.
;;;

(defmethod change-windowing-contract
    ((windowing-domain windowing-domain) windowing-contract)
  (repeal-windowing-contract windowing-domain)
  (enact-windowing-contact windowing-domain windowing-contract))

(defmethod enact-windowing-contract
    ((windowing-domain windowing-domain) windowing-contract)
  (setf (windowing-contract windowing-domain) windowing-contract)
  (setf (windowing-contract-windowing-domain contract) windowing-domain)
  (contract-enacted windowing-contract))

(defmethod repeal-windowing-contract
    ((windowing-domain windowing-domain))
  (let ((contract (windowing-domain-contract windowing-domain)))
    (setf (windowing-contract windowing-domain) nil)
    (contract-repealed contract)
    contract))

(defmethod change-input-contract
    ((interactive-plane interactive-plane) input-contract)
```

```
  (input-contract-repealed (input-contract interactive-plane)
          interactive-plane)
  (setf (input-contract interactive-plane) input-contract)
  (input-contract-enacted (input-contract interactive-plane)
          interactive-plane))

(defmethod change-output-contract
    ((interactive-plane interactive-plane) output-contract)
  (output-contract-repealed (output-contract interactive-plane)
          interactive-plane)
  (setf (output-contract interactive-plane) output-contract)
  (output-contract-enacted (output-contract interactive-plane)
          interactive-plane))
;;;
;;; Kernel Events Set #2: Structure Changes
;;;

(defmethod enable-plane ((interactive-plane interactive-plane))
  (child-enabled (youth-contract interactive-plane) interactive-plane)
  (parent-enabled (adult-contract interactive-plane) interactive-plane)
  (output-enabled (output-contract interactive-plane) interactive-plane)
  (input-enabled (input-contract interactive-plane) interactive-plane))

(defmethod disable-plane ((interactive-plane interactive-plane))
  (child-disable (youth-contract interactive-plane) interactive-plane)
  (parent-disable (adult-contract interactive-plane) interactive-plane)
  (output-disabled (output-contract interactive-plane) interactive-plane)
  (input-disabled (input-contract interactive-plane) interactive-plane))

(defmethod (setf region) (new-region (interactive-plane interactive-plane))
    (setf (slot-value interactive-plane 'region) new-region)
    (child-region-changed (youth-contract windowing-domain) interactive-plane)
    (parent-region-changed (adult-contract windowing-domain) interactive-
plane)
    (output-region-changed (output-contract interactive-plane) interactive-
plane)
    (input-region-changed (input-contract interactive-plane) interactive-
plane)
    )

(defmethod (setf transformation)
    (new-transformation (interactive-plane interactive-plane))
    (setf (slot-value interactive-plane 'transformation) new-transformation)
    (child-transformation-changed (youth-contract interactive-plane)
          interactive-plane)
    ;; no parent-transformation-changed since a transformation is only
effected
    ;; by one windowing contract, namely the contract.
    (output-transformation-changed (output-contract interactive-plane)
          interactive-plane)
    (input-transformation-changed (input-contract interactive-plane)
          interactive-plane))
;;;
;;; Minimal Requirements of an Output contract
;;;
;;; An output contract should clip to an output-clipping-region, transform
to
;;; using an output-transformation, and only output if the plane is
recursively
;;; enabled.
;;; In addition to the above requirements, an output contract should provide
a
```

```
;;; mechanism to invoke its client to repaint portions of the interactive-
plane
;;; when they are invalidated by the client or by some action in the plane
;;; hierarchy.

;;; The following kernel functions are provided to assist output contracts
;;; in meeting the requirements expected of output contract by the
;;; the Silica kernel:

(defmethod calculate-output-clipping-region (interactive-plane)
  )

(defmethod calculate-output-transformation (interactive-plane)
  )

(defmethod recursively-enabled? (interactive-plane)
  )

;;;
;;; A simple-minded use of these would be to provide the following  kernel
;;; event methods:

(defmethod output-region-changed
     ((output-contract output-contract) interactive-plane)
   (setf (output-clipping-region output-contract)
     (calculate-output-clipping-region interactive-plane)))

(defmethod output-transformation-changed
     ((output-contract output-contract) interactive-plane)
    (setf (output-transformation output-contract)
     (calculate-output-transformation interactive-plane)))

;;; ...and the following would be invoked on every output operation:

(defmethod output-allowed?
     ((output-contract output-contract))
    (recursively-enabled? (interactive-plane output-contract)))
```

APPENDIX B

```
;;; -*- Mode: Lisp; Package: SILICA; Base: 10.; Syntax: Common-Lisp -*-
;;;
;;; SILICA (Top Level Defining File)
;;; Copyright (c) 1987, 1988 by Xerox Corporation.  All rights reserved.
;;;
;;; SILICA is a kernel for building window system and user interface
;;; software in Common Lisp.
;;;
;;; sil|i|ca n. A white or colorless crystalline compound, SiO2, occurring
;;; abundantly as quartz, sand, flint, agate, and many other minerals, and
;;; used to manufacture a wide variety of materials, notably glass and
;;; concrete. Also called "silicon dioxide" and, formerly, "silex."
;;; [New Latin, from Latin silex (stem silic-), flint, silex.]
;;;    (From the American Heritage Dictionary)

(eval-when (load)
     (format *terminal-io* ""~%~@{~A~%~}" "The SILICA Window System" "

sil|i|ca n. A white or colorless crystalline compound, SiO2, occurring
abundantly as quartz, sand, flint, agate, and many other minerals, and used
to manufacture a wide variety of materials, notably glass and concrete.
Also called \"silicon dioxide\" and, formerly, \"silex.\"
[New Latin, from Latin silex (stem silic-), flint, silex.]
--  (From the American Heritage Dictionary)"))
```

```
;;; **********
;;; CONVENTIONS
;;; **********
#|
Coding Conventions

I'm not good at mapping out conventions beforehand and sticking to them.
Besides the conventions should suit the program, and I'm just starting to
understand what Silica is going to look like as a whole system.

The below conventions are not strictly adhered to, but rather are some guess
as to what I'm currently thinking of doing.

Functions:

1) Mumble-p - a type predicate
 2) Mumble?  - a general predicate like intersect?

Variables:

1) *mumble* - a special variable
 2) mumble-pl - a property list

Slots:

1) No users of an instances ever access a slot, unless they do so through
the use of a macro provided by the class implementer.

2) Slots named %mumble should not even be directly used by subclasses.

Methods:

1) Methods named %mumble should not be used by subclasses

Argument Order:

1) left < right < bottom < top < width < height

|#

;;;
;;; ***                    SILICA PACKAGE SETUP                    ***
;;;
;;; Put IN Seven EXtremely Random USEr Interface COmmands ;;; PROVIDE & IN & SHADOW
(provide "SILICA")
(in-package "SILICA" :nicknames '("SIO2" "W"))

;;; EXPORT
;;; Define a bunch of export variables so that users can import rather
;;; than use if they only want part of the kernel.

(defparameter abc-exports
  '(
    ;; geometry
    (region position plane rectangle compound-region)
    (make-position *plane* make-rectangle
     make-normalized-compound-region)
    (left bottom right top width height rectangle-left
     rectangle-bottom rectangle-right rectangle-top
     rectangle-width rectangle-height position-x
     position-y x y regions)
    (region-empty? region-inside? region-contains? region-intersect?
     region-union region-intersection region-difference)

;; bitmaps
    (bitmap make-bitmap bitmapp bitmap-width bitmap-height)

;; transformation
    (transformation make-transformation
     null-transformation *null-transformation*)
    (scale rotation translation x-translation y-translation
     transformation-scale transformation-rotation
     transformation-translation transformation-dx transformation-dy)
```

```
    (identityp translationp rotationp scalep)
    (transformation-compose transformation-invert transformation-copy
     transformation-apply transformation-undo
     transform-point untranform-point
     transform-rectangle untransform-rectangle)

;; fonts
    (font make-font)
    (font-family font-size font-rotation font-italic? font-bold?
     font-scale font-ascent font-descent font-height)

;; shades
    (shade *black* *dark-gray* *gray* *light-gray* *white*
     shade->il-shade shade->4x4)

;; abstract & basic abc display medium
    (abc-abstract-display-medium abc-basic-display-medium
     abc-abstract-bitmap-medium
     make-abc-display-medium make-abc-bitmap-medium)
    (clipping-region font line-width location operation transformation target)

(*default-font* *default-operation* *default-shade*)
    (copy-rectangle copy-region
     clear-rectangle clear-region clear-media
     fill-rectangle fill-region fill-media
     draw-point draw-points draw-line draw-lines draw-to draw-segments
     draw-rectangle draw-rectangles print-string  print-string-justified)
    (string-width flush-output)
    (with-saved-context copy-abc-client-context)))

(defparameter dm-exports
  '((display-medium make-display-medium)
    (display-medium-transformation display-medium-output-contract
     display-medium-clipping-region)
    (with-output-protection with-output-synchronization
       display-medium-valid-p display-medium-validate
       display-medium-invalidate)
    (using-display-medium cleanup-display-medium)))

(defparameter kernel-exports
  '(
    ;; connections and galaxys
    (galaxy make-galaxy destroy-galaxy destroy-galaxys install-galaxy-root
     *galaxy* galaxy-root galaxy-dmstamp)
    (connection get-connection make-connection
     destroy-connection destroy-connections
     connection-cprop connection-iprop)

;; model
    (interactive-plane windowing-domain owner contract)
    (plane-region plane-owner)
    (windowing-domain windowing-domain-transformation
     windowing-domain-add-child windowing-domain-rem-child
     windowing-domain-children)

;; windowing
    (part child-part parent-part mute-part mute-parent-part mute-child-part)
    (windowing-contract mute-windowing-contract
     contract-children ordered-children contract-child-p
     contract-windowing-domain contract-parent contract-change-order)
    (contract-child-part contract-parent-part)

;; output handling
    (output-contract standard-output-contract output-client)
    (output-contract-repaint
     output-contract-display-medium output-client-repaint)

;; input handling
    (input-contract mute-input-contract)

;; silica planes
    (silica-plane make-silica-plane destroy-silica-plane
     get-plane-class-from-defaults)
    (plane-parent plane-transformation plane-children
     plane-youth-domain plane-adult-domain
     plane-youth-contract plane-adult-contract youth-contract adult-contract
```

```
     plane-adoptees plane-adopted?)
    (fetch-delta-transformation fetch-clipping-region
     which-child which-descendant)

;; Kernel Events
    (enact-contract repeal-contract change-contract
     change-input-contract change-output-contract)
    (enable-plane disable-plane enable-all disable-all
     plane-region-changed plane-transformation-changed)

;; Contract notification
    (contract-enacted contract-repealed)
    (parent-enabled parent-disabled parent-region-changed)
    (child-enabled child-disabled
     child-region-changed child-transformation-changed)
    (output-enabled output-disabled
     output-region-changed output-transformation-changed)
    (input-enabled input-disabled
     input-region-changed input-transformation-changed)))

(defparameter on-exports
  '(
    ;;
    (xerox-galaxy)
    (x-galaxy)

;; fake input
    (get-region get-position get-box-region)
    (create-menu do-menu)))

(export '(abc-exports kernel-exports dm-exports on-exports))
(dolist (group on-exports)
        (export group))
(dolist (group abc-exports)
        (export group))
(dolist (group dm-exports)
        (export group))
(dolist (group kernel-exports)
        (export group))

;;;
;;; REQUIRE
;;;

(require "RESOURCES"
  (make-pathname :name "resources" #+xerox :type #+xerox "DFASL"
    :version :newest
    :defaults #+xerox "{pooh/n}<~rao/silica>"
              #-xerox "/usr/silica/"))

(require "CLMAKE"
  (make-pathname :name "clmake" #+xerox :type #+xerox "DFASL"
    :version :newest
    :defaults #+xerox "{pooh/n}<~rao/silica>"
              #-xerox "/usr/silica/"))

(unless (member :pcl *features*)
  #+xerox (make-pathname :host "PHYLUM" :directory "PCL" :name "LOAD-PCL")
  #-xerox (make-pathname :name "LOAD-PCL" :directory "/usr/pcl"))

(pushnew "PCL" *modules* :test #'string-equal)  ; Until PCL declares itself...

(unless (find-package "XLIB")
  #+xerox
  (progn
    nil)
  #+excl
  (progn
    (excl:chdir "/usr/silica/clx")
    (load "excldefsys")
    (funcall (intern "LOAD-CLX" "XLIB")))
  #-(or xerox excl)
```

```
    (progn
      nil))
(unless (find-package "CL-EXTRA")
        (make-package "CL-EXTRA"))
(pushnew 'cl-extra::clx cl-extra:*port*)  ;; For Defsystem Utility

#+comment
(require "INTEGRATORS"
         (make-pathname :name "INTEGRATORS" :type "DFASL" :version :newest
                        :defaults (il:input)))

#+comment
(require "GENERATOR"
         (make-pathname :name "GENERATOR" :type "LCOM" :version :newest
                        :defaults (il:input)))

;;;
;;; USE
;;;

(use-package '("PCL" "LISP" "CL-EXTRA"))

;;;
;;; IMPORT
;;; Import Generals
;;;

(export '(import-generals))
(defun import-generals (pkg-name)
  (let ((pkg (find-package pkg-name)))

;; Utilities
    (import '(pcl::iterate) pkg)
    ;; Xerox Filemanager Types - should ax these after I upgrade
    ;; DM-IL and HL-IL.
    #+xerox
    (import '(pcl::classes pcl::methods il:functions il:structures
                           il:variables il:p il:types il:coms il:setfs)
            pkg)

))

(import-generals "SILICA")

;;; Temporary Upgrade help
#+xerox
(defun xcl-user::import-generals (pkg)
  (import-generals pkg))
;;;
;;; ***                    SILICA DEFSYSTEM                    ***
;;;

(defvar *silica-package* (find-package "SILICA"))
(defvar *silica-system-date* "9/88 Silica")

;;;
;;; *silica-directory* specifies the directory silica is stored
;;; in at your site.  If the value of the variable is a single pathname, the
;;; sources and binaries should be stored in that directory.  If the value of
;;; that directory is a cons, the CAR should be the source directory and the
;;; CDR should be the binary directory.
;;;

(defvar *silica-directory*
  #-Xerox                    (pathname "/usr/silica/")
  #+Xerox                    (pathname "{pooh/n}<~rao/silica>"))

(import '(cl-extra::xerox cl-extra::clx))
(defsystem silica *silica-directory*

;; file          load          compile       files which       port
    ;;               environment   environment   force the of
    ;;                                           recompilation
    ;;                                           of this file
    (
```

```
;; General purpose utilities used throughout Silica
(silica-utils    ()              ()              ())
(silica-clos     ()              ()              ())

;; Geometry Kernel.
(silica-region   ()              ()              ())
(silica-transf   ()              ()              ())

;; Implementation of Standard DMs, Galaxies.
;; Implementation of general event handling model
(silica-dm       ()              ()              ())
; (silica-event    ()              ()              ())
(silica-connect  ()              ()              ())
(silica-galaxy   ()              ()              ())

;; ABC Graphics Package
(silica-abc      ()              ()              ())

;; These files contains the heart and lungs of Silica.
;; Heart and Lungs of Silica based on abstract models.
;; Nothing in these file should be arm or leg dependent.
;; Remember: Window System = Windowing + Output + Input.  Therefore
;; Kernel provides mechanisms for putting these three pieces of
;; functionality together.

(silica-model    ()              ()              ())
(silica-plane    ()              ()              ())
(silica-window   ()              ()              ())
(silica-output   ()              ()              ())
(silica-input    ()              ()              ())
(silica-kernel   ()              ()              ())

(on-xerox        ()              ()              ()              xerox)
(dm-il           ()              ()              ()              xerox)

(on-clx          ()              ()              ()              clx)
(clx-rband       ()              ()              ()              clx)
(dm-x            ()              ()              ()              clx)

(silica-debug    ()              ()              ())

(stk-pkg         ()              ()              ())
(stk-contracts   ()              ()              ())
(stk-objects     ()              ()              ())
(stk-desk        ()              ()              ())
(test-silica     ()              ()              ())
(test-stk        ()              ()              ())
(demo-ico        ()              ()              ())
(demo-hanoi      ()              ()              ())

))

(defun compile-silica (&optional m)
  (cond ((null m)       (operate-on-system 'silica :compile))
        ((eq m t)       (operate-on-system 'silica :compile-load))
        ((eq m :print)  (operate-on-system 'silica :compile () t))
        ((eq m :query)  (operate-on-system 'silica :query-compile))
        ((eq m :confirm) (operate-on-system 'silica :confirm-compile))
        ((eq m :recompile) (operate-on-system 'silica :recompile))
        ((eq m :rload)  (operate-on-system 'silica :recompile-load))
        ((listp m)      (operate-on-system 'silica :compile-from m))
        ((symbolp m)    (operate-on-system 'silica :recompile-some '(.m)))))

(defun load-silica (&optional m)
  (cond ((null m)       (operate-on-system 'silica :load))
        ((eq m t)       (operate-on-system 'silica :update-load))
        ((eq m :rload)  (operate-on-system 'silica :recompile-load))
        ((eq m :query)  (operate-on-system 'silica :query-load))))

;;;
;;; Automatic Loading
;;;

(defvar *load-silica* nil)
```

```
(eval-when (load)
  (when *load-silica*
    (load-silica)
    (format *terminal-io*
            "~%; ~A Copyright (c)~{ ~D,~} by ~A. All rights reserved.~%"
            "SILICA" '(1987 1988)
            "Xerox Corporation")))
```

;;; -*- Mode: Lisp; Package: User; Base: 10.; Syntax: Common-Lisp -*-
;;;
;;; Silica's Defsystem copied from PCL
;;;
;;; Copyright (c) 1988 by Xerox Corporation. All rights reserved.
;;;

```
(in-package "CL-EXTRA" :use '("LISP"))
(provide "CLMAKE")
(export '(defsystem operate-on-system *port*))
```

;;; Yet Another Sort Of General System Facility and friends.
;;;
;;; The entry points are defsystem and operate-on-system. defsystem is used
;;; to define a new system and the files with their load/compile constraints.
;;; Operate-on-system is used to operate on a system defined that has been
;;; defined by defsystem. For example:
||

```
(defsystem my-very-own-system
           "/usr/myname/lisp/"
  ((classes  (precom)           ()               ())
   (methods  (precom classes)   (classes)        ())
   (precom   ()                 (classes methods) (classes methods))))
```

This defsystem should be read as follows:

* Define a system named MY-VERY-OWN-SYSTEM, the sources and binaries
  should be in the directory "/usr/me/lisp/". There are three files
  in the system, there are named classes, methods and precom. (The
  extension the filenames have depends on the lisp you are running in.)

* For the first file, classes, the (precom) in the line means that
  the file precom should be loaded before this file is loaded. The
  first () means that no other files need to be loaded before this
  file is compiled. The second () means that changes in other files
  don't force this file to be recompiled.

* For the second file, methods, the (precom classes) means that both
  of the files precom and classes must be loaded before this file
  can be loaded. The (classes) means that the file classes must be
  loaded before this file can be compiled. The () means that changes
  in other files don't force this file to be recompiled.

* For the third file, precom, the first () means that no other files
  need to be loaded before this file is loaded. The first use of
  (classes methods) means that both classes and methods must be
  loaded before this file can be compiled. The second use of (classes
  methods) mean that whenever either classes or methods changes precom
  must be recompiled.

Then you can compile your system with:

(operate-on-system 'my-very-own-system :compile)

and load your system with:

(operate-on-system 'my-very-own-system :load)

||#

;;;
(defvar *system-directory*)

;;;
;;; *port* is a list of symbols (in the PCL package) which represent the
;;; Common Lisp in which we are now running. Many of the facilities in
;;; defsys use the value of *port* rather than #+ and #- to conditionalize

```
;;; the way they work.
;;;
(defvar *port*
        '(#+Genera                  Genera
          #+Genera-Release-6        Rel-6
          #+Genera-Release-7-1      Rel-7-1
          #+Genera-Release-7-2      Rel-7-2
          #+Lucid                   Lucid
          #+Xerox                   Xerox
          #+TI                      TI
          #+(and dec vax common)    Vaxlisp
          #+KCL                     KCL
          #+excl                    excl
          #+:CMU                    CMU
          #+HP                      HP
          #+:gclisp                 gclisp
          #+pyramid                 pyramid
          #+:coral                  coral))

;;;
;;; When you get a copy of PCL (by tape or by FTP), the sources files will
;;; have extensions of ".lisp" in particular, this file will be defsys.lisp.
;;; The preferred way to install pcl is to rename these files to have the
;;; extension which your lisp likes to use for its files.  Alternately, it
;;; is possible not to rename the files.  If the files are not renamed to
;;; the proper convention, the second line of the following defvar should
;;; be changed to:
;;;       (let ((files-renamed-p nil)
;;;
;;; Note: Something people installing PCL on a machine running Unix
;;;       might find useful.  If you want to change the extensions
;;;       of the source files from ".lisp" to ".lsp", *all* you have
;;;       to do is the following:
;;;
;;;       % foreach i (*.lisp)
;;;       ? mv $i $i:r.lsp
;;;       ? end
;;;       %
;;;
;;;       I am sure that a lot of people already know that, and some
;;;       Unix hackers may say, "jeez who doesn't know that".  Those
;;;       same Unix hackers are invited to fix mv so that I can type
;;;       "mv *.lisp *.lsp".
;;;
(defvar *pathname-extensions*
  (let ((files-renamed-p t)
        (proper-extensions
          (car
            '(#+Genera                              ("lisp"  . "bin")
              #+(and dec common vax (not ultrix))   ("LSP"   . "FAS")
              #+(and dec common vax ultrix)         ("lsp"   . "fas")
              #+KCL                                 ("lsp"   . "o")
              #+Xerox                               ("lisp"  . "dfasl")
              #+(and Lucid MC68000)                 ("lisp"  . "lbin")
              #+(and Lucid VAX)                     ("lisp"  . "vbin")
              #+(and Lucid Prime)                   ("lisp"  . "pbin")
              #+(and Lucid SUNRise)                 ("lisp"  . "sbin")
              #+(and Lucid IBM-RT-PC)               ("lisp"  . "bbin")
              #+(and excl allegro)                  ("lisp"  . "fasl")
              #+(and excl (not allegro))            ("cl"    . "fasl")
              #+:CMU                                ("slisp" . "sfasl")
              #+HP                                  ("l"     . "b")
              #+TI ("lisp" . #.(string (si::local-binary-file-type)))
              #+:gclisp                             ("LSP"   . "F2S")
              #+pyramid                             ("clisp" . "o")
              #+:coral                              ("lisp"  . "fasl")
              ))))
    (cond ((null proper-extensions) '("l" . "lbin"))
          ((null files-renamed-p) (cons "lisp" (cdr proper-extensions)))
          (t proper-extensions))))

(eval-when (compile load eval)

(defun get-system (name)
  (get name 'system-definition))

(defun set-system (name new-value)
  (setf (get name 'system-definition) new-value))
```

```
(defmacro defsystem (name directory files)
  '(set-system ',name (list #'(lambda () ,directory)
                            (make-modules ',files)
                            ',(mapcar #'car files))))

)

;;;
;;; The internal datastructure used when operating on a system.
;;;
(defstruct (module (:constructor make-module (name))
                   (:print-function
                     (lambda (m s d)
                       (declare (ignore d))
                       (format s "#<Module ~A>" (module-name m)))))
  name
  load-env
  comp-env
  recomp-reasons)

(defun make-modules (system-description)
  (let ((modules ()))
    (labels ((get-module (name)
               (or (find name modules :key #'module-name)
                   (progn (setq modules (cons (make-module name) modules))
                          (car modules))))
             (parse-spec (spec)
               (if (eq spec 't)
                   (reverse (cdr modules))
                   (mapcar #'get-module spec))))
      (dolist (file system-description)
        (let* ((name (car file))
               (port (car (cddddr file)))
               (module nil))
          (when (or (null port)
                    (member port *port*))
            (setq module (get-module name))
            (setf (module-load-env module) (parse-spec (cadr file))
                  (module-comp-env module) (parse-spec (caddr file))
                  (module-recomp-reasons module) (parse-spec
                                                   (cadddr file))))))
      (let ((filenames (mapcar #'car system-description)))
        (sort modules #'(lambda (name1 name2)
                          (member name2 (member name1 filenames)))
              :key #'module-name)))))

(defun make-transformations (modules filter make-transform)
  (let ((transforms (list nil)))
    (dolist (m modules)
      (when (funcall filter m transforms)
        (funcall make-transform m transforms)))
    (reverse (cdr transforms))))

(defun make-compile-transformation (module transforms)
  (unless (dolist (trans transforms)
            (and (eq (car trans) ':compile)
                 (eq (cadr trans) module)
                 (return trans)))
    (dolist (c (module-comp-env module))
      (make-load-transformation c transforms))
    #+genera-release-6 (make-load-transformation module transforms)
    (push '(:compile ,module) (cdr transforms)))
  transforms)

(defun make-load-transformation (module transforms)
  (unless (dolist (trans transforms)
            (when (eq (cadr trans) module)
              (cond ((eq (car trans) ':compile) (return nil))
                    ((eq (car trans) ':load)    (return trans)))))
    (dolist (l (module-load-env module))
      (make-load-transformation l transforms))
    (push '(:load ,module) (cdr transforms)))
  transforms)

(defun make-load-without-dependencies-transformation (module transforms)
```

```
    (unless (dolist (trans transforms)
              (and (eq (car trans) ':load)
                   (eq (cadr trans) module)
                   (return trans)))
      (push '(:load ,module) (cdr transforms)))
    transforms)

(defun make-compile-load-transformation (module transforms)
  (make-compile-transformation module transforms)
  (make-load-transformation module transforms)
  transforms)

(defun compile-filter (module transforms)
  (or (dolist (r (module-recomp-reasons module))
        (when (dolist (transform transforms)
                (when (and (eq (car transform) ':compile)
                           (eq (cadr transform) r))
                  (return t)))
          (return t)))
      (null (probe-file (make-binary-pathname (module-name module))))
      (> (file-write-date (make-source-pathname (module-name module)))
         (file-write-date (make-binary-pathname (module-name module))))))

(defun operate-on-system (name mode &optional arg print-only)
  (let ((system (get-system name)))
    (unless system (error "Can't find system with name ~S." name))
    (let ((*system-directory* (funcall (car system)))
          (modules (cadr system))
          (transformations ()))
      (labels ((load-source (name pathname)
                 (format t "~&Loading source of ~A..." name)
                 (or print-only (load pathname)))
               (load-binary (name pathname)
                 (format t "~&Loading binary of ~A..." name)
                 (or print-only (load pathname)))

(load-module (m)
                 (let* ((name (module-name m))
                        (*load-verbose* nil)
                        (source (make-source-pathname name))
                        (binary (make-binary-pathname name)))
                   (if (dolist (trans transformations)
                         (and (eq (car trans) :compile)
                              (eq (cadr trans) m)
                              (return trans)))
                       (cond ((null (probe-file binary))
                              (load-source name source))
                             ((null (probe-file source))
                              (load-binary name binary))
                             ((not
                                (yes-or-no-p
                                  "The definition of this system requires ~
                                   that the module ~A be loaded now even~%~
                                   though it will later be compiled.  Should ~
                                   the existing binary version be loaded ~%~
                                   instead of the source?"
                                  name))
                              (load-source name source))
                             (t
                              (load-binary name binary)))
                       (load-binary name binary))))

(compile-module (m)
                 (format t "~&Compiling ~A..." (module-name m))
                 (unless print-only
                   (let ((name (module-name m)))
                     (compile-file (make-source-pathname name)
                                   :output-file
                                   (make-binary-pathname name)))))

(true (&rest ignore) (declare (ignore ignore)) 't))

(setq transformations
              (ecase mode
```

-xerox
-xerox

```
(:compile-load
  (make-transformations
    modules
    #'compile-filter
    #'make-compile-load-transformation))
(:compile
  ;; Compile any files that have changed and any other files
  ;; that require recompilation when another file has been
  ;; recompiled.
  (make-transformations
    modules
    #'compile-filter
    #'make-compile-transformation))
(:recompile-load
  (make-transformations
    modules
    #'true
    #'make-compile-load-transformation))
(:recompile
  ;; Force recompilation of all files.
  (make-transformations
    modules
    #'true
    #'make-compile-transformation))
(:recompile-some
  ;; Force recompilation of some files. Also compile the
  ;; files that require recompilation when another file has
  ;; been recompiled.
  (make-transformations
    modules
    #'(lambda (m transforms)
        (or (member (module-name m) arg)
            (compile-filter m transforms)))
    #'make-compile-transformation))
(:query-compile
  ;; Ask the user which files to compile. Compile those
  ;; and any other files which must be recompiled when
  ;; another file has been recompiled.
  (make-transformations
    modules
    #'(lambda (m transforms)
        (or (compile-filter m transforms)
            (y-or-n-p "Compile ~A?"
                      (module-name m))))
    #'make-compile-transformation))
(:confirm-compile
  ;; Offer the user a chance to prevent a file from being
  ;; recompiled.
  (make-transformations
    modules
    #'(lambda (m transforms)
        (and (compile-filter m transforms)
             (y-or-n-p "Go ahead and compile ~A?"
                       (module-name m))))
    #'make-compile-transformation))
(:load
  ;; Load the whole system.
  (make-transformations
    modules
    #'true
    #'make-load-transformation))
(:update-load
  ;; Load the whole system.
  (make-transformations
    modules
    #'true
    #'(lambda (m transforms)
        (if (compile-filter m transforms)
            (make-compile-load-transformation m transforms)
            (make-load-transformation m transforms)))))
(:query-load
  ;; Load only those files the user says to load.
  (make-transformations
    modules
    #'(lambda (m transforms)
```

```
              (declare (ignore transforms))
              (y-or-n-p "Load ~A?" (module-name m)))
          #'make-load-without-dependencies-transformation))))

(#+Genera
     compiler:compiler-warnings-context-bind
     #+TI
     COMPILER:COMPILER-WARNINGS-CONTEXT-BIND
     #+:LCL3.0
     lucid-common-lisp:with-deferred-warnings
     #-(or Genera TI :LCL3.0)
     progn
     (loop (when (null transformations) (return t))
           (let ((transform (pop transformations)))
              (ecase (car transform)
                 (:compile (compile-module (cadr transform)))
                 (:load (load-module (cadr transform))))))))))

(defun make-source-pathname (name) (make-pathname-internal name :source))
(defun make-binary-pathname (name) (make-pathname-internal name :binary))

(defun make-pathname-internal (name type)
  (let* ((extension (ecase type
                      (:source (car *pathname-extensions*))
                      (:binary (cdr *pathname-extensions*))))
         (directory (pathname
                      (etypecase *system-directory*
                         (string *system-directory*)
                         (pathname *system-directory*)
                         (cons (ecase type
                                 (:source (car *system-directory*))
                                 (:binary (cdr *system-directory*))))))))
         (pathname
           (make-pathname
              :name (string-downcase (string name))
              :type extension
              :defaults directory)))

#+Genera
    (setq pathname (zl:send pathname :new-raw-name (pathname-name pathname))
          pathname (zl:send pathname :new-raw-type (pathname-type pathname)))

pathname))
;;; -*- Mode: Lisp; Package: CL-EXTRA; Base: 10.; Syntax: Common-Lisp -*-
;;;
;;; File converted on 19-May-88 17:14:53 from source resources
;;; Original source {nb:parc:xerox}<silica>resources.;1 created  7-Apr-88 08:42:26
;;;
;;; Copyright (c) 1988 by Xerox Corporation. All rights reserved.
;;;

(in-package "CL-EXTRA")

;;; Defines a resource allocator, for explict allocation/deallocation of
;;; objects that would normally be too expensive to create.

(provide "RESOURCES")
(export
  '(defresource allocate-resource deallocate-resource clear-resource
    map-resource using-resource
    ;; Export the Filemanager type in Xerox Lisp.
    #+xerox resources))

(defvar *user-resources* (make-hash-table :test #'eq)
    "Table of resource name to resources.")

(defmacro resource-named (name)
  "Retrieves the resource type associated with name"
  `(gethash ,name *user-resources*))

(defstruct (resource (:constructor make-resource)
                     (:conc-name #-allegro "RESOURCE-"
                                 #+allegro resource-)
                     (:print-function print-resource)
                     (:copier nil)
                     (:predicate nil))
```

```
"A definition of a RESOURCE."
(name nil)
(free-list nil :type list)
create-fn match-fn initialize-fn deinitialize-fn)

(defstruct (resource-entry (:constructor make-resource-entry)
                           (:conc-name #-allegro "RESOURCE-ENTRY-"
                                       #+allegro resource-entry-)
                           (:print-function print-resource-entry)
                           (:copier nil)
                           (:predicate nil))
  "Entry in a resource table." value in-use-p parameters)

(defun print-resource (resource stream depth)
  (declare (ignore depth))
  (format stream "#<~S ~S>" 'resource (resource-name resource)))

(defun print-resource-entry (entry stream depth)
  (declare (ignore depth))
  (flet ((print-address (object stream)
                   (format stream "~O,~O"
                           ;; Need a portable way of doing this
                           ;; kind of object to uid (ptr).
                           #+xerox (il:\\hiloc entry)
                           #-xerox 69
                           #+xerox (il:\\loloc entry)
                           #-xerox 96
                           )))
    (format stream "#<~S ~S @ " 'resource-entry (resource-entry-value
                                                 entry))
    (print-address entry stream)
    (format stream ">")))

(defmacro
    #+xerox defresource-internal
    #-xerox defresource
    (name parameters
          &key
          (constructor nil constructor-provided-p)
          (matcher nil matcher-provided-p)
          (initializer nil initializer-provided-p)
          (deinitializer nil deinitializer-provided-p)
          (initial-copies 0))

;; Check to make sure the arguments are kosher.
  (assert constructor-provided-p nil "~%No ~S option given to ~S." :constructor
          'defresource)
  (check-type parameters list)
  (check-type constructor (or symbol list))
  (check-type matcher (or symbol list))
  (check-type initializer (or symbol list))
  (check-type deinitializer (or symbol list))
  (check-type initial-copies integer)

;; OK, go to it.
  (flet
      ((make-function (args form)
                (if (symbolp form)
                    form
                    '(lambda ,args ,form))))
    (let ((create-fn (make-symbol "CREATE-FN"))
          (match-fn (make-symbol "MATCH-FN"))
          (initialize-fn (make-symbol "INITIALIZE-FN"))
          (deinitialize-fn (make-symbol "DEINITIALIZE-FN"))
          (object (intern "OBJECT"))
          (entries (make-symbol "ENTRIES")))
      '(let* ((,create-fn #',(make-function parameters constructor))
              (,match-fn (when ',matcher-provided-p
                           #',(make-function '(,object ,@parameters)
                                             matcher)))
              (,initialize-fn
                (when ',initializer-provided-p
                  #',(make-function '(,object ,@parameters)
                                    initializer)))
              (,deinitialize-fn
```

```
              (when ',deinitializer-provided-p
                    #',(make-function '(,object)
                                  deinitializer))))
        (setf (resource-named ',name)
              (make-resource :name ',name :create-fn ,create-fn :match-fn
                             ,match-fn :initialize-fn ,initialize-fn
                             :deinitialize-fn ,deinitialize-fn :free-list
                             (let ((,entries nil))
                               (dotimes (i ',initial-copies)
                                 (push (apply ,create-fn nil)
                                       ,entries))
                               ,entries)))
        ',name)))

(defun allocate-resource (resource-name
                          &rest parameters
                          &aux (resource (resource-named resource-name)))
  (let* ((entry (dolist (entry (resource-free-list resource)

;; Couldn't find a matching one, so need
                         ;; to create a new one.
                         (car (push (make-resource-entry
                                      :value
                                      (apply (resource-create-fn
                                               resource)
                                             parameters)
                                      :in-use-p t :parameters
                                      ; Be careful here
                                      (copy-tree parameters))
                                    (resource-free-list resource))))
                  (when (and (not (resource-entry-in-use-p entry))
                             (if (resource-match-fn resource)
                                 (apply (resource-match-fn resource)
                                        (resource-entry-value entry)
                                        parameters)
                                 (equal (resource-entry-parameters
                                          entry)
                                        parameters)))
                    (setf (resource-entry-in-use-p entry)
                          t)
                    (return entry))))
         (object (resource-entry-value entry)))
    (when (resource-initialize-fn resource)
      (apply (resource-initialize-fn resource)
             object parameters))
    object))

(defun deallocate-resource (resource-name object
                            &aux (resource (resource-named
                                             resource-name)
                                  ))
  (dolist (entry (resource-free-list resource)
           (error "~%Attempt to free a resource that was not allocated."))
    (when (eq object (resource-entry-value entry))
      (if (resource-entry-in-use-p entry)
          (progn (when (resource-deinitialize-fn resource)
                   (funcall (resource-deinitialize-fn resource)
                            object))
                 (setf (resource-entry-in-use-p entry)
                       nil)
                 (return))
          (error "~%Attempt to free a resource that is not in use.")))))

(defun clear-resource (resource-name &aux (resource (resource-named
                                                      resource-name)))
  (setf (resource-free-list resource)
        nil))

(defun map-resource (resource-name function &rest args &aux resource)
  (dolist (entry (resource-free-list resource))
    (apply function (resource-entry-value entry)
           (resource-entry-in-use-p entry)
           resource-name args)))

(defmacro using-resource ((var resource-name . parameters)
                          &body forms)
```

```
  (let ((name (make-symbol "RESOURCE-NAME")))
    `(let* ((,name ,resource-name)
            (,var (allocate-resource ,name ,@parameters)))
       (unwind-protect
           (progn ,@forms)
         (deallocate-resource ,name ,var)))))
```

```
;;;
;;; XEROX Environment Support
;;;

#+xerox
(xcl:def-define-type resources "Resources")

#+xerox
(xcl:defdefiner defresource resources (&rest args)
  `(defresource-internal ,@args))

#+xerox
(setf (get 'defresource 'il:argnames)
      '(nil (name parameters &key constructor matcher initializer
                  initial-copies)))

#+xerox
(setf (get 'using-resource 'il:argnames)
      '(nil ((var resource-name #\{ parameter #\} #\*)
             #\{ form #\} #\*)))
```

```
;;; -*- Mode: Lisp; Package: SILICA; Base: 10.; Syntax: Common-Lisp -*-
;;;
;;;
;;; Copyright (c) 1987, 1988 by Xerox Corporation.  All rights reserved.
;;;

;;;
;;; SILICA UTILITIES
;;;

(in-package "SILICA")

;;;
;;; COMMONLISP Extensions
;;;

(export '(once-only boolean true false assq put-assq memq delq))
(export '(with-collection collect))

(defmacro once-only (vars &body body)
  (let ((gensym-var (gensym))
        (run-time-vars (gensym))
        (run-time-vals (gensym))
        (expand-time-val-forms nil))
    (dolist (var vars)
      (push `(if (or (symbolp ,var)
                     (numberp ,var)
                     (and (listp ,var)
                          (member (car ,var)
                                  ''function)))
                 ,var
                 (let ((,gensym-var (gensym)))
                   (push ,gensym-var ,run-time-vars)
                   (push ,var ,run-time-vals)
                   ,gensym-var))
            expand-time-val-forms))
    `(let* (,run-time-vars
            ,run-time-vals
            (wrapped-body (let ,(mapcar #'list vars
                                              (reverse
                                                expand-time-val-forms
                                              ))
                            ,@body)))
       `(let ,(mapcar #'list (reverse ,run-time-vars)
                             (reverse ,run-time-vals))
          ,wrapped-body))))

(deftype boolean nil '(member nil t))
```

```
(defun true (&rest ignore)
  (declare (ignore ignore))
  t)

(defun false (&rest ignore)
  (declare (ignore ignore))
  nil)

(defmacro assq (item list)
       '(assoc ,item ,list :test #'eq))

(defmacro put-assq (item new-value list)
       (let ((place list)
             (local--entry (gensym)))
            (once-only (list new-value)
                  '(let ((,local--entry (assq ,item ,list)))
                        (if ,local--entry
                            (progn (setf (cdr ,local--entry)
                                         ,new-value)
                                   ,list)
                            (setf ,place (acons ,item ,new-value ,list)))))))

(defmacro alist-entry (alist key make-entry-fn)
       (once-only (alist key)
             '(or (assq ,key ,alist)
                  (progn (setf ,alist (cons (,make-entry-fn ,key)
                                            ,alist))
                         (car ,alist)))))

(defmacro delq (item list)
  '(delete ,item ,list :test #'eq))

(defmacro memq (item list)
  '(member ,item ,list :test #'eq))

(defmacro neq (x y)
  '(not (eq ,x ,y)))

(defmacro rassq (item list)
  '(rassoc ,item ,list :test #'eq))

(defmacro with-collection (&body body)
  (let ((var (gensym)))
    '(let ((,var nil))
       (macrolet ((collect (x)
                          '(push ,x ,',var)))
                 (progn (progn ,@body)
                        (reverse ,var))))))

(defun symbol-conflicts (&optional (pkg *package*))
  (let ((pkg (find-package "SILICA"))
        (them))
    (do-symbols (sym (find-package "DM-IL")
                     them)
                (multiple-value-bind (there? how?)
                                     (find-symbol (symbol-name sym)
                                                  pkg)
                  (if (and there? (eq how? :internal))
                      (push sym them))))))

(defun export-groups (groups package)
  (dolist (name groups)
    (if (listp name)
        (export-groups name package)
        (export (intern name package)
                package))))

;;;
;;; Stub Sealers
;;;

(export '(unimplemented protocol-holder warn-obsolete))

(defun unimplemented (&optional (string "So who you goin' call"))
  (error "Unimplemented: ~s." string))
```

```lisp
(defmacro protocol-holder (&optional (protocol-name "Some"))
  '(error "~a Protocol is not properly implemented." ,protocol-name))

(defun warn-obsolete (fn)
  (warn "Obsoleted Call: ~a" fn))

;;;
;;; Needs to be in a "low" file
;;;

(defclass kernel-object () ())
;;; -*- Mode: Lisp; Package: PCL; Base: 10.; Syntax: Common-Lisp -*-
;;; Copyright (c) 1987, 1988 by Xerox Corporation.  All rights reserved.

;;;
;;; SILICA CLOS Extensions - adaptations of CLOS to meet SILICA's needs.
;;;

(in-package "PCL")

;;;
;;; Should/will be in CLOS
;;;

(export '(*initialize-instance *make-instance class-prototype))
(defmacro defgeneric (&rest args)
  )

;;;
;;; Dynamic Class Creation
;;;

(defvar *on-the-fly-classes*
  (make-hash-table :test #'equal :size 200))

(export 'get-on-the-fly-class)
(defun get-on-the-fly-class (name &rest supers)
  (let ((tail supers))
    (loop
      (cond ((null tail)
             (return t))
            ((classp (car tail))
             (pop tail))
            ((symbolp (car tail))
             (setf (car tail)
                   (find-class (car tail))))
            (t (error "~S appeared in the list of on-the-fly class supers.~%~
                       All the supers should be classes or class names."
                      (car tail))))))
  (let ((class (gethash supers *on-the-fly-classes*)))
    (unless class ;; If there is no entry for an on-the-fly class with these supers
      ;; then we have to create one. This involves creating the class,
      ;; setting its supers and adding the entry to *on-the-fly-classes*.

(setq class (make-instance 'standard-class))
      (update-class class :direct-superclasses supers)
      (setf (class-name class)
            name)
      (setf (gethash supers *on-the-fly-classes*)
            class))
    class))

;;;
;;; Sundries..
;;;

(defun classes-in-package (package &optional map-on-package)
  (let ((classes))
    (unless (packagep package)
      (setq package (find-package package)))
    (if map-on-package
        (do-symbols (sym package)
          (if (and (eq (symbol-package sym)
```

```
                    package)
                  (find-class sym t))
            (push sym classes)))
        (maphash #'(lambda (key val)
                      (if (eq (symbol-package key)
                              package)
                          (push key classes)))
                 *class-name-hash-table*))
    classes))
;;; -*- Mode: Lisp; Package: SILICA; Base: 10.; Syntax: Common-Lisp -*-
;;;
;;; Copyright (c) 1988 by Xerox Corporation. All rights reserved.
;;;

;;;
;;; SILICA REGION
;;;
;;; This file contains the geometry kernel i.e. basic gemetric objects and
;;; operations needed by the Silica kernel and the ABC graphics package.
;;;

(in-package "SILICA")

;;;
;;; Regions and Positions
;;;

(defclass region ()
  ()
  (:documentation "An arbitrarily shaped region."))

(defclass position ()
  ((x :initform 0 :initarg :x
      :type number :accessor x :accessor position-x)
   (y :initform 0 :initarg :y
      :type number :accessor y :accessor position-y))
  (:documentation "A point in space"))

(defun make-position (&rest keys)
  (apply #'*make-instance 'position keys))

;;;
;;; Infinite Region
;;;

(defclass plane (region)
  ()
  (:documentation "An entire plane."))

(defun make-plane ()
  (*make-instance 'plane))

(defvar *plane* (make-plane))

;;;
;;; Rectangular region.
;;;

(defclass rectangle (region)
  ((left :initform 0 :initarg :left
         :type number :accessor left :accessor rectangle-left)
   (bottom :initform 0 :initarg :bottom
           :type number :accessor bottom :accessor rectangle-bottom)
   (width :initform 0 :initarg :width
          :type number :accessor width :accessor rectangle-width)
   (height :initform 0 :initarg :height
           :type number :accessor height :accessor rectangle-height))
  (:documentation "A Rectangular Region."))

(defun make-rectangle (&rest args)
  (apply #'*make-instance 'rectangle args))

(defmethod *initialize-instance :after
  ((r rectangle) &key left bottom width height right top &allow-other-keys)
```

```
(when (or (and left width right)
          (and bottom height top))
  (error "~%Over- specification of region size."))

;; Generates a random error if only one of three along a dimension
;;  is specified. Need exactly two from each dimension.
  (if left
      (unless width
        (setf (rectangle-width r) (1+ (- right left))))
      (setf (rectangle-left r) (1+ (- right width))))

(if bottom
      (unless height
        (setf (rectangle-height r) (1+ (- top bottom))))
      (setf (rectangle-bottom r) (1+ (- top height)))))

(defmethod rectangle-right ((region rectangle))
  (1- (+ (rectangle-left region)
         (rectangle-width region))))

(defmethod rectangle-top ((region rectangle))
  (1- (+ (rectangle-bottom region)
         (rectangle-height region))))

(defmethod right ((x rectangle))
  (1- (+ (left x)
         (width x))))

(defmethod top ((x rectangle))
  (1- (+ (bottom x)
         (height x))))

(defmethod (setf right) (new-value (rectangle rectangle))
  (setf (width rectangle)
        (1+ (- new-value)
            (left rectangle))))

(defmethod (setf top) (new-value (rectangle rectangle))
  (setf (height rectangle)
        (1+ (- new-value)
            (bottom rectangle))))
;;;
;;; Compound Regions.
;;;

(defclass compound-region (region)
  ((regions :type list
            :initform nil :initarg regions
            :accessor regions))
  (:documentation "A union of areas."))

(defun make-compound-region (&rest args)
  (apply #'*make-instance 'compound-region args))

(defmethod normalize ((ca compound-region))
  "Normailizes compound-region.
Ensures that all the sub-areas are disjoint."
  (labels ((collect-sub-areas (x)
             (etypecase x
               (plane (list x))
               (rectangle (list x))
               (compound-region (mapcan #'collect-sub-areas (regions x)))))
           (reduce-regions (pending-regions processed-regions)
             (cond ((null pending-regions) processed-regions)
                   ((region-empty? (first pending-regions))
                    (reduce-regions (rest pending-regions)
                                    processed-regions))
                   (t (let ((interecting-region (find-if
                                                 #'(lambda (a)
                                                     (region-intersect?
                                                      a
                                                      (first pending-regions)))
                                                 (rest pending-regions))))
                        (if (null interecting-region)
                            (reduce-regions (rest pending-regions)
                                            (cons (first pending-regions)
```

```
                                      processed-regions))
              (reduce-regions (nconc (reduce-region-pair (first
                                                          pending-regions
                                                          )
                                                         interecting-region)
                                     (delete interecting-region
                                             (rest pending-regions)
                                             :test
                                             #'eq))
                              processed-regions))))))
(reduce-region-pair (r1 r2)
  (delete-if #'region-empty?
             (cond
               ((region-inside? r1 (left r2) (bottom r2))

;; Lower-left corner of R2 contained in
                ;; R1
                (list r1 (make-rectangle
                           :left (left r2)
                           :bottom (1+ (top r1))
                           :top (top r2)
                           :right (right r2))
                      (make-rectangle
                        :left (1+ (right r1))
                        :bottom (bottom r2)
                        :top (top r1)
                        :right (right r2))))
               ((region-inside? r1 (left r2) (top r2))

;; Upper-left corner of R2 contained in
                ;; R1
                (list r1 (make-rectangle
                           :left (left r2)
                           :bottom (bottom r2)
                           :top (1- (bottom r1))
                           :right (right r2))
                      (make-rectangle
                        :left (1+ (right r1))
                        :bottom (bottom r1)
                        :top (top r2)
                        :right (right r2))))
               ((region-inside? r1 (right r2) (top r2))

;; Upper-right corner of R2 contained
                ;; in R1
                (list r1 (make-rectangle
                           :left (left r2)
                           :bottom (bottom r2)
                           :top (1- (bottom r1))
                           :right (right r2))
                      (make-rectangle
                        :left (left r2)
                        :bottom (bottom r1)
                        :top (top r2)
                        :right (1- (left r1)))))
               ((region-inside? r1 (right r2) (bottom r2))

;; Lower-right corner of R2 contained
                ;; in R1
                (list r1 (make-rectangle
                           :left (left r2)
                           :bottom (1+ (top r1))
                           :top (top r2)
                           :right (right r2))
                      (make-rectangle
                        :left (left r2)
                        :bottom (bottom r2)
                        :top (top r1)
                        :right (1- (left r1)))))
               ((>= (bottom r1) (bottom r2))

;; They cross like a "T", with R1 the
                ;; vertical piece
                (list r2 (make-rectangle
                           :left (left r1)
                           :bottom (bottom r1)
                           :right (1- (left r2))
```

```
                                :top (top r1))
                             (make-rectangle
                              :left (1+ (right r2))
                              :bottom (bottom r1)
                              :right (right r1)
                              :top (top r1))))
                       (t
                        ;; They cross like a "T", with R2
                        (list r2 (make-rectangle
                                   :left (left r1)
                                   :bottom (bottom r1)
                                   :right (right r1)
                                   :top (1- (bottom r2)))
                             (make-rectangle
                              :left (left r1)
                              :bottom (1+ (top r2))
                              :right (right r1)
                              :top (top r1))))))))
    (setf (regions ca)
          (reduce-regions (collect-sub-areas ca) nil)))
  ca)

(defun make-normalized-compound-region (&key regions)
  (let ((ca (normalize (make-compound-region :regions regions))))
    (cond ((null (regions ca))
           ca)
          ((null (rest (regions ca)))
           (first (regions ca)))
          (t ca))))
;;;
;;; Path Regions
;;;

(defclass path-region (region)
  ((path :type list :initform nil :accessor path-region-path)
   (rects :type list :initform nil :accessor path-region-rects)
   (out-paths :type list :initform nil :accessor path-region-out-paths)
   (out-rects :type list :initform nil :accessor path-region-out-rects)
   (odd-wind? :type boolean :initform nil :accessor path-region-odd-wind?)
   ))

(defun make-path-region (&rest args)
  (apply #'*make-instance 'path-region args))

(defmethod copy-object ((region path-region))
  (make-path-region :path (path-region-path region)
                    :out-paths (path-region-out-paths region)
                    :rects (path-region-rects region)
                    :out-rects (path-region-out-rects region)))
;;;
;;; REGION PREDICATES
;;;

(defgeneric region-empty? (region)
  (:documentation "Is the area empty?")
  )

(defmethod region-empty? ((plane plane))
  nil)

(defmethod region-empty? ((rectangle rectangle))
  (or (>= 0 (width rectangle))
      (>= 0 (height rectangle))))

(defmethod region-empty? ((ca compound-region))
  (every #'region-empty? (regions ca)))

(defgeneric region-inside? (region x y)
  (:documentation))

(defmethod region-inside? ((region rectangle) x y)
  (and (<= (rectangle-left region) x)
       (< x (+ (rectangle-left region) (rectangle-width region)))
       (<= (rectangle-bottom region) y)
       (< y (+ (rectangle-bottom region) (rectangle-height region)))))
```

```
(defmethod region-inside? ((region path-region) x y)
  nil)

(defmethod region-contains? ((p plane) (position position))
  t)

(defmethod region-contains? ((rectangle rectangle) (position position))
  (and (>= (x position) (left rectangle))
       (<= (x position) (right rectangle))
       (>= (y position) (bottom rectangle))
       (<= (y position) (top rectangle))))

(defmethod region-contains? ((ca compound-region)
                             (position position))
  (some #'(lambda (region)
            (region-contains? region position))
        (regions ca)))

(defmethod region-contains? ((path-region path-region)
                             (position position))
  nil)

(defmethod region-intersect? ((region region) (plane plane))
  (not (region-empty? region)))

(defmethod region-intersect? ((plane plane) (region region))
  (not (region-empty? region)))

(defmethod region-intersect? ((ca compound-region) (p plane))
  (not (region-empty? ca)))

(defmethod region-intersect? ((x rectangle) (y rectangle))
  "Do the two regions meet?"
  (not (or (> (left x) (right y))
           (> (left y) (right x))
           (> (bottom x) (top y))
           (> (bottom y) (top x)))))

(defmethod region-intersect? ((region region) (ca compound-region))
  (some #'(lambda (sub-area)
            (region-intersect? region sub-area))
        (regions ca)))

(defmethod region-intersect? ((ca compound-region) (region region))
  (some #'(lambda (sub-area)
            (region-intersect? sub-area region))
        (regions ca)))
;;;
;;; Region Operations
;;;

(defmethod region-union ((p plane) (a region))
  "Compute the join of two areas."
  p)

(defmethod region-union ((a region) (p plane))
  "Compute the join of two areas."
  p)

(defmethod region-union ((a1 region) (a2 region))
  (make-normalized-compound-region :regions (list a1 a2)))

(defmethod region-intersection ((p plane) (a region))
  a)

(defmethod region-intersection ((a region) (p plane))
  a)

(defmethod region-intersection ((ca compound-region) (p plane))
  ca)

(defmethod region-intersection ((x rectangle) (y rectangle))
  "Return the area that is the interection of the two regions."
  (let ((left (max (left x) (left y)))
        (bottom (max (bottom x) (bottom y)))
        (right (min (right x) (right y)))
        (top (min (top x) (top y))))
```

```
        (make-rectangle :left left :bottom bottom
                        :width (max 0 (1+ (- right left)))
                        :height (max 0 (1+ (- top bottom)))))))

(defmethod region-intersection ((ca compound-region) (region region))
  (reduce #'region-union (mapcar #'(lambda (reg)
                                     (region-intersection reg region))
                                 (regions ca))))

(defmethod region-intersection ((region region) (ca compound-region))
  (reduce #'region-union (mapcar #'(lambda (reg)
                                     (region-intersection reg region) )
                                 (regions ca))))

(defmethod region-intersection ((region path-region) (rect rectangle))
  (let ((new (copy-object region)))
    (push rect (path-region-rects new))
    new))

(defmethod region-intersection ((rect rectangle) (region path-region))
  (let ((new (copy-object region)))
    (push rect (path-region-rects new))
    new))

(defmethod region-difference ((p plane) (a region))
  (error "~%Sorry, can't have arbitrary unbounded areas, yet."))

(defmethod region-difference ((a region) (p plane))
  (make-compound-region))

(defmethod region-difference ((ca compound-region) (p plane))
  (make-compound-region))

(defmethod region-difference ((r1 rectangle) (r2 rectangle))
  (if (region-intersect? r1 r2)
      (make-normalized-compound-region
        :regions
        (let ((sw-corner-p (region-inside? r1 (left r2) (bottom r2)))
              (nw-corner-p (region-inside? r1 (left r2) (top r2)))
              (ne-corner-p (region-inside? r1 (right r2) (top r2)))
              (se-corner-p (region-inside? r1 (right r2) (bottom r2))))
          (cond ((and sw-corner-p nw-corner-p ne-corner-p se-corner-p)

;; R2 contained in R1
                 (list (make-rectangle :left (left r1)
                                       :bottom (bottom r1)
                                       :top (1- (bottom r2))
                                       :right (right r1))
                       (make-rectangle :left (left r1)
                                       :bottom (1+ (top r2))
                                       :top (top r1)
                                       :right (right r1))
                       (make-rectangle :left (left r1)
                                       :bottom (bottom r2)
                                       :top (top r2)
                                       :right (1- (left r2)))
                       (make-rectangle :left (1+ (right r2))
                                       :bottom (bottom r2)
                                       :top (top r2)
                                       :right (right r1))))

;; Can't have exactly three corners of R2 contained in
                ;; R1, since rectangles are convex. In fact, can't
                ;; have only diagonally opposite corners of R2
                ;; contained in R1. So... we next test for adjacent
                ;; corners.
                ((and sw-corner-p nw-corner-p)

;; Left edge of R2 contained in R1
                 (list (make-rectangle :left (left r1)
                                       :bottom (bottom r1)
                                       :top (1- (bottom r2))
                                       :right (right r1))
                       (make-rectangle :left (left r1)
                                       :bottom (1+ (top r2))
                                       :top (top r1)
                                       :right (right r1))
```

```
                    (make-rectangle :left (left r1)
                                    :bottom (bottom r2)
                                    :top (top r2)
                                    :right (1- (left r2)))))
((and ne-corner-p se-corner-p)

;; Right edge of R2 contained in R1
 (list (make-rectangle :left (left r1)
                       :bottom (bottom r1)
                       :top (1- (bottom r2))
                       :right (right r1))
       (make-rectangle :left (left r1)
                       :bottom (1+ (top r2))
                       :top (top r1)
                       :right (right r1))
       (make-rectangle :left (1+ (right r2))
                       :bottom (bottom r2)
                       :top (top r2)
                       :right (right r1))))
((and sw-corner-p se-corner-p)

;; Bottom edge of R2 contained in R1
 (list (make-rectangle :left (left r1)
                       :bottom (bottom r1)
                       :top (top r1)
                       :right (1- (left r2)))
       (make-rectangle :left (left r2)
                       :bottom (bottom r1)
                       :top (1- (bottom r2))
                       :right (right r2))
       (make-rectangle :left (1+ (right r2))
                       :bottom (bottom r1)
                       :top (top r1)
                       :right (right r1))))
((and nw-corner-p ne-corner-p)

;; Top edge of R2 contained in R1
 (list (make-rectangle :left (left r1)
                       :bottom (bottom r1)
                       :top (top r1)
                       :right (1- (left r2)))
       (make-rectangle :left (left r2)
                       :bottom (1+ (top r2))
                       :top (top r1)
                       :right (right r2))
       (make-rectangle :left (1+ (right r2))
                       :bottom (bottom r1)
                       :top (top r1)
                       :right (right r1))))

;; If we got this far, no edge of R2 is contained in R1
(sw-corner-p

;; Only lower-left corner of R2 contained in R1
 (list (make-rectangle :left (left r1)
                       :bottom (bottom r1)
                       :top (top r1)
                       :right (1- (left r2)))
       (make-rectangle :left (left r2)
                       :bottom (bottom r1)
                       :top (1- (bottom r2))
                       :right (right r1))))
(nw-corner-p ;; Only upper-left corner of R2 contained in R1
 (list (make-rectangle :left (left r1)
                       :bottom (bottom r1)
                       :top (top r1)
                       :right (1- (left r2)))
       (make-rectangle :left (left r2)
                       :bottom (1+ (top r2))
                       :top (top r1)
                       :right (right r1))))
(ne-corner-p ;; Only upper-right corner of R2 contained in R1
 (list (make-rectangle :left (1+ (right r2))
```

```
                                        :bottom (bottom r1)
                                        :top (top r1)
                                        :right (right r1))
                        (make-rectangle :left (left r1)
                                        :bottom (1+ (top r2))
                                        :top (top r1)
                                        :right (right r2))))
              (se-corner-p ;; Only lower-right corner of R2 contained in R1
               (list (make-rectangle :left (1+ (right r2))
                                     :bottom (bottom r1)
                                     :top (top r1)
                                     :right (right r1))
                     (make-rectangle :left (left r1)
                                     :bottom (bottom r1)
                                     :top (1- (bottom r2))
                                     :right (right r2))))
              ((or (<= (bottom r1) (bottom r2))
                   (>= (top r1) (top r2)))

;; They cross like a "T", with R1 the vertical piece.
                                      ; One of these might be empty,
                                      ; but that's OK, it'll get
                                      ; filtered out later.
               (list (make-rectangle :left (left r1)
                                     :bottom (bottom r1)
                                     :right (right r1)
                                     :top (1- (bottom r2)))
                     (make-rectangle :left (left r1)
                                     :bottom (1+ (top r2))
                                     :right (right r1)
                                     :top (top r1))))
              ((or (<= (left r1) (left r2))
                   (>= (right r1) (right r2)))

;; They cross like a "T", with R2 the vertical piece.
                                      ; One of these might be empty,
                                      ; but that's OK, it'll get
                                      ; filtered out later.
               (list (make-rectangle :left (left r1)
                                     :bottom (bottom r1)
                                     :right (1- (left r2))
                                     :top (top r1))
                     (make-rectangle :left (1+ (right r2))
                                     :bottom (bottom r1)
                                     :right (right r1)
                                     :top (top r1))))
              (t
               ;; R1 must be completely contained in R2, so the
               ;; difference is empty.
               nil))))
      r1))

(defmethod region-difference ((ca compound-region) (a region))
  (make-instance 'compound-region
                 :regions (mapcar #'(lambda (x)
                                      (region-difference x a))
                                  (regions ca))))

(defmethod region-difference ((region region) (ca compound-region))
  (reduce #'(lambda (x y)
              (region-difference x y))
          (regions ca)
          :initial-value region))

(defmethod region-difference ((region path-region) (out rectangle))
  (let ((new (copy-object region)))
    (push out (path-region-out-rects new))
    new))

(defmethod region-difference ((region path-region) (out path-region))
  (let ((new (copy-object region)))
    (push (path-region-path out)
          (path-region-out-paths new))
    new))
```

```
;;; -*- Mode: Lisp; Package: SILICA; Base: 10.; Syntax: Common-Lisp -*-
;;;
;;; Copyright (c) 1988 by Xerox Corporation.  All rights reserved.
;;;

;;;
;;; SILICA TRANSFORMATIONS
;;;
(in-package "SILICA")

(defclass transformation nil
  ((scale :initform 1 :initarg :scale
          :accessor scale :accessor transformation-scale)
   (rotation :initform 0 :initarg :rotation
             :accessor rotation :accessor transformation-rotation)
   (x-translation :initform 0 :initarg :x-translation
                  :accessor x-translation :accessor transformation-dx)
   (y-translation :initform 0 :initarg :y-translation
                  :accessor y-translation :accessor transformation-dy))
  (:documentation "Describes a coordinate system transformation."))

(defclass null-transformation (transformation)
  ()
  (:default-initargs :scale 1 :rotation 0 :x-translation 0 :y-translation 0))

(defvar *null-transformation* (make-instance 'null-transformation))

(defun make-transformation (&rest args)
  (apply #'*make-instance 'transformation args))

(defun normalize-rotation (r)
  (cond ((<= r -180) (normalize-rotation (+ r 360)))
        ((> r 180) (normalize-rotation (- r 360)))
        (t r)))
;;;
;;; Predicates
;;;

(defmacro %identityp (x)
  '(and
     (zerop (rotation ,x))
     (= 1 (scale ,x))
     (zerop (x-translation ,x))
     (zerop (y-translation ,x))))

(defmethod identityp ((x transformation))
  (%indentityp x))

(defmacro %translationp (x)
  '(and (zerop (rotation ,x))
        (= 1 (scale ,x))))

(defmethod translationp ((x transformation))
  (%translationp x))

(defmacro %rotationp (x)
  '(and (= 1 (scale ,x))
        (zerop (x-translation ,x))
        (zerop (y-translation ,x))))

(defmethod rotationp ((x transformation))
  (%rotationp x))

(defmacro %scalep (x)
   '(and (zerop (rotation ,x))
         (zerop (x-translation ,x))
         (zerop (y-translation ,x))))

(defmethod scalep ((x transformation))
  (%scalep x))
;;;
;;;   Composition and Inversion
;;;

(defmethod transformation-compose ((t1 transformation)
```

```
                    (t2 transformation)
                    &optional return-object)

;; Each transformation is a scaling, followed by a rotation, followed
;; by a translation. This is somewhat complicated by the attempt to
;; optimize a number of "simple", common cases.

(unless return-object (setq return-object (make-transformation)))
(let (new-scale new-rotation new-x-translation new-y-translation)
   (cond ((%identityp t1)
          (setq new-scale (scale t2)
                new-rotation (rotation t2)
                new-x-translation (x-translation t2)
                new-y-translation (y-translation t2)))
         ((%identityp t2)
          (setq new-scale (scale t1)
                new-rotation (rotation t1)
                new-x-translation (x-translation t1)
                new-y-translation (y-translation t1)))
         ((%translationp t2)

;; Something followed by a translation
          (setq new-scale (scale t1)
                new-rotation (rotation t1)
                new-x-translation (+ (x-translation t1)
                                     (x-translation t2))
                new-y-translation (+ (y-translation t1)
                                     (y-translation t2))))
         ((%scalep t1)

;; A scale followed by something
          (setq new-scale (* (scale t1) (scale t2))
                new-rotation (rotation t2)
                new-x-translation (x-translation t2)
                new-y-translation (y-translation t2)))
         ((%rotationp t1)

;; A rotation followed by something
          (setq new-scale (scale t2)
                new-rotation (normalize-rotation (+ (rotation t1)
                                                   (rotation t2)))
                new-x-translation (x-translation t2)
                new-y-translation (y-translation t2)))
         (t
          ;; Resort to the general case
          (setq new-scale (* (scale t1) (scale t2)))
                                        ; Figure out the total
                                        ; translation by finding out
                                        ; where the origin goes
          (let ((origin (make-position :x 0 :y 0)))
            (setq origin (transformation-apply t1 origin origin))
            (setq origin (transformation-apply t2 origin origin))
            (setq new-x-translation (position-x origin)
                  new-y-translation (position-y origin)))
                                        ; Figure out the final rotation
                                        ; by finding out where the
                                        ; vector <1,0> goes.
          (let ((i-vector (make-position :x 1 :y 0)))
            (setq i-vector (transformation-apply t1 i-vector i-vector))
            (setq i-vector (transformation-apply t2 i-vector i-vector))
            (setq new-rotation (atand (- new-y-translation
                                         (position-y i-vector))
                                      (- (position-x i-vector)
                                         new-x-translation))))))

;; Build and return the resulting composition.
   (setf (scale return-object) new-scale
         (rotation return-object) new-rotation
         (x-translation return-object) new-x-translation
         (y-translation return-object) new-y-translation)
   return-object))

(defmethod transformation-invert ((self transformation)
                                  &optional (new nil new-supplied-p))
  (let ((x-trans (- (transformation-dx self)))
        (y-trans (- (transformation-dy self)))
        (scale   (/ 1 (transformation-scale self)))
```

```
          (rotation (- (transformation-rotation self))))
    (if new-supplied-p
        (progn (setf (transformation-dx new) x-trans)
               (setf (transformation-dy new) y-trans)
               (setf (transformation-scale new) scale)
               (setf (transformation-rotation new) rotation)
               new)
        (make-transformation :dx x-trans :dy y-trans
                             :scale scale :rotation rotation))))

;;;
;;; Copying
;;;

(defmethod transformation-copy ((self transformation)
                                &aux
                                (new (make-instance 'transformation)))
  (setf (x-translation new) (x-translation self))
  (setf (y-translation new) (y-translation self))
  (setf (rotation new) (scale self))
  (setf (rotation new) (scale self))
  new)

;;;
;;; Transfromation application and removal
;;;   Methods on fonts are with font stuff
;;;

(defmethod transformation-apply ((transformation transformation)
                                 (object position)
                                 &optional smash-object-p)

(multiple-value-bind (x y) (transform-point transformation
                                              (position-x object)
                                              (position-y object))
    (if smash-object-p
        (progn (setf (position-x object) x
                     (position-y object) y)
               object)
        (make-position :x x :y y))))

(defmethod transformation-undo ((transformation transformation)
                                (object position)
                                &optional smash-object-p)
  (multiple-value-bind (x y) (untransform-point transformation
                                                (position-x object)
                                                (position-y object))
    (if smash-object-p
        (progn (setf (position-x object) x
                     (position-y object) y)
               object)
        (make-position :x x :y y))))

(defmethod transform-point ((transformation transformation) new-x new-y)
  (unless (%translationp transformation)
    ;; First, do the scaling
    (setq new-x (* (scale transformation) new-x)
          new-y (* (scale transformation) new-y))

;; Then do the rotation
    ;; Optimize common cases.
    (cond ((zerop (rotation transformation)) nil)
          ((= (rotation transformation) 90)
           (psetf new-x (- new-y)
                  new-y new-x))
          ((= (rotation transformation) -90)
           (psetf new-x new-y
                  new-y (- new-x)))
          ((= (rotation transformation) 180)
           (psetf new-x (- new-x)
                  new-y (- new-y)))
          (t                                    ; General case rotation
           (let ((sin (sind (rotation transformation)))
                 (cos (cosd (rotation transformation))))
             (psetf new-x (+ (* cos new-x)
```

```
                              (* sin new-y))
              new-y (- (* cos new-y)
                              (* sin new-x)))))))

;; Do the translation
  (values (+ new-x (x-translation transformation))
          (+ new-y (y-translation transformation))))

(defmethod untransform-point ((transformation transformation) new-x new-y)

;; Undo the translation
  (decf new-x (x-translation transformation))
  (decf new-y (y-translation transformation))

(unless (%translationp transformation)
    ;; Undo the rotation
    (cond ((zerop (rotation transformation)) nil)
          ((= (rotation transformation) 90)
           (psetf new-x new-y
                  new-y (- new-x)))
          ((= (rotation transformation) -90)
           (psetf new-x (- new-y)
                  new-y new-x))
          ((= (rotation transformation) 180)
           (psetf new-x (- new-x)
                  new-y (- new-y)))
          (t                                    ; General case rotation
           (let ((sin (sind (rotation transformation)))
                 (cos (cosd (rotation transformation))))
             (psetf new-x (- (* cos new-x)
                             (* sin new-y))
                    new-y (+ (* cos new-y)
                             (* sin new-x)))))))

;; Undo the scaling
    (setq new-x (/ new-x (scale transformation))
          new-y (/ new-y (scale transformation))))

(values new-x new-y))

(defmethod transformation-apply ((trans transformation) (p plane)
                                 &optional smash-object-p)
  p)

(defmethod transformation-undo ((trans transformation) (p plane)
                                &optional smash-object-p)
  p)

(defmethod transformation-apply ((transformation transformation)
                                 (object rectangle)
                                 &optional smash-object-p)
  (multiple-value-bind (new-left new-bottom new-width new-height)
      (transform-rectangle transformation
                           (left object) (bottom object)
                           (width object) (height object))
    (if smash-object-p
        (progn (setf (left object)   new-left
                     (bottom object) new-bottom
                     (width object)  new-width
                     (height object) new-height)
               object)
        (make-rectangle :left new-left :bottom new-bottom
                        :width new-width :height new-height))))

(defmethod transformation-undo ((transformation transformation)
                                (object rectangle)
                                &optional smash-object-p)
  (multiple-value-bind (new-left new-bottom new-width new-height)
      (untransform-rectangle transformation
                             (left object) (bottom object)
                             (width object) (height object))
    (if smash-object-p
        (progn (setf (left object)   new-left
                     (bottom object) new-bottom
                     (width object)  new-width
                     (height object) new-height)
               object)
```

```
                  (make-rectangle :left new-left :bottom new-bottom
                                  :width new-width :height new-height))))

(defmethod transform-rectangle ((transformation transformation)
                                left bottom width height)
  (with-slots (scale rotation) transformation
    (cond ((zerop rotation)
           (multiple-value-setq (left bottom)
             (transform-point transformation left bottom)))
          ((= 90 rotation)
           (multiple-value-setq (left bottom)
             (transform-point transformation left (+ bottom height))))
          ((= 180 rotation)
           (multiple-value-setq (left bottom)
             (transform-point transformation
                              (+ left width) (+ bottom height))))
          ((= -90 rotation)
           (multiple-value-setq (left bottom)
             (transform-point transformation (+ left width) bottom)))
          (t (error "~%Can't apply transformations with arbitrary rotations to
regions." )))
    (values left bottom (* scale width) (* scale height))))

(defmethod untransform-rectangle ((transformation transformation)
                                  left bottom width height)
  (with-slots (scale rotation) transformation
    (cond ((zerop rotation)
           (multiple-value-setq (left bottom)
             (untransform-point transformation left bottom)))
          ((= -90 rotation)
           (multiple-value-setq (left bottom)
             (untransform-point transformation left (+ bottom height))))
          ((= 180 rotation)
           (multiple-value-setq (left bottom)
             (untransform-point transformation
                                (+ left width) (+ bottom height))))
          ((= 90 rotation)
           (multiple-value-setq (left bottom)
             (untransform-point transformation (+ left width) bottom)))
          (t (error "~%Can't apply transformations with arbitrary rotations to
regions." )))
    (values left bottom (* scale width) (* scale height))))

(defmethod transformation-apply ((trans transformation)
                                 (ca compound-region))
  (make-instance 'compound-region :regions
                 (mapcar #'(lambda (a)
                             (transformation-apply trans a))
                         (regions ca))))

(defmethod transformation-undo ((trans transformation)
                                (ca compound-region))
  (make-instance 'compound-region :regions
                 (mapcar #'(lambda (a)
                             (transformation-undo trans a))
                         (regions ca))))
;;;
;;; PATH Regions
;;;

(defmacro transformation-operate-on-path-region
    (operator transformation path-region &optional smash-object-p)
  (let ((do-to-path-desc (gensym))
        (new-path (gensym))
        (new-rects (gensym))
        (new-out-paths (gensym)))
    '(let* ((,do-to-path-desc (transformation-operate-on-path-desc
                               ,operator
                               ,transformation))
            (,new-path (funcall ,do-to-path-desc (path-region-path
                                                  ,path-region)))
            (,new-rects (mapcar #'(lambda (rect)
                                    (,operator ,transformation
                                               rect ,smash-object-p))
```

```
                                    (path-region-rects ,path-region)))
          (,new-out-paths (mapcar ,do-to-path-desc
                                  (path-region-out-paths ,path-region)
                                  )))
      (if ,smash-object-p
          (progn (setf (path-region-path ,path-region)
                       ,new-path)
                 (setf (path-region-rects ,path-region)
                       ,new-rects)
                 (setf (path-region-out-paths ,path-region)
                       ,new-out-paths))
          (make-path-region :path ,new-path :rects ,new-rects
                            :out-paths ,new-out-paths)))))

defmacro transformation-operate-on-path-desc (fn tr)
  (let ((last-pos (gensym))
        (path-desc (gensym)))
    '#'(lambda
         (,path-desc)
         (let
           ((,last-pos))
           (mapcar
             #'(lambda (link)
                 (let ((pos (make-position :x (second link)
                                           :y
                                           (third link)))
                       p2 p3)
                   (ecase (first link)
                     ((:line-to :move-to)
                      (setq pos (,fn ,tr (setq ,last-pos pos)))
                      '(,(first link)
                        ,(position-x pos)
                        ,(position-y pos)))
                     (:line-to-x
                      (setf (position-x ,last-pos)
                            (second link))
                      (setq pos (,fn ,tr ,last-pos))
                      '(:line-to ,(position-x pos)
                                 ,(position-y pos)))
                     (:line-to-y
                      (setf (position-y ,last-pos)
                            (second link))
                      (setq pos (,fn ,tr ,last-pos))
                      '(:line-to ,(position-x pos)
                                 ,(position-y pos)))
                     (:arc-to
                      (,fn ,tr pos t)
                      (setq p2 (,fn ,tr (setq ,last-pos
                                              (make-position
                                                :x
                                                (fourth link)
                                                :y
                                                (fifth link)))))
                      '(,(first link)
                        ,(position-x pos)
                        ,(position-y pos)
                        ,(position-x p2)
                        ,(position-y p2)))
                     (:conic-to
                      (,fn ,tr pos t)
                      (setq p2 (,fn ,tr (setq ,last-pos
                                              (make-position
                                                :x
                                                (fourth link)
                                                :y
                                                (fifth link)))))
                      '(,(first link)
                        ,(position-x pos)
                        ,(position-y pos)
                        ,(position-x p2)
                        ,(position-y p2)
                        ,(sixth link)))
                     (:curve-to
                      (,fn ,tr pos t)
                      (setq p2 (,fn ,tr (make-position :x (fourth link)
                                                       :y
```

```
                                                           (fifth link))
                                  t))
                   (setq p3 (,fn ,tr (setq ,last-pos
                                              (make-position
                                                :x
                                                (sixth link)
                                                :y
                                                (seventh link))))))
                '(,(first link)
                  ,(position-x pos)
                  ,(position-y pos)
                  ,(position-x p2)
                  ,(position-y p2)
                  ,(position-x p3)
                  ,(position-y p3))))))))
         ,path-desc)))))

(defmethod transformation-apply ((transformation transformation)
                                 (region path-region)
                                 &optional smash-object-p)
   (transformation-operate-on-path-region transformation-apply
                                   transformation region smash-object-p))

(defmethod transformation-undo ((transformation transformation)
                                (region path-region)
                                &optional smash-object-p)
   (transformation-operate-on-path-region transformation-undo
                                   transformation region smash-object-p))
;;;
;;; Utilities.
;;;

(defun degrees-to-radians (x)
       "Convert the number (in degrees) to radians"
       (* x (/ (float pi x)
               180)))
(defun radians-to-degrees (x)
       "Convert the number (in radians) to degrees"
       (/ x (/ pi 180)))
(defun cosd (x)
       "Cosine of an angle, measured in degrees."
       (cos (degrees-to-radians x)))
(defun sind (x)
       "Sine of an angle, measured in degrees."
       (sin (degrees-to-radians x)))
(defun atand (y x)
       "The arctan function, in degrees"
       (radians-to-degrees (atan y x)))
;;; -*- Mode: Lisp; Package: SILICA; Base: 10.; Syntax: Common-Lisp -*-
;;;
;;; Copyright (c) 1988 by Xerox Corporation.  All rights reserved.
;;;
(in-package "SILICA")

;;;
;;; SILICA DM Protocol
;;;
;;;   Defines protocols for building display medium objects.  These objects
;;; essentially define the interface that has to implemented to incorporate a
;;; graphics package into Silica.
;;;
;;; No Graphics Operations are provided in the abstract class, but clearly
;;; any real DM will provide some way of doing graphics on it.
;;;
;;; Graphics Operations must respect the transformation and clipping region
;;; that the kernel imposes on dms.  DM classes should provide methods on the
;;; setf generic functions for setting the transformation and clipping region
;;; if it needs to change implementation state.  Or else each graphics call
;;; should clip and transform user requests.
;;; In addition, use of these fields should be used within the scope of
;;; "output protection" to insure that they are valid and locked.

(defclass display-medium nil
  (
   ;; A DM should clip and transform using these values.
```

```
;; Clipping Region is in output surface coordinates
(transformation :initform *null-transformation*
                :accessor display-medium-transformation)
(clipping-region :initform *plane* :accessor
                  display-medium-clipping-region)

(dmstamp :initform nil)
(connection :initarg :connection :accessor connection)
(galaxy :initarg :galaxy :accessor galaxy)

(output-contract :initform nil :initarg :output-contract
                 :accessor %output-contract
                 :accessor display-medium-output-contract)))

(defun make-display-medium (display-medium-type &rest args)
  (apply #'*make-instance display-medium-type args))

;;;
;;; Output Protection
;;;
;;; ALL Graphics Operations should be protected.
;;; Every graphics package has to check that the output-contract and display
;;; medium are ready, in case some window action has unreadied for output.  In
;;; addition, they have to grab a lock for the duration of the output.

(defmacro with-output-synchronization (&body body)
   ;; So.  You think you're being protected.  Hah!
   '(progn ,@body))

(defmacro with-output-protection (dm &rest body)
  '(with-output-synchronization
     (if (not (display-medium-valid-p ,dm))
         (display-medium-validate ,dm))
    ,@body))

(defmacro %galaxy-dmstamp (dm)
  '(galaxy-dmstamp (slot-value ,dm 'galaxy)))

(defmacro display-medium-valid-p (dm)
  '(eq (slot-value ,dm 'dmstamp)
       (%galaxy-dmstamp ,dm)))

(defmacro display-medium-mark-valid (dm)
  '(setf (slot-value ,dm 'dmstamp)
         (%galaxy-dmstamp ,dm))))

(defmacro display-medium-invalidate (dm)
  '(setf (slot-value ,dm 'dmstamp) nil))

(defmethod display-medium-validate ((dm display-medium))
  (let ((oc (display-medium-output-contract dm)))
    (when oc ;; 1. Verify (or Calculate) media transformation and
      ;; clipping-region  This is overkill.  Should only be
      ;; necessary to set in cases that we aren't using a cached
      ;; value.  Otherwise the values only need be validated.  For
      ;; now this code works.

(let ((cr (fetch-clipping-region oc nil))
            (dt (fetch-delta-transformation oc nil)))

;; IL actually depends on Transformation being set first,
        ;; but I should probably clean that up.
        (setf (display-medium-transformation dm) dt)
        (setf (display-medium-clipping-region dm) cr)

;; 2. Verify that display stream is all okay.
        ;; OUTPUT CONTRACT CHECKS
        ;; 3. Check for Output Controls - e.g. Hold Invisible
        ;; Output.
        ;; 4. Check that Galaxy is ready
        ;; 5. Check that Output is possible to this plane -
        ;; globally adopted.
```

```
;; FINALLY Mark the DM
(display-medium-mark-valid dm)))))

;;;
;;; DM Reuse Caches
;;;

(defmacro allocate-dm (dm-type-id connection galaxy)
  '(or (pop (getf (slot-value ,connection 'dm-cache) ,dm-type-id))
       (make-display-medium (connection-cprop ,connection ,dm-type-id)
         :connection ,connection
         :galaxy ,galaxy)))

(defmacro deallocate-dm (dm-type-id connection dm)
  '(push ,dm
    (getf (slot-value ,connection 'dm-cache) ,dm-type-id)))

(defmacro using-display-medium ((dm dm-type-id output-contract) &body forms)
  (once-only (dm-type-id output-contract)
    '(let* ((,dm (allocate-dm ,dm-type-id
                              (connection ,output-contract)
                              (galaxy ,output-contract))))
       (unwind-protect
           (progn
             ;; Prepare the DM.
             ;; Maybe this stuff should be generic function.
             (display-medium-invalidate ,dm)
             (setf (display-medium-output-contract ,dm) ,output-contract)
             (setf (slot-value ,dm 'galaxy) (galaxy ,output-contract))
             ;; Do the Client stuff
             ,@forms)
         ;; Cleanup
         (cleanup-display-medium ,dm)
         (deallocate-dm ,dm-type-id
                        (connection ,output-contract)
                        ,dm)))))
;;; -*- Mode: Lisp; Package: SILICA; Base: 10.; Syntax: Common-Lisp -*-
;;;
;;; Copyright (c) 1988 by Xerox Corporation.  All rights reserved.
(in-package 'silica)

;;;
;;; SILICA CONNECTIONS
;;;

(defun get-connect-id (host-name display-id)
  (intern (format nil "~a-~d" (string-upcase host-name) display-id)
          "KEYWORD"))

(defvar *connect-id->connection-type-pl*
  '(:layla-0 x-connection
    :thetajmahal-0 xerox-connection))

(defmacro connect-id->connection-type (connect-id)
  '(getf *connect-id->connection-type-pl* ,connect-id))

(defsetf connect-id->connection-type (connect-id) (new-value)
  '(setf (getf *connect-id->connection-type-pl* ,connect-id)
         ,new-value))

(defvar *connections* nil)

(defvar *shared-connections-pl* nil
  "Maps connect-ids to shared connections connections")

(defclass connection ()
  ((;; shared slot should be initialized by subclasses
    ;; this means only one galaxy type is allowed per connection type
    galaxy-type :allocation :class
    :accessor connection->galaxy-type)

(connect-id :initarg :connect-id)
   (galaxys :initform nil)

;; Connection Instance Properties
   (connection-iprops :initform ())
```

```
;; These props are used by other kernel classes that could use the
;; props mechanism, but since, afterall they are priveleged to be in
;; the kernel they can get a special in.
(dm-cache :initform ()
          :accessor dm-cache)
))

(defun get-connection (host display-id)

"Returns a shared connection.
Connections should be accepted or dropped"

(let ((connect-id (get-connect-id host display-id)))
    (or (getf *shared-connections-pl* connect-id)
        (setf (getf *shared-connections-pl* connect-id)
              (make-connection host display-id)))))

(defmethod make-connection (host display-id)
  (let ((connect-id (get-connect-id host display-id)))
    (*make-instance (connect-id->connection-type connect-id)
         :host host :display-id display-id
         :connect-id connect-id)))

(defmethod destroy-connection ((connection connection))
  (setq *connections* (delete connection *connections* :test #'eq))
  (remf *shared-connections-pl* (slot-value connection 'connect-id)))

(defun destroy-connections ()
  (dolist (c *connections*)
    (destroy-connection c)))
(defmethod accept-connection ((connection connection) galaxy)
  (pushnew connection *connections*)
  (pushnew galaxy (slot-value connection 'galaxys))
  connection)

(defmethod drop-connection ((connection connection) galaxy)
  (if (null (setf (slot-value connection 'galaxys)
                  (delete galaxy (slot-value connection 'galaxys)
                          :test #'eq)))
      (destroy-connection connection)))

;;;
;;; Connection Properties
;;;

;;; Implementing connection independent graphics packages requires some
;;;  assistance in the connection class and instance
;;; This is general mechanism such packages can use, independent of
;;;  the implementation of the connection type.
;;; E.G. abc graphics kernel uses this to resolve font and dm types.

(defmethod connection-cprops ((connection connection))
  (protocol-holder "CONNECTION"))

(defmacro connection-cprop (connection key)
  `(getf (connection-cprops ,connection) ,key))

(defsetf connection-cprop (connection key) (val)
  `(setf (getf (connection-cprops ,connection) ,key)
         ,val))

(defmacro connection-iprop (connection key)
  `(getf (slot-value ,connection 'connection-iprops) ,key))

(defsetf connection-iprop (connection key) (val)
  `(setf (getf (slot-value ,connection 'connection-iprops) ,key)
         ,val))
;;; -*- Mode: Lisp; Package: SILICA; Base: 10.; Syntax: Common-Lisp -*-
;;;

;;; Copyright (c) 1988 by Xerox Corporation.  All rights reserved.
;;;

(in-package "SILICA")

;;;
```

```
;;; SILICA-GALAXY
;;;
;;; Galaxys
;;;    -- note: plural of Galaxy is galaxys in this code
;;;       should I follow English as a convention. I guess so, so I need
;;;       to change this.

(defvar *galaxy* nil)
(defvar *galaxys* nil)
(defvar *share-connections-p* t)
(defvar *default-host* "layla")
(defvar *default-display-id* 0)

(defclass galaxy (kernel-object)
  (
   (width)
   (height)
   ;;
   (connection :accessor connection
               :initarg :connection)
   (root-plane :accessor galaxy-root)
   (transformation :reader galaxy-transformation)
   (stamp :initform 0 :accessor galaxy-stamp)
   (crstamp :initform 0 :accessor galaxy-crstamp)
   (dmstamp :initform 0 :accessor galaxy-dmstamp)))

(defun make-galaxy (&rest args
                    &key connection
                         (host *default-host*)
                         (display-id *default-display-id*)
                         (share-p *share-connections-p*)
                         &allow-other-keys)
  (unless connection
    (setq connection
          (if share-p
              (get-connection host display-id)
              (make-connection host display-id))))
  (apply #'pcl::*make-instance (connection->galaxy-type connection)
         :connection connection
         args))

(defmethod *initialize-instance :after
  ((galaxy galaxy) &key connection root transformation
   &allow-other-keys)

(setf (galaxy-root galaxy)        root)
  (setf (slot-value galaxy 'transformation) transformation)

(accept-connection connection galaxy)
  (push galaxy *galaxys*)
  (setf *galaxy* galaxy))

(defmethod destroy-galaxy ((galaxy galaxy))
  (drop-connection (connection galaxy) galaxy)
  (setq *galaxys* (delete galaxy *galaxys* :test #'eq))
  (if (eq galaxy *galaxy*)
      (setq galaxy (car *galaxys*))))

(defun destroy-galaxys (&optional (galaxy-type))
  (setq *galaxys*
        (mapcan #'(lambda (g)
                    (if (or (null galaxy-type)
                            (eq galaxy-type (class-name (class-of g))))
                        (progn (destroy-galaxy g)
                               nil)
                        (cons g nil)))
                *galaxys*)))

;;;
;;; ??? - Trash this stuff and do something else to handle their raison d'etre.
;;;

(defmethod galaxy-prepare ((galaxy galaxy)))
```

```
(defmethod (setf galaxy-transformation) ((transformation transformation)
                                         (galaxy galaxy))

(setf (slot-value galaxy 'transformation) transformation)
  (plane-transformation-changed (galaxy-root galaxy)))
;;; -*- Mode: Lisp; Package: SILICA; Base: 10.; Syntax: Common-Lisp -*-
;;;
;;; Copyright (c) 1987, 1988 by Xerox Corporation.  All rights reserved.
;;;

(in-package "SILICA")

;;;
;;; SILICA ABC
;;;

;;;
;;; Connection Requirements
;;;
;;; (setf (connection-cprop connection :abc-font-type) ???)
;;; (setf (connection-cprop connection :abc-dm-type) ???)

;;;
;;; BITMAPS
;;;

(defclass bitmap ()
  ())

(defun make-bitmap (&key width height galaxy)
  (galaxy-make-bitmap galaxy width height))

(defmethod bitmap-height ((bm bitmap))
  (declare (ignore bm))
  (protocol-holder "BITMAP"))

(defmethod bitmap-width ((bm bitmap))
  (declare (ignore bm))
  (protocol-holder "BITMAP"))

;;;
;;; FONTS
;;;

(defclass font nil
  ((family :initform :fixed-pitch :initarg :family
           :type symbol :accessor font-family)
   (size :initform 10 :initarg :size
         :type number :accessor font-size)
   (italicp :initform nil :initarg :italicp
            :type boolean :accessor font-italic?)
   (boldp :initform nil :initarg :boldp
          :type boolean :accessor font-bold?)
   (rotation :initform 0 :initarg :rotation
             :type number :accessor font-rotation)
   (scale :initform 1 :initarg :scale
          :type number :accessor font-scale)

(connection :initform nil :initarg :connection
               :accessor connection))
  (:documentation "ABC font"))

(defun make-font (&rest keys
                  &key font-type connection galaxy
                  &allow-other-keys)
  (when (and (null connection) galaxy)
    (setq connection connection)
    (setf (getf keys :connection) connection))
  (apply #'make-instance
         (or font-type
             (if connection (connection-cprop connection :abc-font-type)))
         keys))

(defmethod font-height ((font font))
  (declare (ignore font))
  (protocol-holder "FONT"))

(defmethod font-ascent ((font font))
```

```
  (declare (ignore font))
  (protocol-holder "FONT"))

(defmethod font-descent ((font font))
  (declare (ignore font))
  (protocol-holder "FONT"))

;;;
;;; Transformations on Fonts
;;;

(defmethod transformation-apply ((transformation transformation)
                                 (font font)
                                 &optional smash-object-p)
  (if smash-object-p
      (progn (setf (font-rotation font) (+ (rotation transformation)
                                           (font-rotation font))
             (font-scale font)    (* (font-scale font)
                                     (scale transformation)))
             font)
    (make-font :font-type (class-of font)
               :family    (font-family font)
               :size      (font-size font)
               :rotation  (+ (rotation transformation)
                             (font-rotation font))
               :boldp     (font-bold? font)
               :italicp   (font-italic? font)
               :scale     (* (font-scale font)
                             (scale transformation)))))

(defmethod transformation-undo ((transformation transformation)
                                (font font)
                                &optional smash-object-p)
  "Apply inverse of TRANSFORMATION to OBJECT.  Smash OBJECT if IN-PLACE-P."
  (if smash-object-p
      (progn (setf (font-rotation font) (- (font-rotation font)
                                           (rotation transformation))
             (font-scale font)    (/ (font-scale font)
                                     (scale transformation)))
             font)
    (make-font :font-type     (class-of font)
               :family        (font-family font)
               :size          (font-size font)
               :rotation      (- (font-rotation font)
                                 (rotation transformation))
               :boldp         (font-bold? font)
               :italicp       (font-italic? font)
               :scale         (/ (font-scale font)
                                 (scale transformation)))))

;;;
;;; SHADES
;;;

(deftype shade nil "A ABC shade (or texture)." '(rational 0 100))

(defconstant *black* 100)
(defconstant *dark-gray* 75)
(defconstant *gray* 50)
(defconstant *light-gray* 25)
(defconstant *white* 0)

(defvar *shade-translations* '#(    0 nil nil nil
                                33345 nil nil nil
                                43605 nil nil nil
                                32190 nil nil nil
                                65535))
(defun shade->il-shade (shade)
  ;; Provides a mechanism for converting from a shade to a bit
  ;; representation of data for the shade.
  ;; Returns: a number [0, 65535\)
  ;; Binary Number: #b abcdefghijklmnop
  ;; Bits:
  ;;        abcd
  ;;        defg
```

```
;;        hijk
;;        mnop
;; Representation From Interlisp, so directly used in DM-IL.
;; Note that 100 is reduced to 17 separate numbers using this scheme.

(aref *shade-translations* (floor (* shade 16) 100)))

(defun shade->4x4 (shade)
  (setq shade (shade->il-shade shade))
  (list (ldb (byte 4 0)  shade)
        (ldb (byte 4 4)  shade)
        (ldb (byte 4 8)  shade)
        (ldb (byte 4 12) shade)))

(defun shade->8x2 (shade)
  (setq shade (shade->il-shade shade))
  (list (ldb (byte 8 0) shade)
        (ldb (byte 8 8) shade)))

#+comment
(defun n-bits-out-of (n word-size)
  (cond ((> n word-size)
         (error "~%Can't make a number ~D bits long with ~D bits set."
                word-size n))
        ((zerop n) 0)
        ((= 1 n) (ash 1 (truncate word-size 2)))
        (t (let ((half-n (truncate n 2))
                 (half-n+ (ceiling n 2))
                 (half-word (truncate word-size 2))
                 (half-word+ (ceiling word-size 2)))
             (logior (n-bits-out-of half-n half-word)
                     (ash (n-bits-out-of half-n+ half-word+)
                          half-word))))))

;;;
;;; ABC SPECIALS
;;;

(defvar *default-font*)
(defvar *default-operation* :paint
  "The default operation for display media")
(defvar *default-shade* *black*
  "The default shade for display media")

;;;
;;; ABC ABSTRACT DM
;;;

;;; This defines the ABC Graphics Package Interface.  All implementations of
;;; need to implement all of this so that Silica Toolkit can work okay.

(defclass abc-abstract-display-medium ()
  ()
  (:documentation "ABC Graphics Package Medium.")
  )

(defclass abc-abstract-bitmap-medium ()
  ()
  )

;;;
;;; Imaging Context
;;;

(defmethod clipping-region ((dm abc-abstract-display-medium))
  (declare (ignore dm))
  (protocol-holder "ABC-Display-Medium"))

(defmethod font ((dm abc-abstract-display-medium))
  (declare (ignore dm))
  (protocol-holder "ABC-Display-Medium"))

(defmethod line-width ((dm abc-abstract-display-medium))
```

```
    (declare (ignore dm))
    (protocol-holder "ABC-Display-Medium"))

(defmethod location ((dm abc-abstract-display-medium))
   (declare (ignore dm))
   (protocol-holder "ABC-Display-Medium"))

(defmethod operation ((dm abc-abstract-display-medium))
   (declare (ignore dm))
   (protocol-holder "ABC-Display-Medium"))

(defmethod shade ((dm abc-abstract-display-medium))
   (declare (ignore dm))
   (protocol-holder "ABC-Display-Medium"))

(defmethod transformation ((dm abc-abstract-display-medium))
   (declare (ignore dm))
   (protocol-holder "ABC-Display-Medium"))

(defmethod (setf clipping-region) (new-value (dm abc-abstract-display-medium))
   (declare (ignore dm new-value))
   (protocol-holder "ABC-Display-Medium"))

(defmethod (setf font) (new-value (dm abc-abstract-display-medium))
   (declare (ignore dm new-value))
   (protocol-holder "ABC-Display-Medium"))

(defmethod (setf line-width) (new-value (dm abc-abstract-display-medium))
   (declare (ignore dm new-value))
   (protocol-holder "ABC-Display-Medium"))

(defmethod (setf location) (new-value (dm abc-abstract-display-medium))
   (declare (ignore dm new-value))
   (protocol-holder "ABC-Display-Medium"))

(defmethod (setf operation) (new-value (dm abc-abstract-display-medium))
   (declare (ignore dm new-value))
   (protocol-holder "ABC-Display-Medium"))

(defmethod (setf shade) (new-value (dm abc-abstract-display-medium))
   (declare (ignore dm new-value))
   (protocol-holder "ABC-Display-Medium"))

(defmethod (setf transformation) (new-value (dm abc-abstract-display-medium))
   (declare (ignore dm new-value))
   (protocol-holder "ABC-Display-Medium"))

;;;
;;; Bitmap Context
;;;

(defmethod target ((dm abc-abstract-bitmap-medium))
   (declare (ignore dm))
   (protocol-holder "ABC-Display-Medium"))

(defmethod (setf target) (new-value (dm abc-abstract-bitmap-medium))
   (declare (ignore dm new-value))
   (protocol-holder "ABC-Display-Medium"))

;;;
;;; Graphics Operations
;;;

(defmethod copy-region ((target abc-abstract-display-medium) x y
                        (source bitmap) region)
   (declare (ignore dm))
   (protocol-holder "ABC-Display-Medium"))

(defmethod copy-rectangle ((destination abc-abstract-display-medium) dstx dsty
                           (source bitmap) srcx srcy w h)
   (declare (ignore dm))
   (protocol-holder "ABC-Display-Medium"))

(defmethod clear-media ((dm abc-abstract-display-medium))
```

```
    (declare (ignore dm))
    (protocol-holder "ABC-Display-Medium"))

(defmethod clear-region ((dm abc-abstract-display-medium) region)
    (declare (ignore dm))
    (protocol-holder "ABC-Display-Medium"))

(defmethod clear-rectangle ((dm abc-abstract-display-medium) l b w h)
    (declare (ignore dm))
    (protocol-holder "ABC-Display-Medium"))

(defmethod draw-point ((dm abc-abstract-display-medium) x y)
    (declare (ignore dm))
    (protocol-holder "ABC-Display-Medium"))

(defmethod draw-points ((dm abc-abstract-display-medium) point-seq)
    (declare (ignore dm))
    (protocol-holder "ABC-Display-Medium"))

(defmethod draw-line ((dm abc-abstract-display-medium) x1 y1 x2 y2)
    (declare (ignore dm))
    (protocol-holder "ABC-Display-Medium"))

(defmethod draw-lines ((dm abc-abstract-display-medium) line-seq)
    (declare (ignore dm))
    (protocol-holder "ABC-Display-Medium"))

(defmethod draw-segments ((dm abc-abstract-display-medium) segment-seq)
    (declare (ignore dm segment-seq))
    (protocol-holder "ABC-Display-Medium"))

(defmethod draw-to ((dm abc-abstract-display-medium) point)
    (declare (ignore dm))
    (protocol-holder "ABC-Display-Medium"))

(defmethod draw-rectangle ((dm abc-abstract-display-medium) x y w h)
    (declare (ignore dm))
    (protocol-holder "ABC-Display-Medium"))

(defmethod fill-media ((dm abc-abstract-display-medium))
    (declare (ignore dm))
    (protocol-holder "ABC-Display-Medium"))

(defmethod fill-rectangle ((dm abc-abstract-display-medium) x y w h)
    (declare (ignore dm))
    (protocol-holder "ABC-Display-Medium"))

(defmethod fill-region ((dm abc-abstract-display-medium) region)
    (declare (ignore dm))
    (protocol-holder "ABC-Display-Medium"))

(defmethod print-string ((dm abc-abstract-display-medium) string)
    (declare (ignore dm))
    (protocol-holder "ABC-Display-Medium"))

(defmethod print-string-justified
      ((dm abc-abstract-display-medium) string left bottom width height
       &optional (horizontal-alignment :center) (vertical-alignment :center))
    "Print the string justified in the given region."
    (declare (ignore dm))
    (protocol-holder "ABC-Display-Medium"))

;;;
;;; Auxiliary Operations
;;;

(defmethod flush-output ((dm abc-abstract-display-medium))
    (declare (ignore dm))
    (protocol-holder "ABC-Display-Medium"))

(defmethod string-width ((dm abc-abstract-display-medium) string)
    (declare (ignore dm))
    (protocol-holder "ABC-Display-Medium"))
```

```
;;; ------------ ;;;
;;; ABC BASIC DM ;;;
;;; ------------ ;;;

;;; This Implements generic behaviors that almost all implementations of ABC
;;; DMs will be able to take advantage of.

(defclass abc-basic-display-medium (abc-abstract-display-medium)
  nil)

(defun make-abc-display-medium (&rest args &key abc-dm-type connection
                                     &allow-other-keys)
  (apply #'*make-instance (or abc-dm-type (connection-cprop connection :abc-dm-type))
         args))

(defun make-abc-bitmap-medium (&rest args &key abc-bm-type connection
                                    &allow-other-keys)
  (apply #'*make-instance (or abc-bm-type (connection-cprop connection :abc-bm-type))
         args))

(defmacro connection->abc-dm-type (connection)
  '(connection-cprop ,connection :abc-dm-type))

;;; WITH-SAVED-CONTEXT - No complete abstract implementation of the facility is
;;; possible. So only compile-time requirements are defined here (namely the
;;; macro is provided here). The runtime requirements must be met by the
;;; implementation of the abc-display-medium. Macro expanding one of the
;;; generic definitions above will show what is necessary at runtime (namely
;;; that a abc-client-context resource and a copy-abc-client-context method be
;;; implemented)

(defmacro with-saved-context (dm &body forms)

;; We keep a list of free contexts so as to minimize the overhead of
  ;; consing up new contexts all the time.
  (let ((saved-dm (gensym)))
    '(using-resource (,saved-dm 'abc-client-context ,dm)
                    (unwind-protect
                         (progn ,@forms)
                      (copy-abc-client-context ,saved-dm ,dm)))))

(defclass abc-client-context nil
  ((clipping-region :accessor clipping-region)
   (transformation :accessor transformation)
   (location :accessor location)
   (operation :accessor operation)
   (font :accessor font)
   (line-width :initform 1 :accessor line-width)
   (shade :initform *default-shade* :accessor
          shade))
  (:documentation "For storing a abc clients drawing context"))

(defresource abc-client-context (&optional original)
  :constructor (*make-instance 'abc-client-context)
  :initializer
  (when original (copy-abc-client-context original object))
  :matcher true)

(defmethod copy-abc-client-context
    (context &optional (to-context (make-abc-client-context)))
  "Return a copy of the DM, possibly smashing the optional SMASH-CONTEXT."
  (setf (clipping-region to-context)
        (clipping-region context)
        (font to-context)
        (font context)
        (line-width to-context)
        (line-width context)
        (location to-context)
        (location context)
        (operation to-context)
        (operation context)
        (shade to-context)
        (shade context)
```

```
      (transformation to-context)
      (transformation context))
  to-context)

;;;
;;; Generic definitions implemented on top of the above that may be specialized
;;; for better performance.

(defmethod clear-media ((dm abc-basic-display-medium))
   (with-saved-context dm
     (setf (operation dm) :erase
           (shade dm)     *black*)
     (fill-media dm)))

(defmethod clear-region ((dm abc-basic-display-medium) region)
   (with-saved-context dm
     (setf (operation dm) :erase
           (shade dm)     *black*)
     (fill-region dm region)))

(defmethod clear-rectangle ((dm abc-basic-display-medium)
                            &optional x y w h)
   (with-saved-context dm
     (setf (operation dm) :erase
           (shade dm)     *black*)
     (fill-rectangle dm x y w h)))

(defmethod fill-media ((dm abc-basic-display-medium))
   ;; Hoaky, but okayh for now.
   (fill-rectangle dm 0 0 2000 2000))

(defmethod draw-rectangle ((dm abc-basic-display-medium) l b w h)

;; Left side
   (fill-rectangle dm l b (line-width dm) (- h (line-width dm)))

;; Top side
   (fill-rectangle dm l (1+ (- (+ b h) (line-width dm)))
                   (- w (line-width dm)) (line-width dm))
   ;; Right side
   (fill-rectangle dm (1+ (- (+ l w) (line-width dm))) (+ b (line-width dm))
                   (line-width dm) (- h (line-width dm)))
   ;; Bottom side
   (fill-rectangle dm (+ l (width line-region)) b
                   (- w (line-width dm)) (line-width dm)))

(defmethod draw-line ((dm abc-basic-display-medium) start end)
   (setf (location dm) start)
   (draw-to dm end))

(defmethod invert-region ((dm abc-basic-display-medium) region )
   (with-saved-context dm
      (setf (operation dm) :invert
            (shade dm)     *black*)
      (fill-shade dm region)))

(defmethod print-string-justified
    ((dm abc-basic-display-medium) string left bottom width height
     &optional (horizontal-alignment :center) (vertical-alignment :center))
  "Print the string justified in the given region."
  (with-saved-context dm
    (setf (location dm)
          (make-position
           :x
           (ecase horizontal-alignment
             (:left left)
             (:center (+ left
                         (floor width 2)
                         (- (floor (string-width dm string) 2))))
             (:right (- right
                        (string-width dm string))))
           :y
           (ecase vertical-alignment
```

```lisp
              (:top (- top
                       (font-ascent (font dm))))
              (:center (+ bottom
                          (floor height 2)
                          (- (floor (font-height (font dm)) 2))
                          (font-descent (font dm))))
              (:bottom bottom))))
    (print-string dm string)))

(defmethod string-width ((dm abc-basic-display-medium) string)
  (string-width (font dm) string))

(defmethod flush-output ((dm abc-basic-display-medium))
  (declare (ignore dm))
  nil)
;;; -*- Mode: Lisp; Package: SILICA; Base: 10.; Syntax: Common-Lisp -*-
;;;
;;; Copyright (c) 1988 by Xerox Corporation.  All rights reserved.
;;;

(in-package 'silica)

;;;
;;; Silica Fundamental Models
;;;

;;;
;;; Interactive Planes
;;;

(defclass interactive-plane (kernel-object)
  (

;; The owner and region slots may contain any kind
    ;; of object that satisfy the required protocols.
    ;; Contracts that a interactive plane enters define the
    ;; protocol that these objects must be able to
    ;; handle.
    (owner :accessor plane-owner
           :initarg :owner)
    (region :accessor plane-region
            :initarg :region)
    (enabled? :accessor plane-enable?
              :initform nil))
  (:documentation "An abstract surface for doing input and output"))

;;;
;;; Windowing Domains
;;;

(defclass windowing-domain (kernel-object)
  (
    ;; The parent and children are interactive planes.  The transformations are
    ;; objects which must meet the dictates of the windowing domain's
    ;; contracts.
    (parent :initform nil  :initarg :parent
            :accessor windowing-domain-parent)

;; The windowing contract is a separate object so that it can be easily
    ;; replaced and so that different domains can be governed by different
    ;; windowing contracts.
    (contract :initform nil
              :accessor windowing-domain-contract)

;; an implementation choice about child to transformation mapping
    ;; should be encapsulated by this class.
    (children-mappings :initform nil
                       :accessor %children-mappings))
  (:documentation "One level of a windowing tree"))

(defun make-windowing-domain (&rest args)
  (apply #'*make-instance 'windowing-domain args))

(defmethod *initialize-instance :after
  ((domain windowing-domain)
   &key children transformations pairs
   &allow-other-keys)
```

```
    (if (or children transformations)
        (if (eq (length children)
                (length transformations))
            (setf (%children-mappings domain)
                  (with-collection (do ((c-tail children (cddr c-tail))
                                        (t-tail transformations (cddr t-tail
                                                                      )))
                                       ((null c-tail))
                                     (collect c-tail)
                                     (collect t-tail))))
            (if (null transformations)
                (setf (%children-mappings domain) children)
                (error "Improper children and transformations arguments"))))
    (if pairs
        (setf (%children-mappings domain) pairs)))

(defmethod windowing-domain-add-child
           ((domain windowing-domain) child transformation)
    ;; Basically no error checking. Assuming that the child has not been
    ;; put into this domain already and that the child will be set up
    ;; properly.
    (setf (getf (slot-value domain 'children-mappings) child)
          transformation))

(defmethod windowing-domain-rem-child
           ((domain windowing-domain) &optional child)
    (remf (slot-value domain 'children-mappings) child))

(defmethod windowing-domain-children ((domain windowing-domain))
    (with-collection (do ((tail (%children-mappings domain) (cddr tail)))
                         ((null tail))
                       (collect (car tail)))))

(defmethod windowing-domain-has-children? ((domain windowing-domain))
    (not (null (%children-mappings domain))))

(defmethod windowing-domain-transformation
           ((domain windowing-domain) (child interactive-plane))
    (getf (%children-mappings domain) child))

(defmethod (setf windowing-domain-transformation)
           (new-transformation (domain windowing-domain) (child interactive-plane))
    (setf (getf (%children-mappings domain) child) new-transformation))

(defmethod windowing-domain-child-p ((domain windowing-domain) child)
    ;; a kluge since mapping table is really a prop list, but none of values
    ;; can be children so this works
    (member child (%children-mappings domain)))

;;;
;;; Owner
;;;
;;; The owner represents the toolkit or appi object that is using the
;;; interactive plane. Methods it must provide are determined by the
;;; the contracts that govern the plane.
;;;

(defclass owner (kernel-object) nil)

;;;
;;; Contract Objects
;;;    provide some functionality to interactive planes.
;;;    either to a single plane or to a set of planes.

(defclass contract ()
  ())

(defclass plane-contract (contract)
  ())

(defclass relationship-contract (contract)
  ())
```

```
;;; -*- Mode: Lisp; Package: SILICA; Base: 10.; Syntax: Common-Lisp -*-
;;;
;;; Copyright (c) 1988 by Xerox Corporation. All rights reserved.
;;;

(in-package 'silica)

;;;
;;; SILICA PLANE
;;;
;;; COMBINATION of W and O and I
;;; Silica Planes are interactive planes that exist in windowing domains or
;;; in other words, engage in windowing, output, and input contracts. Much
;;; implementation hair is in this class (e.g. total transformation and
;;; clipping region caching).
;;;
;;;

(defclass silica-plane (interactive-plane kernel-object)
  (
   ;; Caching these fields so we can skywalk the universe. In some cases
   ;; there may be no windowing domain in the ancestral or progenal
   ;; directions and so the fields would be nil. This may change if nil
   ;; is used to indicate unknown for hint-styled cache.
   (youth-domain :initform nil :accessor plane-youth-domain)
   (adult-domain :initform nil :accessor plane-adult-domain)
   (galaxy :initform nil      :accessor galaxy)

;; Delta transformation caching and calculation.
   (%dtstamp

;; Indicates last time when something has changed that would
    ;; effect a delta transformation calculation. Namely last time
    ;; local transformation has changed
    :initform 0 :accessor %dtstamp)
   (%delta-transformation-cache :initform nil :accessor
                                %delta-transformation-cache)

;; Clipping Region caching and calculation
   (%crstamp

;; Last time anything has changed that would affect clipping
    ;; region of silica plane. Namely lots of events in the
    ;; plane's youth domain.
    :initform 0 :accessor %crstamp)
   (%clipping-region-cache :initform nil :accessor %clipping-region-cache)
   )
  (:documentation "A location in visual universe"))

(defun make-silica-plane (&rest args
                          &key
                          ;; Plane Class
                          plane-class output-contract-class
                          input-contract-class
                          youth-contract-class adult-contract-class ;; Connection
                          connection galaxy ;; Visual Universe Construction
                          region owner parent transformation parent-p ;; Output Contract Initialization
                          output-client children-mode display-medium
                          display-medium-mode display-medium-type )
  (flet ((collect-good-args (good-keys)
           (mapcan #'(lambda (key)
                       (if (getf args key)
                           (list key (getf args key))))
                   good-keys)))
    (let ((plane-class (apply #'get-plane-class
                              (collect-good-args
```

```
                                '(:plane-class
                                   :output-contract-class
                                   :input-contract-class
                                   :youth-contract-class
                                   :adult-contract-class )))))

;; Fill out Arguments
      (unless galaxy (setf (getf args :galaxy) (galaxy parent)))
      (unless connection (setf (getf args :connection)
                               (connection (getf args :galaxy))))
      ;; Make the Plane
      (apply #'*make-instance plane-class args))))

(defun get-plane-class (&key (plane-class 'silica-plane)
                             (output-contract-class 'output-contract)
                             (input-contract-class 'mute-input-contract)
                             (youth-contract-class 'mute-windowing-contract)
                             (adult-contract-class 'mute-windowing-contract))
  (let ((child-part (string (if (symbolp youth-contract-class)
                                (prog1 youth-contract-class
                                  (setq youth-contract-class
                                        (find-class youth-contract-class)))
                                (class-name youth-contract-class))))
        (parent-part (string (if (symbolp adult-contract-class)
                                 (prog1 adult-contract-class
                                   (setq adult-contract-class
                                         (find-class adult-contract-class)))
                                 (class-name adult-contract-class)))))
    (get-on-the-fly-class
      (string-downcase (concatenate 'string
                                    (subseq child-part 0
                                            (position #\- child-part))
                                    "--"
                                    (subseq parent-part 0
                                            (position #\- parent-part))))
      plane-class output-contract-class input-contract-class
      (contract-child-part (class-prototype youth-contract-class))
      (contract-parent-part (class-prototype adult-contract-class)))))

(defun get-plane-class-from-defaults (&rest args &key defaults
                                      &allow-other-keys)
  (remf args :defaults)
  (apply #'get-plane-class
         (nconc args
                (mapcan #'(lambda (key class)
                            (list key class))
                        '(:plane-class
                          :output-contract-class
                          :input-contract-class
                          :youth-contract-class
                          :adult-contract-class)
                        (pcl::class-local-supers defaults)))))

(defmethod *initialize-instance :after
  ((plane silica-plane)
   &key region owner parent transformation parent-p galaxy
   &allow-other-keys)

(let (my-adult-domain my-youth-domain)
    (if parent
        ;; Set up the youth windowing domain
        (progn (if (setq my-youth-domain (plane-adult-domain parent))

;; Add me to the right windowing domain if it exists.
                   (windowing-domain-add-child my-youth-domain plane transformation)

;; ELSE create/initialize a windowing domain first.
                   (setq my-youth-domain
                         (make-windowing-domain
                           :parent parent
                           :pairs (cons plane transformation))))

;; Now cache a pointer to youth-domain in the visual
               ;; plane
```

```
            (setf (plane-youth-domain plane) my-youth-domain)
            (setf (galaxy plane) (galaxy parent)))

;; Else set up the galaxy
        (setf (galaxy plane) galaxy))
    (when parent-p
        ;; This silica plane will parent some domain, so set up an
        ;; adult domain
        (setq my-adult-domain (make-windowing-domain :parent plane))
        (setf (plane-adult-domain plane) my-adult-domain))
    plane))

(defmethod destroy-plane ((plane silica-plane))
    ;; Assuming disowned by now.
    (when (plane-adult-domain plane)
        (dolist (child (plane-children plane))
            (setf (plane-youth-domain child)
                  nil)
            (destroy-silica-plane child))
        (setf (plane-adult-domain plane)
              nil))
    (when (plane-youth-domain plane)
        (windowing-domain-rem-child (plane-youth-domain plane)
                                    plane))
    (destroy-interactive-plane plane))

(defmethod plane-output-contract ((plane silica-plane))
    plane)

(defmethod plane-input-contract ((plane silica-plane))
    plane)

(defmethod plane-parent ((plane silica-plane))
    (let ((domain (plane-youth-domain plane)))
        (when domain (windowing-domain-parent domain))))

(defmethod plane-transformation ((plane silica-plane))
    (windowing-domain-transformation (plane-youth-domain plane) plane))

(defmethod plane-children ((plane silica-plane))
    (windowing-domain-children (plane-adult-domain plane)))

(defmethod plane-youth-contract ((plane silica-plane))
    (if (plane-youth-domain plane)
        (windowing-domain-contract (plane-youth-domain plane))))

(defmethod youth-contract ((silica-plane silica-plane))
    (let ((domain (slot-value silica-plane 'youth-domain)))
        (and domain (windowing-domain-contract domain))))

(defmethod plane-adult-contract ((plane silica-plane))
    (windowing-domain-contract (plane-adult-domain plane)))

(defmethod adult-contract ((silica-plane silica-plane))
    (let ((domain (slot-value silica-plane 'adult-domain)))
        (and domain (windowing-domain-contract domain))))

(defmethod plane-adoptees ((plane silica-plane))
    (let ((adult-domain (plane-adult-domain plane))
          contract)
        (and adult-domain
            (setq contract (windowing-domain-contract adult-domain))
            (contract-children contract))))

(defmethod plane-adopted? ((plane silica-plane))
    (contract-child-p (windowing-domain-contract (plane-youth-domain plane))
                      plane))

(defmethod connection ((plane silica-plane))
    (connection (slot-value plane 'galaxy)))
```

```
;;; *****
;;; Silica Plane Based COMPOSITION CACHES
;;; *****

;;; Mechanisms for calculating and caching of combined transformations and
;;; clipping regions
;;; Assuming that ancestor is really an ancestor.

;;;
;;; Transformation Calculation and Caching Scheme:

;;;   All attempts to get a delta-transformation are made through a call to
;;; fetch-delta-transformation.

;;;   A global index is bumped whenever any local transformation is changed.
;;; The value of the global index is associated with local transformation
;;; whenever they are set.  (So no two values associated with a
;;; local-transformations are the same and all values are ordered)

;;;   When a delta-transformation is calculated it is cached in the child along
;;; with the value of the global index.  Cached delta-transformations are
;;; checked by making sure that all local indexes are earlier then the delta
;;; index.

;;; Problems:

;;;   Am caching local transformations accidentally.  I fixed this but maybe
;;; not palatably, by making fetch check for this case.

;;;   The check is repeated up to the first bad index from each of the
;;; ancestors between the first and the bad one.

;;; Optimizations?:
;;;   An optimization based on a suggestion from Stan Lanning but not currently
;;; implemented is the following.
;;; At each node in the tree you keep a list that looks like this:
;;;     ((this-node this-stamp) . <list from parent>)
;;; When the transformation at a node is changed, it sets this-stamp
;;; Since these lists all share structure, all the children's cache-lists see
;;; the change.  When you need to verify a cached computed transformation from
;;; a node to some ancestor, pull the list out of the node and walk the list
;;; until you get to that ancestor.  No need to touch the ancestor objects at
;;; all.

(defmacro fetch-composition
    (node to-node calculation-fn cache-accessor stamp-accessor global-stamp)
  (once-only (node to-node)
    (let ((entry (gensym))
          (entry-stamp (gensym))
          (cache (gensym))
          (composition (gensym)))
      '(let* ((,cache (,cache-accessor ,node))
              (,entry (getf ,cache ,to-node))
              (,entry-stamp)
              (,composition))

;; IF AND Either nothing has changed in the universe OR nothing
         ;; that the entry depends on has changed since the entry was
         ;; caculated.

;; Return the cached value

;; ELSE Calculate and cache a value.
         (if (and ,entry (or (= (setq ,entry-stamp (car ,entry))
                                ,global-stamp)
                             (when (all-nodes-earlier? ,node ,to-node
                                                       ,entry-stamp
                                                       ,stamp-accessor)

;; Cuts off need to reconfirm this node
                               ;; by a walk along dependancy chain.
                               (setf (car ,entry)
                                     ,global-stamp))))
```

```
                     (cdr ,entry)
                     (progn (setf (getf ,cache ,to-node)
                                  (cons ,global-stamp (setq ,composition
                                                             (,calculation-fn
                                                              ,node
                                                              ,to-node))))
                            (if (null (,cache-accessor ,node))
                                (setf (,cache-accessor ,node)
                                      ,cache))
                            ,composition))))))

(defmacro all-nodes-earlier? (node terminal-node stamp stamp-accessor &optional
                              (next-node-fn 'plane-parent))
  (let ((node-planer (gensym)))

;; EXIT FAILED IF The nodes stamp shows that it is later than the
    ;; dependent stamp ;; Reaching the terminal node means that we have succeeded.
    ;; Notice that null ancestor will terminate properly too.
    '(do ((,node-planer ,node (,next-node-fn ,node-planer)))
         ((> (,stamp-accessor ,node-planer)
             ,stamp))
       (if (eq (,next-node-fn ,node-planer)
               ,terminal-node)
           (return t)))))

;;; *****
;;; CLIPPING REGIONS
;;; *****

(defmethod fetch-clipping-region ((plane silica-plane) ancestor)
  (cond ((null (plane-parent plane))
         (transformation-apply (galaxy-transformation (galaxy plane))
                               (plane-region plane)))
        ((eq (plane-parent plane) ancestor)
         (allocated-region (plane-youth-contract plane) plane))
        (t (fetch-composition
            plane ancestor calculate-clipping-region
            %clipping-region-cache %crstamp
            (galaxy-crstamp (galaxy plane))))))

(defmethod calculate-clipping-region ((plane silica-plane) ancestor)
  (region-intersection
   (transformation-apply
    (fetch-delta-transformation (plane-parent plane) ancestor)
    (allocated-region (plane-youth-contract plane) plane))
   (fetch-clipping-region (plane-parent plane) ancestor)))

(defmethod allocated-region ((contract contract) (child silica-plane))
  (if (children-intersect? contract)
      (reduce #'region-difference (mapcar
                                   #'(lambda (occluding-plane)
                                       (transformation-apply
                                        (plane-transformation
                                         occluding-plane)
                                        (plane-region
                                         occluding-plane)))
                                   (occluding-planes contract child))
              :initial-value
              (transformation-apply (plane-transformation child)
                                    (plane-region child)))
      (transformation-apply (plane-transformation child)
                            (plane-region child))))

(defmethod occluding-planes ((contract contract) (plane silica-plane))
  (let ((children (ordered-children contract)))
    (subseq children 0 (position plane children))))

;;; *****
;;; HIT DETECTION
;;; *****

(defmethod which-child ((plane silica-plane) (position position)
                        &optional filter-fn)
```

```lisp
  (let ((children (plane-adoptees plane)))
    (dolist (child children)
      (if (region-contains? (fetch-clipping-region child plane) position)
          (return child)))))

(defmethod which-descendant ((plane silica-plane) (position position)
                             &optional filter-fn)
  (let ((child (which-child plane position filter-fn)))
    (if child
        (if (plane-adoptees child)
            (or (which-descendant child (transformation-undo
                                          (plane-transformation
                                            child)
                                          position))
                child)
            child)
        plane)))

;;; *****
;;; DELTA TRANSFORMATIONS
;;; *****

(defmethod fetch-delta-transformation ((plane silica-plane) ancestor)
  (cond ((null (plane-parent plane))
         (galaxy-transformation (galaxy plane)))
        ((eq (plane-parent plane) ancestor)
         (plane-transformation plane))
        (t
         (fetch-composition plane ancestor calculate-delta-transformation
                            %delta-transformation-cache %dtstamp
                            (galaxy-stamp (galaxy plane))))))

(defmethod calculate-delta-transformation ((plane silica-plane) ancestor)
  ;; Intermediate transforms from intermediate ancestors to greatest
  ;; ancestor are automatically used if planeid and calculated and cached
  ;; if not.
  (transformation-compose
    (plane-transformation plane)
    (fetch-delta-transformation (plane-parent plane) ancestor)))
;;; -*- Mode: Lisp; Package: SILICA; Base: 10.; Syntax: Common-Lisp -*-
;;;
;;; Copyright (c) 1988 by Xerox Corporation.  All rights reserved.
;;;

(in-package "SILICA")

;;;
;;; SILICA WINDOW
;;;

;;;
;;; Windowing Contracts
;;;

(defclass part () ())
(defclass mute-part (part) ())
(defclass child-part (part) ())
(defclass parent-part (contract-part) ())

(defclass mute-parent-part (mute-part parent-part) () )
(defclass mute-child-part (mute-part child-part) () )

(defclass windowing-contract (relationship-contract)
  (
   ;; Should be initialized by subclass so that standard methods for
   ;; fetching related protocol classes will work.
   (parent-part
     :allocation :class
     :initform (find-class 'mute-parent-part)
     :accessor contract-parent-part)
   (child-part
     :allocation :class
     :initform (find-class 'mute-child-part)
     :accessor contract-child-part)

(ordered-children :initform nil :accessor ordered-children)
```

```
    (windowing-domain :initform nil :accessor contract-windowing-domain
                      :initarg :windowing-domain)

;; Allows clipping region / hit detection calculations to be
    ;; optimized.  An issue: Correction should be checked in the
    ;; interface, but the kernel is licensed to assume that this is
    ;; usuable information w/o error-checking.  Careful not to give back
    ;; the performance that we are trying to gain.
    (children-intersect? :allocation :class
                         :initform t
                         :accessor children-intersect?)))

(defclass mute-windowing-contract (windowing-contract)
  ())

(defmethod contract-children ((contract windowing-contract))
  (windowing-domain-children (contract-windowing-domain contract)))

(defmethod contract-child-p ((contract windowing-contract) child-maybe)
  (member child-maybe (contract-children contract)))

(defmethod contract-parent ((contract windowing-contract))
  (windowing-domain-parent (contract-windowing-domain contract)))

(defmethod contract-enacted ((contract windowing-contract))
  )

(defmethod contract-repealed ((contract windowing-contract))
  )

(defmethod parent-enabled ((contract windowing-contract) parent)
  )

(defmethod parent-disabled ((contract windowing-contract) parent)
  )
(defmethod parent-region-changed ((contract windowing-contract) parent)
  )

(defmethod parent-transformation-changed ((contract contract) parent)
  )

(defmethod child-enabled ((contract windowing-contract) child)
  (push child (ordered-children contract))
  (update-tables contract)
  (incf (galaxy-dmstamp (galaxy child))))

(defmethod child-disabled ((contract windowing-contract) child)
  (setf (slot-value contract 'adopted-children)
        (delq child (slot-value contract 'adopted-children)))
  (update-tables contract)
  (incf (galaxy-dmstamp (galaxy child))))

(defmethod child-region-changed ((contract windowing-contract) plane)
  (update-tables contract))

(defmethod child-transformation-changed ((contract windowing-contract) plane)
  (if contract
      (update-tables contract)
      ;; Must be the galaxy that's moving.
      (setf (%crstamp plane)
            (incf (galaxy-crstamp (galaxy plane)))))

;; Bump and copy down the galaxy's stamp.
  (setf (%dtstamp plane)
        (incf (galaxy-stamp (galaxy plane))))
  )

(defmethod contract-change-order ((contract contract) child new-priority)
  (update-tables contract)
  (incf (galaxy-dmstamp (galaxy child))))

(defmethod update-tables ((contract contract)
                          &rest args &key &allow-other-keys)
  (if (contract-parent contract)
```

```
         (when (children-intersect? contract)
           ;; Bump and copy down the galaxy's stamp.
           (let ((global-stamp (incf (galaxy-crstamp (galaxy
                                                      (contract-parent
                                                       contract))))))
             (dolist (child (ordered-children contract))
               (setf (%crstamp child) global-stamp))))))
;;; -*- Mode: Lisp; Package: SILICA; Base: 10.; Syntax: Common-Lisp -*-
;;;
;;; Copyright (c) 1987, 1988 by Xerox Corporation.  All rights reserved.
;;;

(in-package "SILICA")

;;;
;;; SILICA OUTPUT.
;;;
;;; OUTPUT MANAGEMENT
;;;

;;;
;;; Output contracts provide output functionality to interactive planes
;;; (i.e. are responsible for selecting and installing graphics packages) and
;;; for providing a mechanism for the windowing contracts to preserve the
;;; presentation of the parent of thier domains.
;;;

(defclass output-contract (plane-contract)
  (                                       ; EXTERNAL
   (output-client :initform nil :initarg :output-client
                  :type output-client)

;; dictates the graphics primitive that can be
   ;; performed on this canvas
   (display-medium :initarg :display-medium
                   :type display-medium)

;; Selecting Display Medium.
   (display-medium-mode :initform :allocate
                        :type (member :allocate :allocate-on-need
                                      :allocate-when-mapped :provide-on-need))
   (display-medium-type :type (or (list class) class))

;; Determine whether the interactive plane can have
   ;; children which contribute to the image on this
   ;; plane.  :none means no outputting children,
   ;; :share means space is shared by child and parent.
   ;; :parent means child gets exclusive use of space.
   (children-mode :type (member :none :share :exclusive)
                  :initform :share :initarg :children-mode)))

(defclass mute-output-contract (output-contract)
  nil)

(defmethod *initialize-instance :after
   ((output-contract output-contract)
    &rest args
    &key
    display-medium (display-medium-mode :provide-on-need) display-medium-type
    connection galaxy
    &allow-other-keys)

(unless display-medium
    (unless display-medium-type
      (setq display-medium-type (connection->abc-dm-type connection)))
    (case display-medium-mode
      (:allocate
       (setf (slot-value output-contract 'display-medium)
             (apply #'make-display-medium display-medium-type
                    :galaxy      galaxy
                    :connection connection
                    :output-contract output-contract
                    :allow-other-keys t args)))

((:allocate-on-need :allocate-when-mapped :provide-on-need)
       (setf (slot-value output-contract 'display-medium-mode)
```

```
              display-medium-mode)
        (setf (slot-value output-contract 'display-medium-type)
              display-medium-type)))))
(defmethod output-contract-repaint ((self output-contract) repaint-region)

;; Ignoring repaint-region.  If t it will signify do as we are
  ;; currently doing, i.e. paint whole thing.
  (output-client-repaint (slot-value self 'output-client)
                         self
                         (plane-region self))

;; The reverse is hoaky.  Just a temporary fix for allowing the
  ;; children to be displayed in the right order.  Assuming that they are
  ;; stored in reverse creation order.  This behavior of repaint the
  ;; children should be up to the contract or somebody else.
  (dolist (child (reverse (plane-adoptees self)))
    (output-contract-repaint child (plane-region child))))

(defmethod output-contract-display-medium ((oc output-contract))
  (let ((dm (slot-value oc 'display-medium)))
    (unless dm ;; May need to Allocate
      (case (slot-value oc 'display-medium-mode)
        (:allocate-on-need ;; Need to Allocate
         (setf (slot-value oc 'display-medium)
               (setq dm (make-instance (slot-value oc 'display-medium-type)))))
        (:provide-on-need (error
                           "Trying to fetch display medium for plane that doesn't keep one."
                           ))))
    dm))

;;;
;;; Kernel Event Notifications
;;;

(defmethod output-region-changed ((output-contract output-contract) plane)
  (incf (galaxy-dmstamp (galaxy plane))))

(defmethod output-transformation-changed
    ((output-contract output-contract) plane)
  (incf (galaxy-dmstamp (galaxy plane))))

;;; The below is unimplemented design(???)
;;;   This file provides the standard output handling mechanisms.  This
;;; includes a fairly flexible output contract which is heavily modelled on X
;;; and Tajo, uses the ABC graphics package for its implementation, though
;;; clients are allowed to use whatever graphics packages they want to use,
;;; etc...

#+soon
(defclass standard-output-contract (output-contract)
  (                                   ; Handling Output ;; The output-control-option determines what happens when there is
   ;; output to a interactive plane that has an invisible region.  Choices
   ;; could include hold-output, try-output, stack-and-try-output
   output-control-mode
   ;; Stuff for handling different display types...
   (color-map :initform :inherit :type (or (member :inherit)))
   (depth :initform :inherit :type (or (member :inherit) integer))
   (visual-type :initform :inherit :type (or (member :inherit) card29))))
;;;
;;; Clients of the Output
;;;

(defclass output-client ()
  ())

(defmethod output-client-repaint ((self output-client)
                                  output-contract repaint-region)
  (protocol-holder "OUTPUT-CLIENT"))
```

```
;;; -*- Mode: Lisp; Package: SILICA; Base: 10.; Syntax: Common-Lisp -*-
;;;
;;; Copyright (c) 1988 by Xerox Corporation. All rights reserved.
;;;

(in-package "SILICA")

;;;
;;; SILICA INPUT
;;;

;;;
;;; INPUT MANAGEMENT
;;;

(defclass input-contract (plane-contract)
  nil)

(defclass mute-input-contract (input-contract)
  nil)

(defclass standard-input-contract (input-contract)
  ())
;;; -*- Mode: Lisp; Package: SILICA; Base: 10.; Syntax: Common-Lisp -*-
;;;
;;; Copyright (c) 1987, 1988 by Xerox Corporation. All rights reserved.
;;;

;;;
;;; SILICA-KERNEL
;;;
(in-package "SILICA")

;;; CONTRACT EVENTS. These are in two sets: 1) contract events those dealing
;;; with contract enacting and repealing and ordaining and disowning planes
;;; into contracts and 2) plane events dealing with changing the elements of
;;; planes and domains in an ordained domain (i.e. the regions and
;;; transformations).
;;;
;;; KERNEL EVENTS
;;; Below a set of "kernel event" generic functions are defined. In particular,
;;; two sets of events are defined:
;;; 1) a protocol for changing the contracts used by a plane or a domain.
;;; 2) a notification protocol that defines how contracts are notified of
;;; changes to the skeletal silica-plane tree.
;;;
;;; CONTRACT EVENTS: Establishing Contracts (defmethod enact-contract ((windowing-domain windowing-domain) contract)

(if (windowing-domain-contract windowing-domain)
      (error "A contract is already enacted in this domain"))

(setf (windowing-domain-contract windowing-domain) contract)
  (setf (contract-windowing-domain contract) windowing-domain)
  (contract-enacted contract))

(defmethod repeal-contract ((windowing-domain windowing-domain))
  (let ((contract (windowing-domain-contract windowing-domain)))
    (if (null contract)
        (error "No contract is enacted in this domain"))
    (setf (windowing-domain-contract windowing-domain) nil)
    (contract-repealed contract)
    contract))

#+soon
(defmethod change-contract
    ((windowing-domain windowing-domain) contract)
  (contract-repealed (windowing-contract silica-plane))
  (setf (windowing-domain-contract windowing-domain) contract)
  (contract-enacted contract))

#+soon
(defmethod change-input-contract
    ((silica-plane silica-plane) input-contract)
  (input-contract-repealed (input-contract silica-plane) silica-plane)
  (setf (input-contract silica-plane) input-contract))
```

```
#+soon
(defmethod change-output-contract
    ((silica-plane silica-plane) output-contract)
  (output-contract-repealed (output-contract silica-plane) silica-plane)
  (setf (output-contract silica-plane) output-contract))
;;;
;;; TREE Events
;;;
;;; PLANE EVENTS.
;;; Owner and parent are not supported at this time.  Owner may be needed.
;;; Parent should not be allowed since its to hard to tell what changing a
;;; child's parent when it is ordained means.  All the possibility can be
;;; implemented as needed using the existing functions ;;; The elements of planes and domains should not be changed except by using the
;;; following setfs or notification procedures when the elements have been
;;; changed by modifying objects directly.  This allows reconfigurations of the
;;; elements of windowing domain and planes to be transmitted to neighboring domains
;;; as well as to the output and input contracts of the plane.

;;; Need to think about these. ???
(defmacro notify-youth-contract (plane fn)
  (let ((contract (gentemp)))
    '(let ((,contract (youth-contract ,plane)))
       (and ,contract (,fn ,contract ,plane)))))
(defmacro notify-adult-contract (plane fn)
  (let ((contract (gentemp)))
    '(let ((,contract (adult-contract ,plane)))
       (and ,contract (,fn ,contract ,plane)))))

(defmethod enable-plane ((silica-plane silica-plane))
  (notify-youth-contract silica-plane child-enabled)
  (notify-adult-contract silica-plane parent-enabled)
#+soon  (output-enabled (output-contract silica-plane) silica-plane)
#+soon  (input-enabled (input-contract silica-plane) silica-plane)
  )

(defmethod disable-plane ((silica-plane silica-plane))
  (notify-youth-contract silica-plane child-disabled)
  (notify-adult-contract silica-plane parent-disabled)
#+soon  (output-disabled (output-contract silica-plane) silica-plane)
#+soon  (input-disabled (input-contract silica-plane) silica-plane)
  )

(defmethod (setf plane-region) (new-region (silica-plane silica-plane))
  (setf (slot-value silica-plane 'region) new-region)
  (plane-region-changed silica-plane))

(defmethod plane-region-changed ((plane silica-plane))
  (notify-youth-contract plane child-region-changed)
  (notify-adult-contract plane parent-region-changed)
  (output-region-changed (plane-output-contract plane) plane)
#+soon  (input-region-changed (input-contract plane) plane))

(defmethod (setf plane-transformation)
    (new-transformation (plane silica-plane))

(setf (windowing-domain-transformation (plane-youth-domain plane) plane)
        new-transformation)
  (plane-transformation-changed plane))

(defmethod plane-transformation-changed ((plane silica-plane))
  (notify-youth-contract plane child-transformation-changed)
  ;; no parent-transformation-changed since a transformation is only effected
  ;; by one windowing contract, namely the contract.
  (output-transformation-changed (plane-output-contract plane) plane)
#+soon  (input-transformation-changed (input-contract plane) plane))

;;;
;;; Combination events.
;;;

(defmethod enable-all ((windowing-domain windowing-domain))
  (enable-plane (windowing-domain-parent windowing-domain))
  (enable-children windowing-domain (windowing-domain-children windowing-domain)))
```

```
(defmethod disable-all ((windowing-domain windowing-domain))
  (disable-plane (windowing-domain-parent windowing-domain))
  (disable-children windowing-domain (contract-children (windowing-domain-contract
                                                          windowing-domain))))

(defmethod enable-children ((plane windowing-domain) children)
  (dolist (child children)
    (enable-plane child)))

(defmethod disable-children ((plane windowing-domain) children)
  (dolist (child children)
    (disable-plane child)))
;;; -*- Mode: Lisp; Package: SILICA; Base: 10.; Syntax: Common-Lisp -*-
;;;
;;; Copyright (c) 1988 by Xerox Corporation.  All rights reserved.
;;;

(in-package "SILICA")

;;;
;;; ON XEROX
;;;

;;;
;;; Xerox Connections
;;;

(defclass xerox-connection (connection)
    (
     (connection-cprops :allocation :class
                        :initform ()
                        :accessor connection-cprops)
     (galaxy-type :initform 'xerox-galaxy
                  :allocation :class)))

(defmethod *initialize-instance :after
   ((connection xerox-connection) &key host display-id &allow-other-keys)
  )

(defmethod destroy-connection :before
   ((connection xerox-connection))
  )

;;;
;;; Xerox Galaxy
;;;

(defun coerce-to-il-region (r)
  (il:createregion (rectangle-left r)
                   (rectangle-bottom r)
                   (rectangle-width r)
                   (rectangle-height r)))

(defun coerce-to-abc-region (il-region)
  (make-rectangle :left   (il:fetch (il:region il:left) il:of il-region)
                  :bottom (il:fetch (il:region il:bottom) il:of il-region)
                  :width  (il:fetch (il:region il:width) il:of il-region)
                  :height (il:fetch (il:region il:height) il:of il-region)))

(defclass xerox-galaxy (galaxy)
  ((xerox-window :accessor xerox-window)))

(defmethod *initialize-instance :after
    ((galaxy xerox-galaxy)
     &key connection region (title "Silica-based Medium")
     &allow-other-keys)

;; Eventually connection can be used to bring up remote
  ;; Xerox Galaxies
  (declare (ignore connection))

(let* ((il-window (il:createw (or region (il:getregion))
                                title)))

(il:windowprop il-window 'il:buttoneventfn #'silica-buttoneventfn)
    (il:windowprop il-window 'il:rightbuttonfn
                   #'(lambda (il-window)
```

```
                (if (il:insidep (il:dspclippingregion nil il-window)
                                (il:lastmousex il-window)
                                (il:lastmousey il-window))
                    (silica-buttoneventfn il-window)
                    (il:dowindowcom il-window))))
    (il:windowprop il-window 'il:aftermovefn #'window-change-fn)
    (il:windowprop il-window 'il:reshapefn #'window-change-fn)
    (setf (xerox-window galaxy) il-window)
    (il:windowprop il-window 'galaxy galaxy)

galaxy))

(defmethod destroy-galaxy :after
  ((galaxy xerox-galaxy))
  (il:closew (xerox-window galaxy)))

(defmethod install-galaxy-root ((galaxy xerox-galaxy)
                                root-plane &key transformation display-medium
                                &allow-other-keys)
  (let* ((il-window (xerox-window galaxy))
         (il-dsp (il:windowprop il-window 'il:dsp))
         (il-region (il:dspclippingregion nil il-dsp))
         (root-region (funcall (intern "COERCE-TO-ABC-REGION" "DM-IL")
                               il-region)))
    (setf (galaxy-root galaxy) root-plane)
    (setf (galaxy root-plane) galaxy)
    (setf (slot-value galaxy 'transformation)
          (make-transformation :x-translation (il:dspxoffset nil il-dsp)
                               :y-translation (il:dspyoffset nil il-dsp)))
    (setf (rectangle-left root-region)     0
          (rectangle-bottom root-region)   0)
    (setf (plane-region root-plane) root-region)

;; Use the window's dsp if a dm hasn't been passed in.
    (unless display-medium
      (setf (slot-value (slot-value root-plane 'display-medium)
                        (intern "DISPLAY-STREAM" "DM-IL"))
            il-dsp))
    root-plane))

(defun silica-buttoneventfn (window)
  (let nil
    (il:totopw window)
    (il:getmousestate)
    (setq *galaxy* (il:windowprop window 'galaxy))
    (if (plane-owner (galaxy-root *current-galaxy*))

;; STK not around yet.  This is just for temporary input
        ;; handling.
        (funcall (intern "HANDLE-MOUSE" "STK")
                 (plane-owner (galaxy-root *current-galaxy*))
                 (make-position :x (il:lastmousex window)
                                :y
                                (il:lastmousey window))))
    (values)))

(defun window-change-fn (window)
  (let ((dsp (il:windowprop window 'il:dsp))
        (galaxy (il:windowprop window 'galaxy)))
    (setf (galaxy-transformation galaxy)
          (make-transformation :x-translation (il:dspxoffset nil dsp)
                               :y-translation (il:dspyoffset nil dsp)))))

;;;
;;; Bitmaps
;;;

#||
(deftype xerox-bitmap nil "A Silica bitmap"
  '(satisfies il:bitmapp))

(eval-when (eval compile load)
       (pcl::define-built-in-classes '((xerox-bitmap (bitmap)))))

(defmethod galaxy-make-bitmap ((galaxy xerox-galaxy) width height)
  (il:bitmapcreate width height))
```

```
(defmethod bitmap-width ((bitmap xerox-bitmap))
        (il:bitmapwidth bitmap))
(defmethod bitmap-height ((bitmap xerox-bitmap))
        (il:bitmapheight bitmap))
||#

(defclass xerox-bitmap (bitmap)
  ((il-bm :accessor il-bm)))

(defmethod galaxy-make-bitmap ((galaxy xerox-galaxy) width height)
  (let ((bm (make-instance 'xerox-bitmap)))
    (setf (il-bm bm) (il:bitmapcreate width height))
    bm))

(defmethod bitmap-width ((bitmap xerox-bitmap))
        (il:bitmapwidth (il-bm bitmap)))

(defmethod bitmap-height ((bitmap xerox-bitmap))
        (il:bitmapheight (il-bm bitmap)))

;;;
;;; Fake Input
;;;

(defun get-region (silica-plane)
   ;; Get the region into the coordinate system of the silica-galaxy.
   (let ((il-region (il:getregion)))
     (transformation-undo
       (fetch-delta-transformation silica-plane nil)
       (make-rectangle :left    (il:fetch il:left il:of il-region)
                       :bottom  (il:fetch il:bottom il:of il-region)
                       :width   (il:fetch il:width il:of il-region)
                       :height  (il:fetch il:height il:of il-region))
       t)))

(defun get-position (silica-plane &optional (position nil))
   ;; Get the region into the coordinate system of the silica-galaxy.
   (let ((il-pos))
     (unless position
       (setq il-pos (il:getposition))
       (setq position (make-position :x (il:fetch il:xcoord il:of il-pos)
                                     :y (il:fetch il:ycoord il:of il-pos))))
     (transformation-undo (fetch-delta-transformation silica-plane nil)
                          position)))

(defun get-box-region (&optional (silica-plane nil)
                                 w h)
   (let ((il-region (il:getboxregion w h)))
     (transformation-undo
       (fetch-delta-transformation silica-plane nil)
       (make-rectangle :left    (il:fetch il:left il:of il-region)
                       :bottom  (il:fetch il:bottom il:of il-region)
                       :width   (il:fetch il:width il:of il-region)
                       :height  (il:fetch il:height il:of il-region))
       t)))

(defun create-menu (items font)
   (il:|create| il:menu il:items il:_ items il:centerflg il:_ t il:menufont
       il:_ font))

(defun do-menu (menu)
   (il:menu menu))
;;; -*- Mode: Lisp; Package: DM-IL; Base: 10.; Syntax: Common-Lisp -*-
;;;
;;; Copyright (c) 1988 by Xerox Corporation.  All rights reserved.
;;;

;;;
;;; DM IL
;;;
(provide "DM-IL")
(in-package "DM-IL")

;shadow
;export
(unless (il:getd 'il:zoom-font)
        (load "{EG:PARC:XEROX}<LANNING>PCL>SIRIUS>ZOOM-FONT.dfasl"))
```

```lisp
(use-package '("SILICA" "PCL" "LISP" "CL-EXTRA"))
(import-generals "DM-IL")
(import '(silica::coerce-to-il-region silica::coerce-to-abc-region))

;;; -----------  ;;;
;;; Basic IL DM  ;;;
;;; -----------  ;;;

;;; This class implements the basic requirements of a a display medium using
;;; the Xerox Lisp Display Stream graphics package (defclass basic-il-display-medium (display-medium)
  ((display-stream :accessor display-stream)
   (client-transformation :initform *null-transformation*
                          :reader client-transformation)
   (client-clipping-region :initform *plane*
                           :reader client-clipping-region)
   (combined-transformation :initform nil
                            :accessor combined-transformation)
   (combined-clipping-region :initform nil
                             :accessor combined-clipping-region)))

(xcl:defglobalvar dsp-target (il:|create| il:bitmap il:|using|
                              il:|ScreenBitMap|))

(defmethod *initialize-instance :after
  ((display-medium basic-il-display-medium)
   &rest keys
   &key (display-stream nil ds-supplied-p)
   &allow-other-keys)

;; nil as <display-stream> means don't create, otherwise use argument
  ;; or create a display stream if necessary.
  (if (not ds-supplied-p)
      (setq display-stream (il:dspcreate dsp-target)))
  (if (and display-stream (type-of display-stream 'stream))
      (setf (slot-value display-medium 'display-stream)
            display-stream))
  display-medium)

;;;
;;; DM Operations.
;;;

(defmethod (setf display-medium-transformation)
    ((transformation transformation) (dm basic-il-display-medium))
  (with-slots (display-stream combined-transformation) dm
    (call-next-method)
    (setf combined-transformation
          (transformation-compose transformation (client-transformation dm)
                                  combined-transformation))
    (if (translationp combined-transformation)
        (progn (il:dspxoffset (transformation-dx combined-transformation)
                              display-stream)
               (il:dspyoffset (transformation-dx combined-transformation)
                              display-stream))
        (progn (il:dspxoffset 0 display-stream)
               (il:dspyoffset 0 display-stream)))))

(defmethod (setf client-transformation)
    (new-transformation (dm basic-il-display-medium))
  (setf (slot-value dm 'client-transformation) new-transformation)
  (display-medium-invalidate dm))

(defmethod (setf display-medium-clipping-region)
    ((region region) (dm basic-il-display-medium))

(with-slots (combined-clipping-region) dm
    (call-next-method)
    (setf combined-clipping-region
          (region-intersection (client-clipping-region dm) region))

(typecase combined-clipping-region
      (rectangle (with-slots ((ds display-stream)) dm
                   (il:dspclippingregion
                    (let ((il-region (coerce-to-il-region
                                       combined-clipping-region)))
```

```
                        ;; We are in device coordinates, but
                        ;; dspclippingregion expects stream coordinates,
                        ;; so undo offset.
                        (decf (first il-region) (il:dspxoffset nil ds))
                        (decf (second il-region) (il:dspyoffset nil ds))
                        il-region)
                    ds)))
        (plane (il:dspclippingregion
                (il:createregion 0 0 il:screenwidth il:screenheight)
                (display-stream dm)))

;; For non-handled region types, a do-clipped operation will have
        ;; to do it piecewise at output time.
        (otherwise ))))

(defmethod (setf client-clipping-region)
    (new-clipping-region (dm basic-il-display-medium))
  (setf (slot-value dm 'client-clipping-region) new-clipping-region)
  (display-medium-invalidate dm))

(defmethod cleanup-display-medium ((dm basic-il-display-medium))
  (unless (typep (client-clipping-region dm) 'plane)
    (setf (client-clipping-region dm) *plane*))
  (unless (typep (client-transformation dm) 'null-transformation)
    (setf (client-transformation dm) *null-transformation*)))

;;;
;;; IL Output Protection
;;;

(defmacro with-il-output-protection (dm &body body)
  `(with-output-protection ,dm (do-clipped ,dm ,@body)))

;;;
;;; Clipping Support for Graphics
;;;

(defmacro do-clipped (display-medium &body forms)
  (let ((dm (gensym)))
    `(let ((,dm ,display-medium))
       (do-clipped-operation ,dm (combined-clipping-region
                                  ,dm)
                             #'(lambda nil ,@forms)))))

(defmethod do-clipped-operation ((dm basic-il-display-medium)
                                 (rectangle region)
                                 fn)
  (funcall fn))

(defmethod do-clipped-operation ((dm basic-il-display-medium)
                                 (ca compound-region)
                                 fn)
  ;; The fn must only side effect the stream, since that can be
  ;; protected.
  (when (regions ca)
    (let* ((il-stream (display-stream dm))
           (x-pos (il:dspxposition nil il-stream))
           (y-pos (il:dspyposition nil il-stream))
           (x-off (il:dspxoffset nil il-stream))
           (y-off (il:dspyoffset nil il-stream)))
      (dolist (rectangle (rest (regions ca)))
        (il:dspclippingregion (il:createregion (- (left rectangle)
                                                  x-off)
                                               (- (bottom rectangle)
                                                  y-off)
                                               (width rectangle)
                                               (height rectangle))
                              il-stream)
        (unwind-protect
            (funcall fn)

;; Unwind potential side effects.
          (il:dspxposition x-pos il-stream)
          (il:dspyposition y-pos il-stream)))
      ;; Now do it for the last time, this time letting the
      ;; side-effects show thru.
      (il:dspclippingregion (il:createregion
                             (- (left (first (regions ca)))
```

```
                              x-off)
                           (- (bottom (first (regions
                                                ca)))
                              y-off)
                           (width (first (regions ca)))
                           (height (first (regions ca))))
                         il-stream)
 (funcall fn))))
;;; ---------------------------- ;;;
;;; SILICA's ABC Graphics Package ;;;
;;; ---------------------------- ;;;

(defvar *connection-prototype*
  (pcl::class-prototype (find-class 'w::xerox-connection)))

;;;
;;; Fonts
;;;

(defclass abc-font (font)
  ())

(setf (connection-cprop *connection-prototype* :abc-font-type)
      (find-class 'abc-font))

(defmethod font-ascent ((font abc-font))
  (il:fontprop (il-font font) 'il:ascent))

(defmethod font-descent ((font abc-font))
  (il:fontprop (il-font font) 'il:descent))

(defmethod font-height ((font abc-font))
  (il:fontprop (il-font font) 'il:height))

(defmethod string-width ((font abc-font) string)
  (il:stringwidth string (il-font font)))

(setq *default-font* nil)

;;;
;;; Font Translations
;;;

(xcl:defglobalvar *font-families* '((:fixed-pitch (il:display il:gacha)
                                                  (il:press il:gacha)
                                                  (il:interpress il:terminal))
                                     (:sans-serif (il:display il:helvetica)
                                                  (il:press il:helvetica)
                                                  (il:interpress il:modern))
                                     (:serif (il:display il:timesroman)
                                             (il:press il:timesroman)
                                             (il:interpress il:classic)))
  "Mapping from ABC font families to Interlisp font families")

(defmethod il-font ((font abc-font) &optional (stream-type 'il:display))
  (let ((font-translation-alist (assoc (font-family font)
                                       *font-families* :test #'eq)))
    (if font-translation-alist
        (il:zoom-font (il:fontcreate (second (assoc stream-type
                                                    (rest
                                                     font-translation-alist
                                                     )
                                                    :test
                                                    #'eq))
                                      (font-size font)
                                      (cond ((and (font-bold? font)
                                                  (font-italic? font))
                                             'il:bir)
                                            ((font-bold? font)
                                             'il:brr)
                                            ((font-italic? font)
                                             'il:mir)
```

```
                                          (t 'il:mrr))
                                  (round (font-rotation font))
                                  stream-type)
                      (font-scale font)
                      stream-type)
          (error ""%Illegal font family ~S." (font-family font)))))

;;; Font Setup (defun preload-fonts nil
      (xcl:ignore-errors
        (unwind-protect
            (let nil (format t ""%; Preloading scaled fonts (↑E okay)...")
                (dolist (font-descr *font-families*)
                        (let ((il-font-family (second (assoc 'il:display
                                                              font-descr :test
                                                              #'eq))))
                             (when il-font-family
                                 (format t ""A..." il-font-family)
                                 (il:force-load-zoom-fonts il-font-family)))))
            (format t "done.~%"))))
;;;
;;; ABC Display Medium
;;;

(defclass abc-display-medium (basic-il-display-medium abc-basic-display-medium)
    ((font :initform (make-font :font-type 'abc-font) :reader font)
     (line-width :initform 1 :accessor line-width)
     (shade :initform *default-shade* :accessor shade))
    (:documentation "A Basic Core of Graphics Routines"))

(defclass abc-bitmap-medium (abc-display-medium)
    ((target :initform nil :reader target)))

(setf (connection-cprop *connection-prototype* :abc-dm-type)
      (find-class 'abc-display-medium))

(setf (connection-cprop *connection-prototype* :abc-bm-type)
      (find-class 'abc-bitmap-medium))

;;; ABC Context Operations
;;; Note we use the client-clipping region facility, but not the client
;;; transformation facility, since we try to support more complicated client
;;; transformations than dsp's can handle.

(defmethod clipping-region ((dm abc-display-medium))
    (transformation-undo (combined-transformation dm)
                        (client-clipping-region dm)))

(defmethod (setf clipping-region) (new-region (dm abc-display-medium))
    (setf (client-clipping-region dm)
          (transformation-apply (combined-transformation dm)
                                new-region)))

(defmethod location ((dm abc-display-medium))
    (transformation-undo
      (combined-transformation dm)
      (make-position :x (il:dspxposition nil (display-stream dm))
                     :y (il:dspyposition nil (display-stream dm)))))

(defmethod (setf location) (new-value (dm abc-display-medium))
    (with-slots (display-stream combined-transformation) dm
      (let ((new-loc (transformation-apply combined-transformation
                                            new-value)))
        (unless (translationp combined-transformation)
            (error "Non-translations not supported on abc-il yet"))
        (il:dspxposition (position-x new-loc) display-stream)
        (il:dspyposition (position-y new-loc) display-stream)
        new-value)))

(defmethod operation ((dm abc-display-medium))
    (ecase (il:dspoperation nil (display-stream dm))
          (il:paint :paint)
          (il:replace :replace)
          (il:invert :invert)
          (il:erase :erase)))
```

```
(defmethod (setf operation) (new-value (dm abc-display-medium))
  (il:dspoperation (ecase new-value
                     (:paint 'il:paint)
                     (:replace 'il:replace)
                     (:invert 'il:invert)
                     (:erase 'il:erase))
                   (display-stream dm))
  new-value)

(defmethod (setf font) (font (dm abc-display-medium))
  ;; Not handling Scale here.
  (il:dspfont (il-font font) (display-stream dm))
  (setf (slot-value dm 'font) font))

;;;
;;; Bitmap DM
;;;

(defmethod (setf target)
    ((bitmap silica::xerox-bitmap) (dm abc-bitmap-medium))
  (il:dspdestination (silica::il-bm bitmap) (display-stream dm))
  (setf (slot-value dm 'target) bitmap))
;;;
;;; Graphics Operations
;;;

(defmethod copy-rectangle
    ((target abc-display-medium) x y
     (source silica::xerox-bitmap) left bottom width height)
  (with-il-output-protection target
    (let ((transformation (combined-transformation target)))
      (if (translationp transformation)

;; Just a translation
          (il:bitblt (silica::il-bm source) left bottom
                     (display-stream target) x y width height 'il:input)

;; Much less common
          (let* ((clipped-source
                  (let ((bm (make-bitmap :width width :height height)))
                    (il:bitblt (silica::il-bm source) left bottom
                               (silica::il-bm bm))
                    bm))
                 (rotated-source
                  (ecase (rotation transformation)
                    (0 clipped-source)
                    (90 (il:rotate.bitmap.left clipped-source))
                    (-90 (il:rotate.bitmap.right clipped-source))
                    (180 (il:rotate.bitmap.left
                          (il:rotate.bitmap.left clipped-source)))))
                 (scale (scale transformation))
                 (final-source
                  (cond ((= scale 1) rotated-source)
                        ((integerp scale)
                         (il:expandbitmap rotated-source scale scale))
                        ((rationalp scale)
                         (il:shrink.bitmap
                          (il:expandbitmap rotated-source
                                           (numerator scale)
                                           (numerator scale))
                          (denominator scale)))
                        (t (error "~%Can't handle arbitrary scale fplanes."))))
                 (final-region (transformation-apply
                                transformation
                                (make-rectangle :left x :bottom y
                                                :width width
                                                :height height)
                                t)))
            (il:bitblt (silica::il-bm final-source) nil nil
                       (display-stream target)
                       (left final-region) (bottom final-region)
                       nil nil 'il:input))))))

(defmacro %fill-rectangle (dm left bottom width height &optional shade)
  (let ((il-shade (or shade '(shade->il-shade (shade ,dm))))
        (dsp '(display-stream ,dm)))
    '(let ((transformation (combined-transformation ,dm)))
```

```
          (if (translationp transformation)
              (il:bltshade ,il-shade ,dsp ,left ,bottom ,width ,height)
              (multiple-value-bind (l b w h)
                  (transform-rectangle transformation
                                       ,left ,bottom ,width ,height)
                (il:bltshade ,il-shade ,dsp l b w h))))))

(defmacro %clear-rectangle (dm left bottom width height)
  '(%fill-rectangle ,dm ,left ,bottom ,width ,height 0))

(defmethod clear-media ((dm abc-display-medium))
  (with-il-output-protection dm
    (%clear-rectangle dm 0 0 2000 2000)))

(defmethod clear-media ((dm abc-bitmap-medium))
  (%clear-rectangle dm 0 0 2000 2000))

(defmethod clear-region ((dm abc-display-medium) (region rectangle))
  (with-slots (left bottom width height) region
    (with-il-output-protection dm
      (%clear-rectangle dm left bottom width height))))

(defmethod clear-region ((dm abc-bitmap-medium) (region rectangle))
  (with-slots (left bottom width height) region
    (%clear-rectangle dm left bottom width height)))

(defmethod clear-rectangle ((dm abc-display-medium) left bottom width height)
  (with-il-output-protection dm
    (%clear-rectangle dm left bottom width height)))

(defmethod clear-rectangle ((dm abc-bitmap-medium) left bottom width height)
  (%clear-rectangle dm left bottom width height))

(defmethod fill-media ((dm abc-display-medium))
  (with-il-output-protection dm
    (%fill-rectangle dm 0 0 2000 2000)))

(defmethod fill-media ((dm abc-bitmap-medium))
  (%fill-rectangle dm 0 0 2000 2000))

(defmethod fill-region ((dm abc-display-medium) (region rectangle))
  (with-slots (left bottom width height) region
    (with-il-output-protection dm
      (%fill-rectangle dm left bottom width height))))

(defmethod fill-region ((dm abc-bitmap-medium) (region rectangle))
  (with-slots (left bottom width height) region
    (%fill-rectangle dm left bottom width height)))

(defmethod fill-rectangle ((dm abc-display-medium) left bottom width height)
  (with-il-output-protection dm
    (%fill-rectangle dm left bottom width height)))

(defmethod fill-rectangle ((dm abc-bitmap-medium) left bottom width height)
  (%fill-rectangle dm left bottom width height))

(defmethod draw-to ((dm abc-display-medium) point)
  (with-il-output-protection dm
    (let ((transformation (combined-transformation dm)))
      (if (translationp transformation)
          (il:drawto (position-x endpoint) (position-y point)
                     (line-width dm) nil
                     (display-stream dm))
          (let ((endpoint (transformation-apply transformation point)))
            (il:drawto (position-x endpoint) (position-y point)
                       (* (transformation-scale transformation)
                          (line-width dm))
                       nil
                       (display-stream dm)))))))

(defmethod draw-segments ((dm abc-display-medium) segments)
  ;; Destructively modifies segments.
  (with-il-output-protection dm
    (let* ((tr (combined-transformation dm)))
      (if (translationp tr)
          (do ((tail segments (cddddr tail)))
              ((null tail))
```

```
                  (il:drawline (first tail) (second tail)
                               (third tail) (fourth tail)
                               (line-width dm) nil (display-stream dm)))
         ;;
         (error "Don't support non translations here!")))))

(defmethod print-string ((dm abc-display-medium) string)
  (with-il-output-protection dm
    (princ string (display-stream dm))))

(defmethod print-string-justified
     ((dm abc-basic-display-medium) string left bottom width height
      &optional (horizontal-alignment :center) (vertical-alignment :center))
  (with-slots (display-stream combined-transformation) dm
    (unless (translation combined-transformation)
      (error "Not supporting Scaling yet!"))
    (let ((old-xp (il:dspxposition nil display-stream))
          (old-yp (il:dspyposition nil display-stream)))
      (unwind-protect
          (progn
            (il:dspxposition
              (+ (transformation-dx combined-transformation)
                 (ecase horizontal-alignment
                   (:left left)
                   (:center (+ left
                               (floor width 2)
                               (- (floor (string-width dm string)
                                         2))))
                   (:right (- right
                              (string-width dm string)))))
              display-stream)
            (il:dspyposition
              (+ (transformation-dy combined-transformation)
                 (ecase vertical-alignment
                   (:top (- top (font-ascent (font dm))))
                   (:center (+ bottom
                               (floor height 2)
                               (- (floor (font-height (font dm))
                                         2))
                               (font-descent (font dm))))
                   (:bottom bottom)))
              display-stream)
            (princ string display-stream))
        (il:dspxposition old-xp display-stream)
        (il:dspyposition old-yp display-stream)))))

;;;
;;; Other Operations
;;;

(defmethod string-width ((dm abc-display-medium) string)
  (/ (il:stringwidth string (il-font dm))
     (scale (combined-transformation dm))))

;;; ----------------- ;;;
;;; IL Display Medium ;;;
;;; ----------------- ;;;

(defclass il-display-medium (basic-il-display-medium))

;;; DM Operations (defun make-il-display-medium (&rest args)
  (apply #'make-display-medium 'il-display-medium args))

;;; Graphics Operations (defmethod dspclippingregion ((region region)
                              (display-medium il-display-medium))
  (setf (client-clipping-region display-medium)
        region))

(defmethod dspclippingregion ((region null)
                              (display-medium il-display-medium))
  (il:dspclippingregion nil (slot-value display-medium 'display-stream)))

(defmethod dspyoffset (yoffset (display-medium il-display-medium))
```

```
    (il:dspyoffset yoffset (display-stream display-medium))))

(defmethod dspxoffset (xoffset (display-medium il-display-medium))
  (il:dspxoffset xoffset (display-stream display-medium))))
;;; -*- Mode: Lisp; Package: SILICA; Base: 10.; Syntax: Common-Lisp -*-
;;;
;;; Copyright (c) 1988 by Xerox Corporation. All rights reserved.
;;;

(in-package 'silica)

;;;
;;; ON-CLX: X Connection and Galaxy
;;;

;;;
;;; X Connections
;;;

(defclass x-connection (connection)
  ((galaxy-type :initform 'x-galaxy
                :allocation :class)
   (connection-cprops :allocation :class
                      :initform ()
                      :accessor connection-cprops)
   (x-display :initarg :x-display :accessor x-display)
   (x-window->galaxys-hint)))

(defmethod *initialize-instance :after
    ((x-connection x-connection) &key host display-id &allow-other-keys)
  (setf (x-display x-connection)
        (xlib:open-display host :display display-id)))

(defmethod destroy-connection :before ((connection x-connection))
  (xlib:close-display (x-display connection)))

;;;
;;; X Galaxy
;;;

(defclass x-galaxy (galaxy)
  ((x-window :accessor x-window)
   (x-display :accessor x-display)
   (x-gcontext :accessor x-gcontext)
   (x-screen  :accessor x-screen)
   (x-black-pixel :accessor x-black-pixel)
   (x-white-pixel :accessor x-white-pixel)
   ;; for abc graphics (see dm-x). Really shouldn't be a part of galaxy
   ;; since this gets imposed on all x galaxies. I should just provide a
   ;; prop hook or something.
   ;; Moreover, this should be moved to be a property of a connection, since
   ;; all galaxies that share the connection can share shade pixmaps.
   (shade-table :accessor shade-table :initform nil)))

(defmethod *initialize-instance :after
    ((galaxy x-galaxy)
     &key connection region title
     (screen-id 0)
     &allow-other-keys)

(let* ((x-display (x-display connection))
         (x-screen (nth screen-id (xlib:display-roots x-display)))
         (x-window)
         x y w h)

;; Should be using with-slots, but that's buggy at the moment.

(if region
        (setq x (rectangle-left region)
              y (- (xlib:screen-height x-screen)
                   (rectangle-bottom region)
                   (setq h (rectangle-height region)))
              ;; h ???????
              w (rectangle-width region))
        (multiple-value-setq (x y w h)
          (xlib::get-region x-display)))
```

```
        (setf (x-display galaxy) x-display
              (x-screen galaxy)  x-screen
              (x-black-pixel galaxy) (xlib:screen-black-pixel x-screen)
              (x-white-pixel galaxy) (xlib:screen-white-pixel x-screen))

(setq x-window (xlib:create-window :parent (xlib:screen-root x-screen)
                                           :x x :y y :width w :height h
                                           :background (xlib:screen-white-pixel
                                                          x-screen)
                                           ;; :override-redirect :on
                                           ))

(setf (xlib::wm-name x-window) (or title "Silex Window"))
        (setf (x-window galaxy) x-window
              (x-gcontext galaxy)
              (xlib:create-gcontext :drawable x-window
                                   :foreground (xlib:screen-black-pixel x-screen)
                                   :background (xlib:screen-white-pixel x-screen)
                                   :fill-style :stippled))

(xlib:map-window x-window)
        (xlib:display-force-output x-display)

galaxy))

(defmethod destroy-galaxy :before
  ((galaxy x-galaxy))
  ;; could be optimized to not destroy window if connection is about to be
  ;; closed anyway.
  (xlib:destroy-window (x-window galaxy)))

(defmethod install-galaxy-root ((galaxy x-galaxy) root-plane
                                &key transformation
                                &allow-other-keys)
  (let* ((window (x-window galaxy))
         (root-region (make-rectangle :left 0 :bottom 0
                                      :width  (xlib:drawable-width window)
                                      :height (xlib:drawable-height window))))
    (setf (galaxy-root galaxy) root-plane)
    (setf (galaxy root-plane) galaxy)
    (setf (slot-value galaxy 'transformation)
          (make-transformation))
    (setf (plane-region root-plane)
          root-region)
    root-plane))

;;;
;;; Bitmaps
;;;

(defclass x-bitmap (bitmap)
  ((x-pixmap :accessor x-pixmap)
   (galaxy :accessor galaxy)))

(defmethod galaxy-make-bitmap ((galaxy x-galaxy) width height)
  (declare (xlib:card8 width height))
  (let ((bm (make-instance 'x-bitmap)))
    (setf (x-pixmap bm)
          (xlib:create-pixmap :width   width
                              :height  height
                              :depth   (the xlib:card8 1)
                              :drawable (silica::x-window galaxy)))
    (setf (galaxy bm) galaxy)

bm))

(defmethod bitmap-width ((bitmap x-bitmap))
    (xlib:drawable-width (x-pixmap bitmap)))

(defmethod bitmap-height ((bitmap x-bitmap))

(xlib:drawable-height (x-pixmap bitmap)))
```

```
;;; -*- Mode: Lisp; Package: XLIB; Base: 10.; Syntax: Common-Lisp -*-
;;;
;;; Copyright (c) 1988 by Xerox Corporation.  All rights reserved.
;;;

(in-package 'xlib)

(defconstant glyph-num-glyphs 154)
(defconstant glyph-X-cursor 0)
(defconstant glyph-arrow 2)
(defconstant glyph-based-arrow-down 4)
(defconstant glyph-based-arrow-up 6)
(defconstant glyph-boat 8)
(defconstant glyph-bogosity 10)
(defconstant glyph-bottom-left-corner 12)
(defconstant glyph-bottom-right-corner 14)
(defconstant glyph-bottom-side 16)
(defconstant glyph-bottom-tee 18)
(defconstant glyph-box-spiral 20)
(defconstant glyph-center-ptr 22)
(defconstant glyph-circle 24)
(defconstant glyph-clock 26)
(defconstant glyph-coffee-mug 28)
(defconstant glyph-cross 30)
(defconstant glyph-cross-reverse 32)
(defconstant glyph-crosshair 34)
(defconstant glyph-diamond-cross 36)
(defconstant glyph-dot 38)
(defconstant glyph-dotbox 40)
(defconstant glyph-double-arrow 42)
(defconstant glyph-draft-large 44)
(defconstant glyph-draft-small 46)
(defconstant glyph-draped-box 48)
(defconstant glyph-eglyphhange 50)
(defconstant glyph-fleur 52)
(defconstant glyph-gobbler 54)
(defconstant glyph-gumby 56)
(defconstant glyph-hand1 58)
(defconstant glyph-hand2 60)
(defconstant glyph-heart 62)
(defconstant glyph-icon 64)
(defconstant glyph-iron-cross 66)
(defconstant glyph-left-ptr 68)
(defconstant glyph-left-side 70)
(defconstant glyph-left-tee 72)
(defconstant glyph-leftbutton 74)
(defconstant glyph-ll-angle 76)
(defconstant glyph-lr-angle 78)
(defconstant glyph-man 80)
(defconstant glyph-middlebutton 82)
(defconstant glyph-mouse 84)
(defconstant glyph-pencil 86)
(defconstant glyph-pirate 88)
(defconstant glyph-plus 90)
(defconstant glyph-question-arrow 92)
(defconstant glyph-right-ptr 94)
(defconstant glyph-right-side 96)
(defconstant glyph-right-tee 98)
(defconstant glyph-rightbutton 100)
(defconstant glyph-rtl-logo 102)
(defconstant glyph-sailboat 104)
(defconstant glyph-sb-down-arrow 106)
(defconstant glyph-sb-h-double-arrow 108)
(defconstant glyph-sb-left-arrow 110)
(defconstant glyph-sb-right-arrow 112)
(defconstant glyph-sb-up-arrow 114)
(defconstant glyph-sb-v-double-arrow 116)
(defconstant glyph-shuttle 118)
(defconstant glyph-sizing 120)
(defconstant glyph-spider 122)
(defconstant glyph-spraycan 124)
(defconstant glyph-star 126)
(defconstant glyph-target 128)
(defconstant glyph-tcross 130)
```

```
(defconstant glyph-top-left-arrow 132)
(defconstant glyph-top-left-corner 134)
(defconstant glyph-top-right-corner 136)
(defconstant glyph-top-side 138)
(defconstant glyph-top-tee 140)
(defconstant glyph-trek 142)
(defconstant glyph-ul-angle 144)
(defconstant glyph-umbrella 146)
(defconstant glyph-ur-angle 148)
(defconstant glyph-watch 150)
(defconstant glyph-xterm 152)

(defvar arrow-glyph glyph-top-left-arrow)
(defvar move-glyph  glyph-fleur)
(defvar right-arrow-glyph glyph-sb-right-arrow)
(defvar button-glyph glyph-center-ptr)
(defvar clock-glyph glyph-watch)
(defvar upper-left-glyph glyph-top-left-corner)
(defvar dot-glyph glyph-dot)
(defvar skull-glyph glyph-pirate)

(defun get-region (display &optional (min-h 0) (min-w 0))
  ;; Need to be able to support get-region across multiple screens.  That
  ;; will be tricky since, I'll have to maintain a separate context for each
  ;; screen that the cursor roams over.
  (let* ((screen    (first (display-roots display)))
         (root      (screen-root screen))
         (gc        (create-gcontext :drawable root
                                     :function boole-xor
                                     :foreground (screen-black-pixel screen)
                                     :subwindow-mode :include-inferiors
                                     ))
         (cursor-font (open-font display "cursor"))
         (upper-left-cursor
          (create-glyph-cursor
            :source-font cursor-font
            :source-char upper-left-glyph
            :foreground (make-color)
            :background (make-color :red 0.0 :blue 0.0 :green 0.0)))
         (move-cursor
          (create-glyph-cursor
            :source-font cursor-font
            :source-char move-glyph
            :foreground (make-color)
            :background (make-color :red 0.0 :blue 0.0 :green 0.0)))

;; For tracking region
         x y (w min-w) (h min-h)
         ;; For Querying Pointer
         same-screen-p child mask
         ;; For Drawing Frame
         (lx 0) (ly 0) (lw 0) (lh 0) (last-segments nil)
         ;; For Resizing Frame
         origx origy origw origh
         delta
         (clamp-v :none) (clamp-h :none))
    (labels ((move-frame (x y w h)
               (unless (and (= x lx) (= y ly) (= w lw) (= h lh))
                 (let ((x- (+ x (floor w 3)))
                       (y- (+ y (floor h 3)))
                       (x+ (+ x (* 2 (floor w 3))))
                       (y+ (+ y (* 2 (floor h 3))))
                       (x2 (+ x w))
                       (y2 (+ y h)))
                   (xlib:draw-segments root gc last-segments)
                   (xlib:draw-segments root gc
                                       (setq last-segments
                                             (list x  y   x2 y
                                                   x  y-  x2 y-
                                                   x  y+  x2 y+
                                                   x  y2  x2 y2
                                                   x  y   x  y2
                                                   x- y   x- y2
```

```
                                                  x+ y   x+ y2
                                                  x2 y   x2 y2)))
            (setq lx x ly y lw w lh h))))

(resize-frame (cx cy)
       (case clamp-v
         (:top (setq delta (- cy y))
               (when (< (- h delta) min-h)
                 (setq delta (- h min-h)
                       clamp-v :none))
               (incf y delta)
               (decf h delta))
         (:bottom (setq delta (- cy y h))
                  (when (< (+ h delta) min-h)
                    (setq delta (- min-h h)
                          clamp-v :none))
                  (incf h delta))
         (:none (cond ((<= cy y)
                       (setq y cy
                             h (+ origy (- origh cy))
                             clamp-v :top))
                      ((>= cy (+ y (- h 1)))
                       (setq y origy
                             h (+ 1 (- cy origy))
                             clamp-v :bottom)))))
       (case clamp-h
         (:left (setq delta (- cx x))
                (when (< (- w delta) min-w)
                  (setq delta (- w min-w)
                        clamp-h :none))
                (incf x delta)
                (decf w delta))
         (:right (setq delta (- cx x w))
                 (when (< (+ w delta) min-w)
                   (setq delta (- min-w w)
                         clamp-h :none))
                 (incf w delta))
         (:none (cond ((<= cx x)
                       (setq x cx
                             w (+ origx (- origw cx))
                             clamp-h :left))
                      ((>= cx (+ x (- w 1)))
                       (setq x origx
                             w (+ 1 (- cx origy))
                             clamp-h :right)))))
       (move-frame x y w h)))
  (case (grab-pointer root 0 :sync-keyboard-p t :cursor upper-left-cursor)
    (:success ;; Get a Position
      (loop
        (multiple-value-setq (x y same-screen-p child mask)
          (query-pointer root))
        (move-frame x y w h)
        (when (not (zerop (logand mask #.(make-state-mask :button-1
                                                         :button-2
                                                         :button-3))))
          (return)))

;; Possibly do a Shape Query
      (when (not (zerop (logand mask #.(make-state-mask :button-2))))
        (let ((lcx 0) (lcy 0) cx cy)
          (grab-pointer root 0 :sync-keyboard-p t :cursor move-cursor)

(warp-pointer root (+ x (floor w 2)) (+ y (floor h 2)))
          (setq origx x origy y origw w origh h)

(loop
            (multiple-value-setq (cx cy same-screen-p child mask)
              (query-pointer root))
            (unless (and (= cx lcx) (= cy lcy))
              (resize-frame cx cy)
              (setq lcx cx lcy cy))
            (when (zerop (logand mask #.(make-state-mask :button-2)))
```

```
                    (return)))))

;; Remove Last Image
          (move-frame 0 0 0 0)
          (ungrab-pointer display)
          (close-font cursor-font)
          (display-force-output display))

(otherwise
          (format t "Not grabbed!")))

(values x y w h)
      )))

#|
(defun rband2 (&key (host-name "layla"))
  (let* ((display  (open-display host-name))
         (screen   (first (display-roots display)))
         (root     (screen-root screen))
         (gc       (create-gcontext :drawable root
                                    :function boole-xor
                                    :foreground (screen-black-pixel screen)
                                    :subwindow-mode :include-inferiors
                                    ))
         (lx 0) (ly 0) (lw 0) (lh 0))
    (case (grab-pointer root #.(make-event-mask :pointer-motion
                                                :button-press
                                                :button-release
                                                :button-motion)
                        :sync-keyboard-p t)
      (:success
       (macrolet ((move-frame (x y w h)
                    `(unless (and (= ,x lx) (= ,y ly) (= ,w lw) (= ,h lh))
                       (draw-rectangle root gc lx ly lw lh)
                       (draw-rectangle root gc ,x ,y ,w ,h)
                       (setq lx ,x ly ,y lw ,w lh ,h))))
         (event-case (display :force-output-p t :discard-p t)
           (:button-press ()
             (draw-rectangle root gc lx ly lw lh)
             (display-force-output display)
             t)
           (:motion-notify ((:x x) (:y y))
             (unless (event-listen display)
               (move-frame x y 200 200))
             nil))))
      (otherwise
       (format t "Not grabbed!")))
    (close-display display)))
|#

;;; -*- Mode: Lisp; Package: DM-X; Base: 10.; Syntax: Common-Lisp -*-
;;;
;;; Copyright (c) 1988 by Xerox Corporation. All rights reserved.
;;;

;;;
;;; DM X
;;;

(provide "DM-X")
(in-package "DM-X")
;shadow
;export
;require
(use-package (quote ("SILICA" "PCL" "LISP" "CL-EXTRA")) "DM-X")
(import-generals "DM-X")

;;; *****
;;; BASIC-X-DISPLAY-MEDIUM
;;;    A Foundation Class for Display Mediums on X
;;; *****

(defclass basic-x-display-medium (display-medium)
  ((gcontext :accessor gcontext)
   (drawable :accessor drawable)
```

```
      (client-transformation :initform *null-transformation*
                             :reader client-transformation)
      (client-clipping-region :initform *plane* :reader
                              client-clipping-region)
      (combined-transformation :initform (make-instance 'transformation)
                               :accessor combined-transformation)
      (combined-clipping-region :initform nil
                                :accessor combined-clipping-region)))

(defmethod *initialize-instance :after
  ((display-medium basic-x-display-medium)
   &rest keys
   &key galaxy
   (gcontext nil gc-supplied-p) drawable
   &allow-other-keys)

(unless drawable (setq drawable (silica::x-window galaxy)))

;; nil as <gcontext> means don't create one for this display medium.
  (if (not gc-supplied-p)
      (setq gcontext
            (xlib:create-gcontext :drawable   drawable
                                  :foreground (silica::x-black-pixel galaxy)
                                  :background (silica::x-white-pixel galaxy)
                                  :fill-style :opaque-stippled)))
  (if (and gcontext (xlib:gcontext-p gcontext))
      (setf (gcontext display-medium) gcontext))

(setf (drawable display-medium) drawable)

display-medium)

;;;
;;; DM Operations.
;;;

(defmethod (setf display-medium-transformation)
    ((transformation transformation) (dm basic-x-display-medium))
  (with-slots (combined-transformation) dm
    (call-next-method)
    (setf combined-transformation
          (transformation-compose transformation (client-transformation dm)
                                  combined-transformation))

;; Damn X, it doesn't have a way of setting the imaging offset of the gc.
    ;; So I have to transform on output even for simple translations.
    ;; Otherwise the code might be like the following which looks like dm-il.
    #+comment
    (if (translationp combined-transformation)
        (setf (xlib:gcontext-x-offset gc)
              (transformation-dx combined-transformation)
              (xlib:gcontext-y-offset gc)
              (transformation-dx combined-transformation))
        (setf (xlib:gcontext-x-offset gc) 0
              (xlib:gcontext-y-offset gc) 0))
    ))
(defmethod (setf client-transformation)
    (new-transformation (dm basic-x-display-medium))
  (setf (slot-value dm 'client-transformation)
        new-transformation)
  (display-medium-invalidate dm))

(defmethod (setf display-medium-clipping-region)
    ((region region) (dm basic-x-display-medium))
  (with-slots ((gc gcontext) (r combined-clipping-region))
      dm
    (call-next-method)
    (setf r (region-intersection (client-clipping-region dm) region))

(typecase r
      (rectangle
        (setf (xlib:gcontext-clip-mask gc)
              `(,(left r) ,(- (xlib:drawable-height (drawable dm))
                              (+ (bottom r) (height r)))
                ,(width r) ,(height r))))
```

```
      (plane
       (setq r (transformation-apply
                 combined-transformation
                 (plane-region (display-medium-output-contract dm))))

(setf (xlib:gcontext-clip-mask gc)
              '(,(left r) ,(- (height r) (bottom r))
                ,(width r) ,(height r))))

;; For non-handled region types, a do-clipped operation will have to do
        ;; it piecewise at output time.
        (compound-region (unimplemented "clipping on compound regions"))
        (otherwise (unimplemented "clipping on weird region?")))
      ))

(defmethod (setf client-clipping-region)
    (new-clipping-region (dm basic-x-display-medium))
  (setf (slot-value dm 'client-clipping-region)
        new-clipping-region)
  (display-medium-invalidate dm))

(defmethod cleanup-display-medium ((dm basic-x-display-medium))
  (unless (typep (client-clipping-region dm) 'plane)
    (setf (client-clipping-region dm) *plane*))
  (unless (typep (client-transformation dm) 'null-transformation)
    (setf (client-transformation dm)
          *null-transformation*)))
;;; *****
;;; ABC Graphics Package Implementation
;;; *****

(defvar *connection-prototype* (pcl::class-prototype
                                (find-class 'w::x-connection)))

;;;
;;; FONTS
;;;

(defclass abc-font (font)
  ()
  )

(setf (connection-cprop *connection-prototype* :abc-font-type)
      (find-class 'abc-font))

(defmethod font-ascent ((font abc-font))
  (xlib:font-ascent (x-font font)))

(defmethod font-descent ((font abc-font))
  (xlib:font-descent (x-font font)))

(defmethod font-height ((font abc-font))
  (+ (font-ascent font)
     (font-descent font)))

(defmethod string-width ((font abc-font) string)
  (xlib:text-width (x-font font) string))

(setq *default-font* nil)

(defvar *font-families* '((:fixed-pitch (:display "andy"))
                          (:sans-serif (:display "helvetica"))
                          (:serif (:display "times"))))

(defmethod x-font ((font abc-font) &optional (stream-type :display))
  ;; This implementation should be cleaned up, first it should do
  ;; a better job of mapping to bold/italics.  Second, it should maybe
  ;; cache opened fonts in the connection and not reopen the font
  ;; each time (remember CLX caches fonts too).
  (let ((font-translation-alist (assoc (font-family font)
                                       *font-families* :test #'eq)))
    (if font-translation-alist
        (xlib:open-font (silica::x-display (connection font))
                        (format nil "-*-~a-~d-~a"
                                (second (assoc stream-type
```

```
                                            (rest font-translation-alist)
                                            :test #'eq))
                              (font-size font)
                              (cond ((and (font-bold? font)
                                          (font-italic? font)) "bi")
                                    ((font-bold? font) "b")
                                    ((font-italic? font) "i")
                                    (t "")))
            (error "~%Illegal font family ~S." (font-family font))))))

;;;
;;; SHADES
;;;

#+comment
(defun convert-shade (shade galaxy)
  (let* ((shade (truncate (* shade 64) 100))
         (cached-shade (assoc shade (silica::shade-table galaxy) :test #'=)))

(if cached-shade
        (cdr cached-shade)
        (let ((pixmap (xlib:create-pixmap :width    (the xlib:card16 8)
                                          :height   (the xlib:card16 8)
                                          :depth    (the xlib:card8 1)
                                          :drawable (silica::x-window galaxy)))
              ;; Assuming the scanline-unit is 32 in the code below.
              (raw-data (make-array 32 :element-type 'xlib:card8))
              (bit-num 1))
          (flet ((set-bit (num)
                   (multiple-value-bind (row col) (truncate num 8)
                     (setq row (* row 4))
                     (setf (aref raw-data row)
                           (dpb 1 (byte 1 col)
                                (aref raw-data row))))))
            (dotimes (i shade)
              (set-bit bit-num)
              (setq bit-num (mod (+ bit-num 23) 64))))
          (xlib:put-raw-image pixmap (silica::x-gcontext galaxy)
                              raw-data :depth 1 :x 0 :y 0 :width 8 :height 8
                              :format :xy-pixmap)
          (push (cons shade pixmap) (silica::shade-table galaxy))
          pixmap))))

(defvar *shade-images* '#(nil nil nil nil
                          nil nil nil nil
                          nil nil nil nil
                          nil nil nil nil
                          nil))

(defun clear-shade-images ()
  (dotimes (i 17) (setf (aref *shade-images* i) nil)))

(defun shade->image (shade)
  (let ((index (floor (* shade 16) 100)))
    (or (aref *shade-images* index)
        (setf (aref *shade-images* index)
              (xlib:create-image
                :width 4 :height 4
                :bit-lsb-first-p t
                :data (make-array 4 :element-type 'xlib:card8
                                    :initial-contents (w::shade->4x4 shade)))))))
(defun shade->image (shade)
  (xlib:create-image
    :width 4 :height 4
    :data (make-array 2 :element-type 'xlib:card8
                        :initial-contents (w::shade->8x2 shade))))

(defun convert-shade (shade galaxy)
  ;; Shades are cached in the galaxy, but maybe should be per server
  ;; somehow (using a global connection per server?). We need some resource
  ;; database in each server that can be shared by all our connections and
  ;; and across servers if possible.

(let* ((cached-shade (assoc shade (silica::shade-table galaxy) :test #'=)))
    (if cached-shade
```

```
            (cdr cached-shade)
          (let ((pixmap (xlib:create-pixmap
                          :width    (the xlib:card16 4)
                          :height   (the xlib:card16 4)
                          :depth    (the xlib:card8 1)
                          :drawable (silica::x-window galaxy)))
                (image (shade->image shade)))

(xlib:put-image pixmap (silica::x-gcontext galaxy) image
                            :x 0 :y 0 :bitmap-p t)
            (push (cons shade pixmap) (silica::shade-table galaxy))
            pixmap))))
;;;
;;; ABC Display Medium
;;;

(defclass abc-display-medium (basic-x-display-medium abc-basic-display-medium)
  ((font :initarg :font
         :reader font)
   (location :initform (make-position :x 0 :y 0)
             :accessor location)
   (line-width :initform 1
               :accessor line-width)
   (shade :initform *default-shade*
          :reader shade))
  (:documentation "A Basic Core of Graphics Routines"))

(defclass abc-bitmap-medium (abc-display-medium)
  ((target :reader target)))

(setf (connection-cprop *connection-prototype* :abc-dm-type)
      (find-class 'abc-display-medium))

(setf (connection-cprop *connection-prototype* :abc-bm-type)
      (find-class 'abc-bitmap-medium))

(defmethod *initialize-instance :after
    ((display-medium abc-display-medium)
     &rest keys &key font
     &allow-other-keys)

(unless (getf keys :font)
    (setf (font display-medium)
          (make-font :font-type 'abc-font
                     :family :sans-serif
                     :size 10
                     :connection (connection display-medium))))
  display-medium)

;;;
;;; Imaging Context Operations
;;;
                                        ; Interact with Superclass
                                        ; These need to be fixed.
                                        ; Nobody uses client cr or t.
(defmethod clipping-region ((dm abc-display-medium))
  (transformation-undo (combined-transformation dm)
                       (client-clipping-region dm)))

(defmethod (setf clipping-region) (new-region (dm abc-display-medium))
  (setf (client-clipping-region dm)
        (transformation-apply (display-medium-transformation dm)
                              new-region t)))

(defmethod transformation ((dm abc-display-medium))
  (client-transformation dm))

(defmethod (setf transformation) (new-value (dm abc-display-medium))
  (setf (client-transformation dm) new-value))

; Non Interacting
(defmethod operation ((dm abc-display-medium))
  (let ((fn (xlib:gcontext-function (gcontext dm))))
    (cond ((eql fn boole-ior)        :paint)
          ((eql fn boole-1)          :replace)
```

```
              ((eql fn boole-xor)           :invert)
              ((eql fn boole-andc1)         :erase))))

(defmethod (setf operation) (new-value (dm abc-display-medium))
  (setf (xlib:gcontext-function (gcontext dm))
        (ecase new-value
          (:paint boole-ior)
          (:replace boole-1)
          (:invert boole-xor)
          (:erase boole-andc1)))
  new-value)

(defmethod (setf shade) (new-value (dm abc-display-medium))
  (setf (xlib:gcontext-stipple (gcontext dm))
        (convert-shade new-value (galaxy dm)))
  (setf (slot-value dm 'shade)      new-value)
  new-value)

(defmethod (setf shade) (new-value (dm abc-bitmap-medium))
  (setf (xlib:gcontext-stipple (gcontext dm))
        (convert-shade new-value (galaxy dm)))
  (setf (slot-value dm 'shade)      new-value)
  new-value)

(defmethod (setf font) ((font abc-font) (dm abc-display-medium))
  ;; Not handling Scalings
  (setf (xlib:gcontext-font (slot-value dm 'gcontext))
        (x-font font))
  (setf (slot-value dm 'font) font)
  font)

;;;
;;; Bitmap DM
;;;

(defmethod (setf target) ((bitmap silica::x-bitmap) (dm abc-bitmap-medium))
  ;;  (setf (xlib::gcontext-drawable (gcontext dm)) (silica::x-pixmap bitmap))
  (setf (drawable dm) (silica::x-pixmap bitmap))
  (setf (slot-value dm 'target) bitmap))
;;;
;;; Graphics Operations
;;;

(defmethod copy-rectangle ((dm abc-display-medium) x y
                           (source silica::x-bitmap) left bottom width height)
  (with-output-protection dm
    (with-slots ((transformation combined-transformation) drawable)
        dm
      (let ((pixmap (silica::x-pixmap source)))
        (if (translationp transformation)
            ;; Easy common case
            (xlib:copy-area pixmap (slot-value dm 'gcontext)
                            left (- (xlib:drawable-height pixmap)
                                    bottom height)
                            width height
                            drawable (+ x (transformation-dx transformation))
                            (- (xlib:drawable-height drawable)
                               y (transformation-dy transformation)
                               height)))))))

(defmacro %fill-rectangle (dm left bottom width height)
  `(let* ((drawable (drawable ,dm))
          (gc (gcontext ,dm)))
     (setf (xlib:gcontext-fill-style gc) :opaque-stippled)
     (multiple-value-bind (l b w h)
         (transform-rectangle (combined-transformation dm)
                              ,left ,bottom ,width ,height)
       (xlib:draw-rectangle drawable gc l
                            (- (xlib:drawable-height drawable) b h)
                            w h t))))

(defmethod fill-media ((dm abc-display-medium))
  ;; Let somebody clip, rather than calculate
  (with-output-protection dm
    (%fill-rectangle dm 0 0 2000 2000)))

(defmethod fill-region ((dm abc-display-medium) (region rectangle))
  (with-slots (left bottom width height) region
```

```
      (with-output-protection dm
        (%fill-rectangle dm left bottom width height))))

(defmethod fill-rectangle ((dm abc-display-medium) left bottom width height)
  (with-output-protection dm
    (%fill-rectangle dm left bottom width height)))

(defmethod fill-media ((dm abc-bitmap-medium))
  ;; Let somebody clip, rather than calculate
  (%fill-rectangle dm 0 0 2000 2000))

(defmethod fill-region ((dm abc-bitmap-medium) (region rectangle))
  (with-slots (left bottom width height) region
    (%fill-rectangle dm left bottom width height)))

(defmethod fill-rectangle ((dm abc-bitmap-medium) left bottom width height)
  (%fill-rectangle dm left bottom width height))

(defmacro %clear-rectangle (dm left bottom width height)
  '(with-slots (combined-transformation drawable) ,dm
     (let ((old-shade (shade ,dm)))
       (unwind-protect
           (progn (setf (shade ,dm) *white*)
                  (%fill-rectangle ,dm ,left ,bottom ,width ,height))
         (setf (shade ,dm) old-shade))) ))

(defmethod clear-media ((dm abc-display-medium))
  ;; Let somebody clip, rather than calculate
  (with-output-protection dm
    (%clear-rectangle dm 0 0 2000 2000)))

(defmethod clear-rectangle ((dm abc-display-medium) left bottom width height)
  (with-output-protection dm
    (%clear-rectangle dm left bottom width height)))

(defmethod clear-region ((dm abc-display-medium) (region rectangle))
  (with-slots (left bottom width height) region
    (with-output-protection dm
      (%clear-rectangle dm left bottom width height))))

(defmacro %clear-rectangle-bm (dm left bottom width height)

'(let ((old-shade (shade ,dm)))
     (unwind-protect (progn (setf (shade ,dm) *white*)
                            (%fill-rectangle ,dm ,left ,bottom
                                                 ,width ,height))
       (setf (shade ,dm) old-shade))))

(defmethod clear-media ((dm abc-bitmap-medium))
  ;; Let somebody clip, rather than calculate
  (%clear-rectangle-bm dm 0 0 2000 2000))

(defmethod clear-rectangle ((dm abc-bitmap-medium) left bottom width height)
  (%clear-rectangle-bm dm left bottom width height))

(defmethod clear-region ((dm abc-bitmap-medium) (region rectangle))
  (with-slots (left bottom width height) region
    (%clear-rectangle-bm dm left bottom width height)))

(defmethod draw-to ((dm abc-display-medium) point)
  (with-output-protection dm
    (let ((start (transformation-apply (combined-transformation dm)
                                       (location dm)))
          (end   (transformation-apply (combined-transformation dm)
                                       point))
          (drawable (drawable dm)))
;;;      (setf (xlib:gcontext-line-width (gcontext dm)) 1)
      (setf (xlib:gcontext-fill-style (gcontext dm)) :solid)
      (xlib:draw-line
        drawable
        (gcontext dm)
        (position-x start)
        (- (xlib::drawable-height drawable) (position-y start))
        (position-x end)
        (- (xlib::drawable-height drawable) (position-y end))
        nil))))
```

```
(defmethod draw-segments ((dm abc-display-medium) segments)
  ;; Destructively modifies segments.
  (with-output-protection dm
    (let* ((tr (combined-transformation dm))
           (dx (transformation-dx tr))
           (dy (transformation-dy tr))
           (drawable (drawable dm))
           (dh (xlib::drawable-height drawable)))
      (setf (xlib:gcontext-fill-style (gcontext dm)) :solid)
      ;; Translate x coordinates
      (do ((tail segments (cddr tail)))
          ((null tail))
        (incf (car tail) dx))

;; Translate y coordinates
      (do ((tail (cdr segments) (cddr tail)))
          ((null tail))
        (setf (car tail)
              (- dh (+ (car tail) dy))))

(xlib:draw-segments drawable (gcontext dm) segments))))

(defmacro %print-string (dm string x y)
  ;; assuming x, y only evaluated once.
  `(with-slots (drawable (gc gcontext)) ,dm
     (let ((transformation (combined-transformation ,dm)))
       (if (translationp transformation)
           (xlib:draw-glyphs drawable gc
                             (+ ,x (transformation-dx transformation))
                             (- (xlib:drawable-height drawable)
                                ,y (transformation-dy transformation)
                                (xlib:font-descent
                                 (xlib:gcontext-font gc)))
                             ,string)
           (error "Non Translationed text not supported yet")))))

(defmethod print-string ((dm abc-display-medium) string)
  (with-output-protection dm
    (%print-string dm string
                   (position-x (location dm)) (position-y (location dm)))))

(defmethod print-string-justified
    ((dm abc-display-medium) string left bottom width height
     &optional (horizontal-alignment :center) (vertical-alignment :center))
  (with-output-protection dm
    (%print-string dm string
                   (ecase horizontal-alignment
                     (:left left)
                     (:center (+ left
                                 (floor width 2)
                                 (- (floor (string-width dm string)
                                           2))))
                     (:right (- (+ left width -1)
                                (string-width dm string))))
                   (ecase vertical-alignment
                     (:top (- (+ bottom height -1)
                              (font-ascent (font dm))))
                     (:center (+ bottom
                                 (floor height 2)
                                 (- (floor (font-height (font dm))
                                           2))
                                 (font-descent (font dm))))
                     (:bottom bottom)))))

;;;
;;; Auxiliary Operations
;;;
(defmethod string-width ((dm abc-display-medium) string)
  (/ (string-width (font dm) string)
     (scale (transformation dm))))

(defmethod flush-output ((dm abc-display-medium))
  (xlib:display-force-output (xlib:drawable-display (drawable dm))))
;;; *****
;;; X Display Medium
;;; *****
```

```lisp
;;; -*- Mode: Lisp; Package: SILICA; Base: 10.; Syntax: Common-Lisp -*-
;;;
;;; Copyright (c) 1988 by Xerox Corporation.  All rights reserved.
;;;

(in-package "SILICA")

;;;
;;; SILICA DEBUG
;;;

(defmacro printing-random-thing ((thing stream)
                                 &body body)
  (once-only (stream)
             '(let ((*print-level* (and (numberp *print-level*)
                                        (- *print-level* 1))))
                (progn (princ "#<" ,stream)
                       ,@body
                       (princ " " ,stream)
                       (pcl::printing-random-thing-internal ,thing
                                                            ,stream)
                       (princ ">" ,stream)))))

(defun pretty-class-name-of (object)
  (capitalize-words (class-name (class-of object))))

(defun capitalize-words (string)
  (pcl::capitalize-words string))

(defun printing-random-thing-internal (thing stream)
  (declare (ignore thing stream))

;; This function should be defined by system specific code
  nil)

;;;
;;;
;;;

(defmethod print-object ((transformation transformation) stream)
  (format stream "#<Transformation ~d ~d>" (transformation-dx
                                            transformation)
          (transformation-dy transformation)))

(defmethod print-object ((region region) stream)
      (format stream "#<~a>" (pretty-class-name-of region)))

(defmethod print-object ((pos position) stream)
  (format stream "#<~a ~d ~d>" (pretty-class-name-of pos)
          (position-x pos)
          (position-y pos)))

(defmethod print-object ((region rectangle) stream)
  (format stream "#<~a ~d ~d ~d ~d>" (pretty-class-name-of region)
          (left region)
          (bottom region)
          (width region)
          (height region)))

(defmethod print-object ((display-medium display-medium) stream)
  (printing-random-thing (display-medium stream)
                         (princ (pretty-class-name-of display-medium)
                                stream)))

(defmethod print-object ((kernel-object kernel-object) stream)
  (printing-random-thing (kernel-object stream)
                         (princ (pretty-class-name-of kernel-object)
                                stream)))
;;; -*- Mode: Lisp; Package: STK; Base: 10.; Syntax: Common-Lisp -*-
;;;
;;; Copyright (c) 1988 by Xerox Corporation.  All rights reserved.
;;;
(in-package "STK" :use '("LISP" "PCL"))
;;;
;;; STK-PACKAGE
;;;
;;;
;;; the SILICA ToolKit
```

```lisp
;;;

(defparameter stk-exports
  '(
    ;; contracts
    (overlapping-contract overlapping-parent-part
        overlapping-child-part overlapping-ordered-children
        overlapping-which? overlapping-move overlapping-shape
        overlapping-move-and-shape overlapping-stack
        overlapping-configure setf overlapping-ordered-children)
    (bordering-contract bordering-parent-part
        bordering-child-part bordering-initialize
        bordering-parent-border setf bordering-parent-border)
    (framing-contract framing-parent-part framing-child-part
        framing-initialize)

;; objects
    (window-shell window-shell-initialize window-shell-destroy
        window-shell-open window-shell-close
        window-shell-frame-plane window-shell-border-plane)
    (text-field make-text-field text-field-plane text-field-font
        text-field-horz text-field-vert text-field-text)

;; desk
    (desktop window)
    (create-window make-window)

(window-prop window-display-medium window-galaxy
     window-height window-width)

;; fake input
    (handle-mouse silica-get-position silica-get-region
        silica-get-box-region)))

;;;
;;; Put IN Seven EXtremely Random USEr Interface COmmands
;;;

(provide "STK")
(in-package "STK" :use '("LISP" "PCL"))
(dolist (syms stk-exports)
        (export syms))
;; require
(use-package '("SILICA" "PCL" "LISP"))
(import-generals "STK")
;;; -*- Mode: Lisp; Package: STK; Base: 10.; Syntax: Common-Lisp -*-
;;;
;;; Copyright (c) 1988 by Xerox Corporation.  All rights reserved.
;;;

(in-package "STK")

;;;
;;; STK CONTRACTS
;;;

;;;
;;; This file contains implementations of contracts that can be used by high
;;; level objects.

;;;
;;; OVERLAPPING Contract
;;;

(defclass overlapping-parent-part (parent-part)
   ())

(defclass overlapping-child-part (child-part)
   ())

(defclass overlapping-contract (windowing-contract)
   (;; Should be init-args
    (parent-part :allocation :class
                 :initform (find-class 'overlapping-parent-part))
    (child-part :allocation :class
                 :initform (find-class 'overlapping-child-part))))
```

```
(defmethod (setf overlapping-ordered-children)
    (children (self overlapping-contract))
  (setf (ordered-children self)      children))

(defmethod overlapping-ordered-children ((self overlapping-contract))
  (contract-children self))

(defmethod overlapping-which? ((self overlapping-parent-part) x y)
  (dolist (child (overlapping-ordered-children
                   (plane-adult-contract self)))
    (if (region-inside? (transformation-apply
                          (plane-transformation child)
                          (plane-region child))
                        x y)
        (return child))))

(defmethod overlapping-move ((self overlapping-child-part)
                             (position position))
  (let ((old-transformation (plane-transformation self)))

;; Unpaint

;; (output-contract-repaint (plane-parent self)
    ;; (transformation-apply old-transformation (plane-region
    ;; self)))

;; Change
    (setf (transformation-dx old-transformation)
          (position-x position))
    (setf (transformation-dy old-transformation)
          (position-y position))

;; Percolate
    (plane-transformation-changed self)

;; Paint

;; (output-contract-repaint self t)
    (output-contract-repaint (plane-parent self)
                             t)))

(defmethod overlapping-shape ((self overlapping-child-part)

new-width new-height)
  (let ((old-region (plane-region self)))
    (setf (rectangle-width old-region)
          new-width)
    (setf (rectangle-height old-region)
          new-height)

;; Let whoever cares know that the region of the child has changed.
    (plane-region-changed self)))

(defmethod overlapping-move-and-shape ((self overlapping-child-part)
                                       new-region-in-parent)
  (let ((old-region (plane-region self))
        (old-transformation (plane-transformation self)))

;; Paint off

;; (output-contract-repaint (plane-parent self)
    ;; (transformation-apply old-transformation old-region))

;; Change up
    (setf (transformation-dx old-transformation)
          (rectangle-left new-region-in-parent))
    (setf (transformation-dy old-transformation)
          (rectangle-bottom new-region-in-parent))
    (setf (rectangle-width old-region)
          (rectangle-width new-region-in-parent))
    (setf (rectangle-height old-region)
          (rectangle-height new-region-in-parent))

;; Percolate.
    (plane-region-changed self)
    (plane-transformation-changed self)
```

```
;; Paint on

;; (output-contract-repaint (plane-parent self)
;;                          new-region-in-parent)
    (output-contract-repaint (plane-parent self)
                             t)))

(defmethod overlapping-stack ((self overlapping-child-part)
                              stack-request)
  (let ((contract (plane-youth-contract self)))
    (contract-change-order contract self t)
    (case stack-request
      (:to-top
       (setf (overlapping-ordered-children contract)
             (cons self (remove self (overlapping-ordered-children
                                      contract)
                                :test
                                #'eq)))
       (output-contract-repaint self (plane-region self)))
      (:to-bottom
       (setf (overlapping-ordered-children contract)
             (nconc (remove self (overlapping-ordered-children
                                  contract)
                            :test
                            #'eq)
                    (cons self nil)))
       (output-contract-repaint (plane-parent self)
                                (transformation-apply (plane-transformation
                                                       self)
                                                      (plane-region self)))))))

(defmethod overlapping-configure ((self overlapping-child-part)
                                  new-region stack-request)
  (unimplemented))

;;;
;;; TILING Contract
;;;

(defclass tiling-parent-part (parent-part) ())
(defclass tiling-child-part (child-part)
  ((column :initform 0 :accessor tiling-column)))

(defclass tiling-contract (windowing-contract)
  (
   (parent-part :allocation :class
                :initform (find-class 'tiling-parent-part))
   (child-part :allocation :class
               :initform (find-class 'tiling-child-part))
   ;;
   (ncolumns :initform 2 :initarg :ncolumns
             :accessor tiling-ncolumns)
   (percentages :initform '(60 40) :initarg :percentages
                :accessor tiling-percentages)
   (widths :accessor tiling-widths)
   (lefts :accessor tiling-lefts)
   (balances :accessor tiling-balances)

;; Internal fields.  Should only be used by tiling implementation
   ;; itself.
   (%panes :accessor %panes)
   (%in-process :accessor %in-process)))

(defun make-tiling (&rest args)
  (apply #'*make-instance 'tiling-contract args))

(defmethod *initialize-instance :after
  ((contract tiling-contract))
  (setf (%panes contract)
        (make-sequence 'list (tiling-ncolumns contract) :initial-element nil))
  contract)

(defmethod parent-enabled ((contract tiling-contract)
                           (parent tiling-parent-part))

;; Expect that child has already (recently) requested space and been
  ;; allocated a good region.
```

```
    (let* ((rect (plane-region parent))
           (width (rectangle-width (plane-region parent)))
           (widths (mapcar #'(lambda (percentage)
                                (/ (* percentage width)
                                   100))
                            (tiling-percentages contract)))
           (last 0)
           (lefts (mapcar #'(lambda (next-width)
                              (prog1 last (incf last next-width)))
                          widths)))
                                          ; Account for roundoff errors
      (if (not (eq last width))
          (incf (car (last widths))))
      (setf (tiling-widths contract)
            widths)
      (setf (tiling-lefts contract)
            lefts)
      (setf (tiling-balances contract)
            (make-sequence 'list (tiling-ncolumns contract)
                           :initial-element
                           (rectangle-height rect)))
      (call-next-method)))

(defmethod child-enabled ((contract tiling-contract)
                          (child tiling-child-part))
  ;; Expect that child has already (recently) requested space and been
  ;; allocated a good region.
  (with-slots (%in-process) contract
    (if (not (memq child %in-process))
        (error
          "This child can't be adopted because it hasn't been previously reviewed" ))
    (call-next-method)
    (setq %in-process (delq child (slot-value contract '%in-process)))))

(defmethod child-disabled ((contract tiling-contract)
                           (child tiling-child-part))
  (macrolet ((pane-below (panes child)
               '(second (memq ,child
                              (nth (tiling-column ,child)
                                   ,panes))))
             (pane-out (panes child)
               '(delq ,child (nth (tiling-column ,child)
                                  ,panes))))
    (with-slots (%panes) contract
      (let ((space-inheritor (pane-below %panes child))
            (freed-height (rectangle-height (plane-region child))))
        (if space-inheritor
            (progn (incf (rectangle-height (plane-region
                                              space-inheritor))
                         freed-height)
                   (plane-region-changed space-inheritor))
            (incf (nth (tiling-column child)
                       (tiling-balances contract))
                  freed-height))
        (pane-out %panes child))
      (call-next-method))))

(defmethod tiling-allocate ((parent tiling-parent-part)
                            (child tiling-child-part)
                            &optional
                            (column 0)
                            (height 50))
  (let ((contract (plane-adult-contract parent))
        (region (plane-region child))
        (transformation (plane-transformation child)))
    (when (<= height (nth column (tiling-balances contract)))
      (unless region
        (setf (plane-region child)
              (setq region (make-rectangle
                             :left 0 :bottom 0
                             :width (nth column
                                         (tiling-widths contract))
                             :height height))))
      (setf (tiling-column child)
            column)
      (setf (transformation-dx transformation)
            (nth column (tiling-lefts contract))
```

```
                    (transformation-dy transformation)
                    (decf (nth column (tiling-balances contract))
                          height))

(plane-transformation-changed child)
             (plane-region-changed child)
             (setf (nth column (%panes contract))
                   (nconc (nth column (%panes contract))
                          (cons child nil)))

;;
             (push child (%in-process contract))
             height)))
(defmethod tiling-allocate-from-plane ((parent tiling-parent-part)
                                       (child tiling-child-part))
     (tiling-allocate parent child (tiling-which-column parent
                                      (transformation-dx (
                                                plane-transformation
                                                          child)))
           (rectangle-height (plane-region child))))
(defmethod tiling-which-column ((parent tiling-parent-part)
                                x)
      (do ((i 0 (incf i))
           (lefts-tail (cdr (tiling-lefts (plane-adult-contract parent)
                                          ))
                       (cdr lefts-tail)))
          ((or (null lefts-tail)
               (< x (first lefts-tail)))
           i)))
(defmethod tiling-close ((child tiling-child-part))
      (disable-plane child))
;;; ------------------- ;;;
;;; BORDERING Contract  ;;;
;;; ------------------- ;;;

;;;  This contract allows only 1 child and completely controls the
;;;  transformation and region of that child based on the region of the parent.
;;;  The constraint is imposed at the time of the child's ordainment and the
;;;  parent region change.

(defclass bordering-parent-part (parent-part) ())

(defclass bordering-child-part (child-part) ())

(defclass bordering-contract (windowing-contract output-client)
  (
   ;; These can be done with initargs instead
   (parent-part :allocation :class
                :initform (find-class 'bordering-parent-part))
   (child-part :allocation :class
                :initform (find-class 'bordering-child-part))
   (border-size :initform 1 :initarg :border-size
                :accessor border-size)
   (border-shade :initform *black* :accessor border-shade)))

(defun make-bordering (&rest args)
  (apply #'*make-instance 'bordering-contract args))

(defmethod bordering-calculate-child-region ((self bordering-contract))
  (let ((region (plane-region (contract-parent self)))
        (border-size (border-size self)))
    (make-rectangle :left 0 :bottom 0
                    :width  (- (rectangle-width region)
                               (* 2 border-size))
                    :height (- (rectangle-height region)
                               (* 2 border-size)))))

(defmethod bordering-calculate-child-transformation ((self bordering-contract))
  (let ((region (plane-region (contract-parent self)))
        (border-size (border-size self)))
    (make-transformation :x-translation border-size
                         :y-translation border-size)))

(defmethod output-client-repaint ((bordering-contract bordering-contract)
                                   output-contract repaint-region)
  ;; Assuming the border plane doesn't have a display-medium of its own.
  (using-display-medium (dm :abc-dm-type output-contract)
```

```
      (setf (shade dm) (slot-value bordering-contract 'border-shade))
      (setf (operation dm) :replace)
      (fill-region dm repaint-region)))

(defmethod contract-enacted ((contract bordering-contract))
  (let ((child (car (contract-children contract))))
    (setf (plane-region child)
          (bordering-calculate-child-region contract))
    (setf (windowing-domain-transformation (plane-youth-domain child)
                                     child)
          (bordering-calculate-child-transformation contract))))

(defmethod parent-region-changed ((contract bordering-contract) parent)
  (let ((child (car (plane-adoptees parent))))
    (setf (plane-region child)
          (bordering-calculate-child-region contract))))

;;; ---------------- ;;;
;;; FRAMING Contract ;;;
;;; ---------------- ;;;

(defclass framing-parent-part (parent-part) ())

(defclass framing-child-part (child-part) ())

(defclass framing-contract (windowing-contract output-client)
  (
   ;; These can be done with initargs instead
   (parent-part :allocation :class
                :initform (find-class 'framing-parent-part))
   (child-part :allocation :class
               :initform (find-class 'framing-child-part))
   (framing-spec :initform nil :initarg :framing-spec)
   (layout-spec)
   (free-texture :initform *white*)))

(defun make-framing (&rest args)
  (apply #'*make-instance 'framing-contract args))

(defmethod (setf framing-spec) (new-spec (self framing-contract))
  (setf (slot-value self 'framing-spec)
        new-spec)
  (if
      ;; Hack check to see if the frame is ordained in the framing domain.
      (contract-parent self)
      (framing-allocate self (plane-region (contract-parent self))))
  )

(defmethod framing-allocate ((self framing-contract) region)
  (let ((layout-spec (framing-compute-areas (slot-value self 'framing-spec)
                                            (rectangle-left region)
                                            (rectangle-bottom region)
                                            (rectangle-width region)
                                            (rectangle-height region))))
    (dolist (item layout-spec)
      (case (second item)
        ((:fill :free) )
        (:plane
          (let* ((region (first item))
                 (plane (third item))
                 (transformation (plane-transformation plane)))
            (setf (transformation-dx transformation)
                  (rectangle-left region))
            (setf (transformation-dy transformation)
                  (rectangle-bottom region))
            (setf (rectangle-left region) 0)
            (setf (rectangle-bottom region) 0)
            (setf (plane-region plane) region)))
        (t (error "Bad item in layout-spec"))))
    (setf (slot-value self 'layout-spec)
          layout-spec)))

;;; Grammer for the Specifications of Frames
;;; <framing-spec> -> (<section> . <framing-spec>)
;;; <section>      -> (<where><amount-type><amount><framing-spec>)
```

```
;;; <where>       -> :left | :right | :bottom | :top
;;; <amount-type> -> :pixels | :percent | :inches | :cms
;;; <framing-spec> -> (:plane <interactive-plane>)
;;; <framing-spec> -> (:fill <texture>)

(defun framing-compute-areas (framing-spec l b w h)
  (if (null framing-spec)
      '((,(make-rectangle :left l :bottom b :width w :height h)
         :free))
      (case (car framing-spec)
        (:plane (cons (cons (make-rectangle :left l :bottom b
                                            :width w :height h)
                            framing-spec)
                      nil))
        (:fill (cons (cons (make-rectangle :left l :bottom b
                                           :width w :height h)
                           framing-spec)
                     nil))
        (t (let* ((section (car framing-spec))
                  (where (first section))

;; Ignore amount-type for now. Assuming :pixels
                  (amount-type (second section))
                  (amount (third section))
                  (sub-spec (fourth section))
                  (rest-spec (cdr framing-spec)))
             (case where
               (:left (nconc (framing-compute-areas sub-spec l b amount h)
                             (framing-compute-areas rest-spec
                                                    (+ l amount) b
                                                    (- w amount) h)))
               (:right (nconc (framing-compute-areas sub-spec
                                                     (+ l (- w amount))
                                                     b amount h)
                              (framing-compute-areas rest-spec l b
                                                     (- w amount) h)))
               (:bottom (nconc (framing-compute-areas sub-spec l b w
                                                      amount)
                               (framing-compute-areas rest-spec l
                                                      (+ b amount) w
                                                      (- h amount))))
               (:top (nconc (framing-compute-areas sub-spec l
                                                   (+ b (- h amount))
                                                   w amount)
                            (framing-compute-areas rest-spec l b w
                                                   (- h amount))))))))))

;;;
;;; Kernel Events
;;;

(defmethod output-client-repaint ((self framing-contract)
                                  output-contract repaint-region)

;; Assuming the frame plane doesn't have a display-medium of its own.
  (using-display-medium (dm :abc-dm-type output-contract)
    (with-slots (layout-spec free-texture) self
      (dolist (item layout-spec)
        (case (second item)
          (:fill
           (setf (shade dm)
                 (third item))
           (setf (operation dm)
                 :replace)
           (fill-region dm (first item)))
          (:free
           (setf (shade dm)
                 free-texture)
           (setf (operation dm)
                 :replace)
           (fill-region dm (first item)))
          (:plane )
          (t (error "Bad item in layout-spec")))))))

(defmethod contract-enacted ((contract framing-contract))
  (framing-allocate contract (plane-region (contract-parent contract))))
```

```
(defmethod parent-region-changed ((contract framing-contract) parent)
  (framing-allocate contract (plane-region parent))))

;;; *****
;;; PRESENTING Contract:  This contract doesn't trigger any validation.
;;; However, as much of the display is preserved as possible during scrolling
;;; and changing of the presentation region.
;;; *****
;;;
;;; (defclass presenting-contract (contract) nil)
;; (defclass presenting-parent-part (parent-part))
;; (defclass presenting-child-part (child-part))
;; (defmethod presenting-initialize ((self presenting-parent-part)
;; presenting-child-part gravity) ;; Gravity dictates where the bits of
;; the presentation plane stick when the presentation plane is resized.
;; (unimplemented))

;; Public Interface
;;

;; Scrolling is allowed if the given position is within the region of the
;; composition plane.  The index method provides scrolling based on percentage
;; of the composition area.

;; (defmethod presenting-scroll-absolute ((self presenting-parent-part) x
;; y) (unimplemented))

;; (defmethod presenting-scroll-relative ((self presenting-parent-part)
;; delta-x delta-y) (unimplemented))

;; (defmethod presenting-scroll-index ((self presenting-parent-part)
;; x-index y-index) (unimplemented))

;; Internal Protocol
;; (setf (viewer-region presentation-viewer) new-region)
;; Hook to be informed of resizes imposed from above.  This method sends a
;; message to the composition-viewer so that it can recompose if it wants to.

;; (inform-new-composition-region presentation-viewer region)

;; Hook to inform the presentation-viewer region when the composition-viewer
;; recomposes to a different region.

;; (composition-region composition-viewer composition-transformation region)

;; The composition transformation is an additional transformation that will be
;; applied to output to the region.  The presentation plane calculates
;; scrollable extent by transforming the region.

;; (inform-new-presentation-region  composition-viewer region)

;; Hook to allow the composer to recompose to different dimensions (i.e.
;; change the composition region) or synchronize the output scaling (i.e.
;; change the composition transformation).
;;; -*- Mode: Lisp; Package: STK; Base: 10.; Syntax: Common-Lisp -*-
;;;
;;; Copyright (c) 1988 by Xerox Corporation.  All rights reserved
;;;

(in-package "STK")

;;;
;;; STK OBJECTS
;;;

;;;
;;; This file contains functionality which is generally useful for building
;;; high level interfaces.
;;;

;;;
;;; Window Shell
;;;

(defclass window-shell ()
  ((border-plane :accessor window-shell-border-plane)
   (border-size :accessor window-shell-border-size)
```

```
    (frame-plane :accessor window-shell-frame-plane)
    (adornment-planes :accessor window-shell-adornment-planes)))

(defmethod initialize-window-shell
    ((self window-shell) region transformation parent youth-contract
     &optional (border-size 2) framing-spec adornment-planes)
  (let* ((bordering-contract (make-bordering :border-size border-size))
         (border-plane
           (make-silica-plane :youth-contract-class (class-of youth-contract)
                              :adult-contract-class 'bordering-contract
                              ;; Pull the x and y of the given region out
                              ;; as a translation
                              :region region
                              :owner self :parent parent
                              :transformation transformation
                              :parent-p t :output-client
                              bordering-contract))
         (framing-contract (make-framing :framing-spec framing-spec))
         (frame-plane ;; frame-planes region and transformation will get set by
           ;; the bordering-contract at ordainment time.
           (make-silica-plane :youth-contract-class 'bordering-contract
                              :adult-contract-class 'framing-contract
                              :owner self
                              :parent border-plane
                              :transformation (make-transformation)
                              :parent-p t
                              :output-client framing-contract))
         framing-domain)

;; Bordering Plane and Domain
    (setf (window-shell-border-plane self) border-plane)
    (enact-contract (plane-adult-domain border-plane)
                    bordering-contract)

;; Framing Plane and Domain
    ;; Set up the necessary adornment objects and planes.
    (setq framing-domain (plane-adult-domain frame-plane))
    (dolist (adornment-plane adornment-planes)
      (windowing-domain-add-child framing-domain
                                  adornment-plane (make-transformation))
      (setf (plane-youth-domain adornment-plane) framing-domain))
    (setf (window-shell-adornment-planes self) adornment-planes)
    (setf (window-shell-frame-plane self) frame-plane)
    (enact-contract (plane-adult-domain frame-plane)
                    framing-contract)

;; Return the window shell
    self))

(defmethod destroy-window-shell ((shell window-shell))
  (destroy-silica-plane (window-shell-border-plane shell)))

(defmethod open-window-shell ((self window-shell))
  (with-slots (border-plane frame-plane)
      self
    (enable-plane frame-plane)
    (enable-plane border-plane)
    (output-contract-repaint border-plane t)))

(defmethod close-window-shell ((self window-shell))
  (with-slots (border-plane)
      self
    (disable-plane border-plane)
    (output-contract-repaint (plane-parent border-plane) t)))

(defmethod window-shell-border-size ((window-shell window-shell))
  (border-size
    ;; Assuming the bordering contract is responsible for repaint of
    ;; border.
    (slot-value (window-shell-border-plane window-shell)
                'output-client)))
```

```
;;;
;;; Text Blocks
;;;

(defclass text-field (output-client owner)
  ((plane :accessor text-field-plane)
   (text :accessor text-field-text :initarg :text)
   (font :accessor text-field-font :initarg :font)
   (horz :accessor text-field-horz :initarg :horz :initform :center)
   (vert :accessor text-field-vert :initform :center)
   (ground :accessor text-field-ground :initform *gray*)
   (backing :accessor text-field-backing :initform *black*)
   (margin :accessor text-field-margin :initform 1)))

(defun make-text-field (&rest args &key parent youth-contract-class galaxy
                        &allow-other-keys)
  (let* ((font (or (getf args :font)
                   (make-font :connection (if galaxy
                                              (connection galaxy)
                                              (connection parent))
                              :family :sans-serif :size 10)))
         (text-field (apply #'*make-instance 'text-field :font font
                            :allow-other-keys t args))
         (plane (apply #'make-silica-plane
                       :owner text-field
                       :output-client text-field :allow-other-keys t args)))
    (setf (slot-value text-field 'plane) plane)

text-field))

(defmethod output-client-repaint ((text-field text-field)
                                  output-contract repaint-region)
  (using-display-medium
    (dm :abc-dm-type output-contract)
    (let* ((region (plane-region output-contract))
           (left (rectangle-left region))
           (right (rectangle-right region))
           (top (rectangle-top region))
           (bottom (rectangle-bottom region))
           (width (rectangle-width region))
           (height (rectangle-height region))
           (margin (text-field-margin text-field))
           (string (text-field-text text-field))
           (font (text-field-font text-field))
           string-width)
      (setf (font dm) font)
      (setf (shade dm) (text-field-ground text-field))
      (setf (operation dm) :replace)
      (fill-rectangle dm left bottom width height)
      (setq string-width (string-width dm string))
      (setf (shade dm) (text-field-backing text-field))
      (fill-rectangle dm
                      (ecase (text-field-horz text-field)
                        (:left (+ left margin))
                        (:center (+ left (floor width 2)
                                    (- (floor string-width 2))
                                    (- margin)))
                        (:right (- right string-width margin)))

(ecase (text-field-vert text-field)
                        (:top (- top (font-ascent font)
                                 margin))
                        (:center (+ bottom (floor height 2)
                                    (- (floor (font-height font)
                                              2))
                                    (- margin)))
                        (:bottom (+ bottom margin)))
                      (+ string-width (* 2 margin))
                      (+ (font-height font)
                         (* 2 margin)))
      (setf (operation dm) :invert)
      (print-string-justified dm (text-field-text text-field)
                              left bottom width height
                              (text-field-horz text-field)
                              (text-field-vert text-field)))))
```

```
;;;
;;; Event Handlers
;;;
#+junk
(defclass event-reader (event-handler)
  ((terminal-table)
   (read-table)))

#+junk
(defclass event-transducer (event-handler)
  ((translator)
   (client)))
;;; -*- Mode: Lisp; Package: STK; Base: 10.; Syntax: Common-Lisp -*-
;;;
;;; Copyright (c) 1988 by Xerox Corporation.  All rights reserved.
;;;

(in-package "STK")

;;;
;;; STK DESK
;;;

;;;
;;; The STK Desktop Manager.
;;;

;;;
;;; Desktop Menus
;;;

(defvar *cache-menus?* nil)
(defvar *cached-menus* nil)
(defparameter *menu-font*
  #+xerox (il:fontcreate 'il:helvetica '10)
  #-xerox nil)

(defvar *background-menu-items*
  '(("Create Window" (eval '(create-window)))
    ("Change Style" (eval '(change-style *desktop*)))
    ("Repaint Galaxy" (eval '(output-contract-repaint (galaxy-root
                                                       *current-galaxy*
                                                       )
                                                      t)))
    ("Inspect Plane" (eval '(inspect (which-descendant
                                       (galaxy-root *current-galaxy*)
                                       (get-position (galaxy-root
                                                       *current-galaxy*
                                                       ))))))
    ("Inspect Contract"
     (eval '(inspect (plane-adult-contract
                       (which-descendant
                         (galaxy-root *current-galaxy*)
                         (get-position (galaxy-root *current-galaxy*)))))))))

(defparameter *window-menu-items*
  '(("Close" :close)
    ("Destroy" :destroy)
    ("Repaint" :repaint)
    ("Move" :move)))

(defun do-cached-menu (items)
  (let ((the-menu (getf items *cached-menus*)))
    (when (not (and *cache-menus?* *background-menu*))
      (setq the-menu (create-menu items *menu-font*))
      (if *cache-menus?*
          (setf (getf items *cached-menus*)
                the-menu)))
    (do-menu the-menu)))

;;;
;;; Desktop and Window Classes
;;;

(defclass desktop nil
  ((plane :accessor desktop-plane)
   (style :initform :overlapping :accessor desktop-style)
```

```
   (contracts :accessor desktop-contracts)
   (shade :initform *light-gray* :accessor desktop-shade)))

(defvar *desktop* nil)
(defparameter *default-desktop-style* :overlapping)

(defclass window ()
  ((plane :accessor window-plane)
   (user-props :initform nil))
  )

(defclass foreign-window (window)
  ()
  )

(defclass local-window (window window-shell)
  ((style :initform :tiling :accessor window-style)))

(defconstant *title-bar-height* 14)

;;; *****
;;; Desktop METHODS
;;; *****

(defun make-desktop (&rest keys &key galaxy (title "A Silica Desktop")
                           &allow-other-keys)
  (unless galaxy
    (setq galaxy (make-galaxy :title title)))
  (let* ((desktop (apply #'initialize-desktop (make-instance 'desktop)
                         :galaxy galaxy :allow-other-keys t keys)))
    (silica::install-galaxy-root
      galaxy (desktop-plane desktop)
      :display-medium (output-contract-display-medium (desktop-plane desktop)))
    (open-desktop desktop)
    (setq *desktop* desktop)
    desktop))

(defmethod initialize-desktop ((desktop desktop) &rest args
                               &key (youth-contract-class 'mute-windowing-contract)
                                    (style *default-desktop-style*)
                                    parent region galaxy)
  (let* ((plane (make-silica-plane
                  :youth-contract-class youth-contract-class
                  :adult-contract-class
                  (case style
                    (:overlapping 'overlapping-contract)
                    (:tiling 'tiling-contract))
                  :region region :owner desktop :parent parent
                  :parent-p t :galaxy galaxy :output-client desktop
                  :display-medium-mode :allocate))
         galaxy-domain)

;; Now Enact the contract.
    (setq galaxy-domain (plane-adult-domain plane))
    (enact-contract galaxy-domain ;; This should be generalized to some desktop contract
                    ;; protocol
                    (case style
                      (:overlapping (make-instance 'overlapping-contract))
                      (:tiling (make-tiling))))
    (setf (desktop-style desktop)
          style)
    (setf (desktop-plane desktop)
          plane)

;; Return it
    desktop))

(defmethod open-desktop ((desktop desktop))
  (enable-plane (desktop-plane desktop))
  (output-contract-repaint (desktop-plane desktop) t))

(defmethod handle-mouse ((desktop desktop)
                         position)
```

```
(let ((plane (which-child (slot-value desktop 'plane)
                                      position)))
  (if plane ;; Do desktop specific operation
      (handle-mouse (plane-owner plane)
                    (transformation-undo (plane-transformation plane)
                                         position))

;; Else do Silica Menu
      (do-cached-menu *background-menu-items*))))

(defmethod output-client-repaint ((desktop desktop)
                                  output-contract repaint-region)
  (with-slots (display-medium) output-contract
              (setf (shade display-medium)
                    (desktop-shade desktop))
              (setf (operation display-medium)
                    :replace)
              (fill-region display-medium repaint-region)))

(defmethod change-style ((desktop desktop) &optional new-style)
  (with-slots (style plane) desktop
      (if new-style
          (if (eq new-style style)
              (setq new-style nil))
        (setq new-style (case style
                         (:overlapping :tiling)
                         (:tiling :overlapping))))
      (when new-style
          (let* ((galaxy-domain (plane-adult-domain plane))
                 (contract (windowing-domain-contract galaxy-domain)))

;; Repeal the Old Contract
            (disable-all galaxy-domain)
            (repeal-contract galaxy-domain)
            (setf (getf (desktop-contracts desktop) style)
                  contract)

;; Change to the New Contract
            (case
             new-style
             (:overlapping (change-class plane (get-plane-class-from-defaults
                                               :adult-contract-class
                                               ' overlapping-parent-part
                                               :defaults (class-of plane))))
             (:tiling (change-class plane (get-plane-class-from-defaults
                                           :adult-contract-class
                                           'tiling-parent-part
                                           :defaults (class-of plane)))))
            (enact-contract galaxy-domain
                            (or (getf (desktop-contracts desktop)
                                      new-style)
                                (case new-style
                                      (:overlapping (make-instance '
                                                     overlapping-contract))
                                      (:tiling (make-tiling)))))
            (enable-plane plane)
            (output-contract-repaint plane t)

;; Change the Children
            (dolist (child (windowing-domain-children galaxy-domain))
                    (setf (window-style (plane-owner child))
                          new-style)
                    (case
                     new-style
                     (:overlapping
                      (change-class child
                                    (get-plane-class-from-defaults
                                     :youth-contract-class
                                     'overlapping-child-part
                                     :defaults (class-of child))))
                     (:tiling
                      (change-class child
                                    (get-plane-class-from-defaults
                                     :youth-contract-class
                                     'tiling-child-part
                                     :defaults (class-of child))))))
```

```
              (open-window (plane-owner child))))
       (setq style new-style))))
;;;
;;; Window Methods
;;;

(defun create-window (&rest args
                            &key (desktop *desktop*) region (open-p t)
                            &allow-other-keys)
  (let ((window))
    (or region (setf (getf args :region)
                     (get-region (desktop-plane desktop))))
    (remf args :open-p)
    (setq window (apply #'make-window args))
    (if open-p (open-window window))
    window))

(defun make-window (&rest args &key desktop connection &allow-other-keys)

(unless (or desktop connection)
    (typecase *desktop*
      (desktop    (setq desktop *desktop*))
      (w::connection (setq connection *desktop*))))

(if desktop
      (apply #'*make-instance 'local-window :desktop desktop args)
      (apply #'*make-instance 'foreign-window :connection connection args)))

;;;
;;; Window Operations
;;;

(defmethod *initialize-instance :after
  ((window foreign-window)
   &key connection (title "Silica Window") client region inner
   &allow-other-keys)

(let* ((galaxy (make-galaxy :connection connection
                              :title title)))
    (if (not inner)
        (setq inner (make-silica-plane
                      :owner window
                      :display-medium-mode :allocate
                      :output-client window
                      :galaxy galaxy)))

(setf (window-plane window) inner)

(install-galaxy-root
      galaxy inner :display-medium (output-contract-display-medium inner))

window))

(defmethod *initialize-instance :after
  ((window local-window)
   &key desktop (title "Silica Window") client region inner
   &allow-other-keys)

(let* ((parent (desktop-plane desktop))
         title-bar title-plane)

(setq title-bar (make-text-field
                      :youth-contract-class 'framing-contract
                      :galaxy (galaxy parent)
                      :text title))
    (setq title-plane (text-field-plane title-bar))

(if (not inner)
        (setq inner (make-silica-plane
                      :youth-contract-class 'framing-contract
                      :owner window
                      :display-medium-mode :allocate
                      :output-client window
                      :galaxy (galaxy parent))))
```

```
        (setf (window-plane window)
              inner)
        (setf (window-style window)
              (desktop-style desktop))

(initialize-window-shell window
                         (make-rectangle :left 0 :bottom 0
                                         :width (rectangle-width region)
                                         :height (rectangle-height region))
                         (make-transformation :x-translation
                                              (rectangle-left region)
                                              :y-translation
                                              (rectangle-bottom region))
                         parent
                         (plane-adult-contract parent)
                         2
                         '((:top :pixels ,*title-bar-height*
                            (:plane ,title-plane))
                           :plane ,inner)
                         (list title-plane inner))
    window))

(defmethod destroy-window ((window window))
  (close-window window)
  (destroy-silica-plane (window-plane window)))

(defmethod repaint-window ((window window))
  (output-contract-repaint (window-shell-border-plane window) t))

(defmethod open-window ((window local-window))
  (if (eq (window-style window) :tiling)
      (with-slots (border-plane) window
        (tiling-allocate-from-plane (plane-parent border-plane)
                                    border-plane)))
  (open-window-shell window))

(defmethod close-window ((window local-window))
  (close-window-shell window))

(defmethod open-window ((window foreign-window))
  (with-slots (plane) window
    (enable-plane plane)
    (output-contract-repaint plane t)))

(defmethod close-window ((window foreign-window))
  (with-slots (plane) window
    (disable-plane plane)))

(defmethod move-window ((window local-window))
  (let* ((position (get-position (plane-parent (window-plane window)))))
    (overlapping-move (window-shell-border-plane window)
                      position)))

;;;
;;; Kernel Communications
;;;

(defmethod output-client-repaint ((window window)
                                  output-contract repaint-regions)
  (using-display-medium (dm :abc-dm-type output-contract)
    (setf (shade dm) *white*)
    (setf (operation dm) :replace)
    (fill-region dm repaint-regions)))

;;;
;;; Window Properties
;;;

(defmethod window-display-medium ((window window))
  (output-contract-display-medium (window-plane window)))
(defmethod window-prop ((window window) prop)
  (getf (slot-value window 'user-props) prop))

(defmethod (setf window-prop) (new-value (window window) prop)
```

```
    (setf (getf (slot-value window 'user-props) prop)
          new-value))

(defmethod window-galaxy ((window window))
  (galaxy (window-plane window)))

(defmethod window-height ((window window))
  (height (plane-region (window-plane window))))

(defmethod window-width ((window window))
  (width (plane-region (window-plane window))))

;;;
;;; User Interactions
;;;

(defmethod handle-mouse ((window window) position)
  (when position
        (with-slots (border-plane plane) window
                    (if (or (not (eq plane
                                     (which-descendant border-plane
                                                       position)))
                            (eq window (plane-owner plane)))
                        (case (do-cached-menu *window-menu-items*)
                              (:repaint (output-contract-repaint plane))
                              (:move (move-window window))
                              (:destroy (destroy-window window))
                              (:close (close-window window)))
                        (handle-mouse (plane-owner plane)
                                      position)))))
;;; -*- Mode: Lisp; Package: User; Base: 10.; Syntax: Common-Lisp -*-
;;;
;;; TEST-SILICA
;;;
;;; Copyright (c) 1988 by Xerox Corporation.  All rights reserved.
;;;

;;;
;;; TEST SUITES
;;;

(in-package 'silica)

#+xerox
(xcl:defcommand "st" (&optional (n nil n-supplied-p))
  (if n-supplied-p
      (if (integerp n)
          (silica-test n)
          (error "Not an integer."))
      (silica-test-suite)))

(defparameter *n-tests* 1)

(defun silica-test-suite nil
  (do ((i 1 (incf i)))
      ((> i *n-tests*))
    (format t "----- Silica Test ~d -----~%" i)
    (silica-test i))
  (format t "----- End Test Suite -----~%"))

(defun silica-test (n)
  (let ((*trace-output* t)
        (sym (intern (format nil "SILICA-TEST-~D" n)
                     "SILICA"))
        took)
    (when (symbol-function sym)
      (time (funcall (symbol-function sym))))))

(defun silica-test-1 nil
  (let (silica-galaxy display-medium region w h x1 x2 y1 y2)
    (setq silica-galaxy
          (make-x-galaxy :host "layla"))
    (setq display-medium (output-contract-display-medium
                          (galaxy-root silica-galaxy)))
    (setq region (output-contract-clipping-region silica-galaxy))
```

```
      (setq w (region-width region))
      (setq h (region-height region))
      (setq x1 (/ w 4))
      (setq y1 (/ h 4))
      (setq x2 (* 3 (/ w 4)))
      (setq y2 (* 3 (/ h 4)))
      (setf (line-width display-medium) 2)
      (setf (location display-medium) (make-position :x x1 :y y1))
      (draw-to display-medium         (make-position :x x2 :y y2))
      (setf (location display-medium) (make-position :x x1 :y y1))
      (draw-to display-medium         (make-position :x x1 :y y2))
      (setf (location display-medium) (make-position :x x1 :y y1))
      (draw-to display-medium         (make-position :x x2 :y y1))
      (setf (location display-medium) (make-position :x x1 :y y2))
      (draw-to display-medium         (make-position :x x2 :y y1))
      (setf (location display-medium) (make-position :x x1 :y y2))
      (draw-to display-medium         (make-position :x x2 :y y2))
      (setf (location display-medium) (make-position :x x2 :y y2))
      (draw-to display-medium         (make-position :x x2 :y y1))))

(defun silica-test-2 nil (abc-test 1))

(defun silica-test-3 nil (abc-test 2))

(defun abc-test (n)
  (let* ((va (create-galaxy))
         (region (plane-region va))
         fn)
    (setq fn (ecase n
               (1 #'abc-test-simple)
               (2 #'abc-test-transforms)))
    (funcall fn (output-contract-display-medium va)
             (rectangle-width region)
             (rectangle-height region))))

(defun abc-test-simple (dm w h)
  (let nil
    (setf (operation dm)  :replace
          (shade dm)       *gray*)
    (fill-rectangle dm 0 0 w h)
    (setf (operation dm)  :replace
          (shade dm)       *black*)
    (with-saved-context dm
      (setf (font dm)          (make-font :display-medium dm
                                      :family :serif :size 12 :boldp t)
            (line-width dm)                      4)
      (let ((box (make-rectangle :left    (* w 3/4)
                                 :bottom  (* h 7/8)
                                 :width   (1- (* w 1/4))
                                 :height  (1- (* h 1/8)))))
        (clear dm box)
        (draw-box dm box)
        (print-string-justified dm "Centered" box)))
    (let ((box (make-rectangle :left    (* w 3/4)
                               :bottom  0
                               :width   (1- (* w 1/4))
                               :height  (1- (* h 1/8)))))
      (clear dm box)
      (draw-box dm box)
      (print-string-justified dm "Top-Right" box :right :top))))

(defun abc-test-transforms (dm w h)
  (flet ((draw-figure nil
           (let ((box (make-rectangle :left 0 :bottom 0
                                      :width  (* w 1/5)
                                      :height (* h 1/10))))
             (clear dm box)
             (draw-box dm box)
             (print-string-justified dm "Centered" box))))
    (clear dm)

(with-saved-context dm
      ;; Initialize the display media
      (setf (operation dm) :replace
            (font dm) (make-font :display-medium dm
                                 :family :sans-serif)
            (clipping-region dm)
```

```
                    (region-union (make-rectangle :left 5 :bottom 5
                                                  :width (- w 5)
                                                  :height
                                                  (* h 3/8))
                                  (make-rectangle :left 225 :bottom 55 :width
                                                  (* w 3/8)
                                                  :height h)))
        ;; Fill the background with gray
        (with-saved-context dm
            (setf (shade dm) *light-gray*)
            (fill-rectangle dm 0 0 w h)))

;; Draw the un-transformed figure
        (draw-figure)
        (with-saved-context dm
            ;; Draw it translated
            (setf (transformation dm)
                  (transformation-compose
                    (transformation dm)
                    (make-transformation
                      :x-translation (* w 1/4)
                      :y-translation (* h 1/8))))
            (draw-figure)
            ;; Try to scale it, with a different font
            (setf (transformation dm)
                  (transformation-compose
                    (transformation dm)
                    (make-transformation :scale 2)))
            (draw-figure))

;; Finally, try it rotated
        (with-saved-context dm
            (setf (transformation dm)
                  (transformation-compose
                    (transformation dm)
                    (make-transformation :rotation 90
                                         :x-translation (* w 1/5)
                                         :y-translation
                                         (* h 1/8))))
            (draw-figure)))))
;;; -*- MODE: Lisp; Package: STK; Base: 10.; Syntax: Common-Lisp -*-
;;;
;;; TEST-STK
;;;
;;; Copyright (c) 1988 by Xerox Corporation.  All rights reserved.
;;;

(in-package 'stk)

;;;
;;; A Test Suite for STK and Hence, Silica as well.
;;;

(defvar *default-host-name*
  #+excl (system:getenv "HOST")
  #+xerox "thetajmahal"
  #-(or excl xerox) "layla")

;;; *****
;;; SIMPLE
;;; *****

(defun desk (&optional (host *default-host-name*))
  (make-desktop :galaxy (silica::make-galaxy :host host)))

(defun ddesk (&optional (host *default-host-name*))
  (setq *desktop* (make-connection host 0)))

(defun window (&optional (l 50) (b 50) (w 300) (h 300))
  (let ((window (create-window
                  :title "STK Window"
                  :region (make-rectangle :left l :bottom b
                                          :width w :height h))))
    (flush-output (window-display-medium window))
    window))
```

```
(defun do-ico nil
   (ico (make-rectangle :left 0 :bottom 200
                        :width 300 :height 300)))

(defun do-hanoi nil
   (hanoi :region (make-rectangle :left 0 :bottom 200
                                  :width 300
                                  :height 300)))
;;; *****
;;; MANIA
;;; *****

(defparameter *mania* 50)

(defun mania (&key (type :x) (host *default-host-name*))
   (let ((*desktop* (desk))
         (rect (make-rectangle :left 0 :bottom 200 :width 200 :height 200)))
     (time
      (dotimes (i *mania*)
        (setf (left rect)   (random 300)
              (bottom rect) (random 300))
        (create-window
         :title (format nil "Window #~d" i)
         :region rect)))))

;;; 7/7 PCL
;;; cpu time (non-gc) 38700 msec user, 1067 msec system
;;; cpu time (gc)     3650 msec user, 83 msec system
;;; cpu time (total) 42350 msec user, 1150 msec system
;;; real time   63680 msec ;;; cpu time (non-gc) 35700 msec user, 966 msec system
;;; cpu time (gc)     2583 msec user, 0 msec system
;;; cpu time (total) 38283 msec user, 966 msec system
;;; real time   61260 msec ;;; 3/16 PCL
;;; cpu time (non-gc) 35484 msec user, 1734 msec system
;;; cpu time (gc)     2933 msec user, 16 msec system
;;; cpu time (total) 38417 msec user, 1750 msec system
;;; real time   57880 msec ;;; cpu time (non-gc) 34150 msec user, 1750 msec system
;;; cpu time (gc)     2750 msec user, 0 msec system
;;; cpu time (total) 36900 msec user, 1750 msec system
;;; real time   55680 msec
;;; -*- Mode: Lisp; Package: STK; Base: 10.; Syntax: Common-Lisp -*-
;;;
;;; Copyright (c) 1988 by Xerox Corporation.  All rights reserved.
;;;

(in-package "STK")

;;;
;;; DEMO-ICO
;;; Essentially Borrowed from X demos.  Start the trend back from C to Lisp.
;;;

(defconstant nv 12)
(defconstant nf 20)

(defparameter v3-seq '(;; Initial Position
              (0.0d0          0.0d0          -0.9510565d0)
              (0.0d0          0.8506508d0    -0.42532536d0)
              (0.809017d0     0.26286557d0   -0.42532536d0)
              (0.5d0         -0.68819094d0   -0.42532536d0)
              (-0.5d0        -0.68819094d0   -0.42532536d0)
              (-0.809017d0    0.26286557d0   -0.42532536d0)
              (0.5d0          0.68819094d0    0.42532536d0)
              (0.809017d0    -0.26286557d0    0.42532536d0)
              (0.0d0         -0.8506508d0     0.42532536d0)
              (-0.809017d0   -0.26286557d0    0.42532536d0)
              (-0.5d0         0.68819094d0    0.42532536d0)
              (0.0d0          0.0d0           0.9510565d0)))

(defparameter faces '((0 2 1) (0 3 2) (0 4 3) (0 5 4)
                      (0 1 5) (1 6 10) (1 2 6) (2 7 6)
```

```
                          (2 3 7) (3 8 7) (3 4 8) (4 9 8)
                          (4 5 9) (5 10 9) (5 1 10) (10 6 11)
                          (6 7 11) (7 8 11) (8 9 11) (9 10 11)))

(defparameter xform nil) ; Initialized Below (defmacro v2-aref (vertex-number field)
      (case field
          ((x) '(aref v2 ,vertex-number 0))
          ((y) '(aref v2 ,vertex-number 1))
          ((z) '(aref v2 ,vertex-number 2))
          (t (error "Bad array reference on v2"))))

(defparameter v2 (make-array (list nv 3)))

(defparameter drawn      (make-array (list nv nv) :initial-element nil))
(defparameter drawn-fill (make-array (* nv nv) :displaced-to drawn))
;;;
;;; TOP LEVEL
;;;

(defconstant ico-w    150)
(defconstant ico-h    150)
(defconstant ico-w/2 (floor ico-w 2))
(defconstant ico-h/2 (floor ico-h 2))

(defun ico (&optional region)
  (let* ((window (stk::create-window :region region :title "Ico Demo"))
         (display-medium (stk::window-display-medium window))
         (region (plane-region (stk::window-plane window)))
         (win-w (rectangle-width region))
         (win-h (rectangle-height region))
         (ico-x (floor (* (- win-w ico-w) (random 256))
                       256))
         (ico-y (floor (* (- win-h ico-h) (random 256))
                       256))
         (ico-dx 13)
         (ico-dy 9)
         (xtop (- win-w ico-w))
         (ytop (- win-h ico-h))
         (prev-x 0)
         (prev-y 0))

(declare (integer win-w win-h ico-x ico-y ico-dx ico-dy)
             (special prev-x prev-y))

(clear-media display-medium)
    (dotimes (i 100)
      (draw-ico display-medium ico-x ico-y)
      (flush-output display-medium)

(setq prev-x ico-x
            prev-y ico-y)
      (incf ico-x ico-dx)
      (when (or (< ico-x 0) (> ico-x xtop))
        (decf ico-x (* ico-dx 2))
        (setq ico-dx (- ico-dx)))
      (incf ico-y ico-dy)
      (when (or (< ico-y 0) (> ico-y ytop))
        (decf ico-y (* ico-dy 2))
        (setq ico-dy (- ico-dy))))))

(defun draw-ico (display-medium ico-x ico-y)
  (declare (special prev-x prev-y)
           (integer ico-x ico-y))
  (let (
        (edges nil)
        (v2-fill (make-array (* nv 3)
                             :displaced-to v2
                             :fill-pointer 0))
        p0 p1 p2)

;;Clear the drawn array
    (fill drawn-fill nil)
```

```
;; Rotate vertices
(partial-nonhom-transform xform v3-seq)

;; Convert 3d coordinates to 2D positions
(dolist (v3 v3-seq)
  (vector-push (+ ico-x (round (* ico-w/2 (+ (first v3) 1.0))))
               v2-fill)
  (vector-push (+ ico-y (round (* ico-h/2 (+ (second v3) 1.0))))
               v2-fill)
  ;; Save the z for hidden line removal
  (vector-push (third v3) v2-fill))

;; Accummulate edges, w/o duplicates
(dolist (face faces)
  (setq p0 (first face))
  (setq p1 (second face))
  (setq p2 (third face))

;; Unless hidden
  (unless (< (+ (v2-aref p0 z)
                (v2-aref p1 z)
                (v2-aref p2 z))
             0.0)
    ;; Mark for Draw
    (unless (aref drawn p0 p1)
      (setf (aref drawn p0 p1) t)
      (setf (aref drawn p1 p0) t)
      (setq edges
            (list* (v2-aref p0 x) (v2-aref p0 y)
                   (v2-aref p1 x) (v2-aref p1 y)
                   edges)))

(unless (aref drawn p1 p2)
      (setf (aref drawn p1 p2) t)
      (setf (aref drawn p2 p1) t)
      (setq edges
            (list* (v2-aref p1 x) (v2-aref p1 y)
                   (v2-aref p2 x) (v2-aref p2 y)
                   edges)))

(unless (aref drawn p2 p0)
      (setf (aref drawn p2 p0) t)
      (setf (aref drawn p0 p2) t)
      (setq edges
            (list* (v2-aref p2 x) (v2-aref p2 y)
                   (v2-aref p0 x) (v2-aref p0 y)
                   edges)))))

;; Now we are ready to draw
(clear-rectangle display-medium prev-x prev-y (1+ ico-w) (1+ ico-h))
(draw-segments display-medium edges))))

;;;
;;; Matrix Operations
;;;

(deftype transform-3d nil '(array double-float (4 4)))

(defun concat-mat (l r m)
  (declare (transform-3d l r m))
  (dolist (i '(0 1 2 3))
    (dolist (j '(0 1 2 3))
      (setf (aref m i j)
            (+ (* (aref l i 0)
                  (aref r 0 j))
               (* (aref l i 1)
                  (aref r 1 j))
               (* (aref l i 2)
                  (aref r 2 j))
               (* (aref l i 3)
                  (aref r 3 j))))))
  m)

(defun format-rotate-mat (axis angle m)
  (declare (character axis)
```

```
             (double-float angle)
             (transform-3d m))
  (ident-mat m)
  (let ((s (sin angle))
        (c (cos angle)))
    (declare (double-float s c))
    (case axis
      (x (setf (aref m 1 1) c)
         (setf (aref m 2 2) c)
         (setf (aref m 1 2) s)
         (setf (aref m 2 1) (- s)))
      (y (setf (aref m 0 0) c)
         (setf (aref m 2 2) c)
         (setf (aref m 2 0) s)
         (setf (aref m 0 2) (- s)))
      (z (setf (aref m 0 0) c)
         (setf (aref m 1 1) c)
         (setf (aref m 0 1) s)
         (setf (aref m 1 0) (- s)))))))

(defun ident-mat (m)
  (declare (transform-3d m))
  (dolist (i '(0 1 2 3))
    (dolist (j '(0 1 2 3))
      (setf (aref m i j)
            0.0d0))
    (setf (aref m i i)
          1.0d0))
  m)

(defun partial-nonhom-transform (m v3-seq)
  (declare (list v3-seq)
           (transform-3d m))
  (let ((m00 (aref m 0 0))
        (m10 (aref m 1 0))
        (m20 (aref m 2 0))
        (m01 (aref m 0 1))
        (m11 (aref m 1 1))
        (m21 (aref m 2 1))
        (m02 (aref m 0 2))
        (m12 (aref m 1 2))
        (m22 (aref m 2 2)))

(dolist (v3 v3-seq)
      (let* ((in-x (first v3))
             (in-y (second v3))
             (in-z (third v3)))
        (setf (first v3) (+ (* in-x m00)
                            (* in-y m10)
                            (* in-z m20))
              (second v3) (+ (* in-x m01)
                             (* in-y m11)
                             (* in-z m21))
              (third v3) (+ (* in-x m02)
                            (* in-y m12)
                            (* in-z m22)))))))

(defun create-xform nil
  (let ((r1 (create-transform-3d))
        (r2 (create-transform-3d))
        (r3 (create-transform-3d)))
    (format-rotate-mat 'x (/ (* 5 3.1416)
                             180.0d0)
                       r1)
    (format-rotate-mat 'y (/ (* 5 3.1416)
                             180.0d0)
                       r2)
    (concat-mat r1 r2 r3)
    r3))

(defun create-transform-3d nil
  (make-array '(4 4)
              :element-type
              'double-float))

(defparameter xform (create-xform))
```

```lisp
;;; -*- Mode: Lisp; Package: STK; Base: 10.; Syntax: Common-Lisp -*-
;;;
;;; Copyright (c) 1988 by Xerox Corporation. All rights reserved.
;;;

(in-package "STK")

;;;
;;; SILICA HANOI
;;;

(defparameter peg-shade *black*)
(defparameter odd-ring-shade *gray*)
(defparameter even-ring-shade *dark-gray*)

(defun ring-shade (ringn)
       (cond ((eq ringn 'base)         peg-shade)
             ((zerop (logand ringn 1)) even-ring-shade)
             (t                        odd-ring-shade)))

(defconstant peg-min 2)
(defconstant hanoi-margin 5)
(defconstant max-vert-speed 30)
(defconstant max-horiz-speed 44)

(defvar *hanoi-window* nil)

(defmacro pegn (n)
       '(car (case ,n
               (1 pegs)
               (2 (cdr pegs))
               (otherwise (cddr pegs)))))

(defstruct peg
  (region)
  (rings))

(defstruct ring
  (region)
  (number)
  (label))

;;;
;;; TOP LEVEL
;;;

(defun hanoi (&key (rings 5) window region font (once t))
  (declare (special rings))
  (let* ((window (if region
                     (create-window :region region
                                    :title "Hanoi")
                   (if (typep window 'window)
                       (setq *hanoi-window* window)
                     (or *hanoi-window*
                         (setq *hanoi-window*
                               (create-window :region region
                                              :title "Hanoi"))))))
         (galaxy (window-galaxy window))
         (display-medium (window-display-medium window))
         (nrings (if (numberp rings) rings (length rings)))
         (horizspeed 21)
         (vertspeed 17)
         (pegs nil)
         ringlargest topupringbm topdownringbm pegwidth basewidth
         ringheight movementheight baseheight pegtop ringdisplaystream
         ringdelta upringbm horizringbm downringbm
         (bm-dm (make-abc-bitmap-medium :galaxy galaxy
                                        :connection (connection galaxy)))
         imageheight sourcepeg ring-labels)

(declare (special nrings vertspeed horizspeed pegs ringlargest
                      topupringbm topdownringbm pegwidth basewidth
                      ringheight movementheight baseheight pegtop
```

```
                 ringdisplaystream ringdelta upringbm horizringbm
                 downringbm bm-dm))

(setq basewidth (- (window-width window) (* hanoi-margin 2)))
(setq ringlargest (floor basewidth 3))

;; RINGDELTA is the difference in peg size on each side.
(when (zerop (setq ringdelta (floor (- ringlargest peg-min)
                                    (1+ (* nrings 2)))))
      (error "Not enough width for a display."))

;; leave one ring width for base, one for top of peg and two
;; above peg for movement.  Doesn't really use two heights at
;; top, only one plus VERTSPEED
(setq ringheight (floor (setq imageheight (- (window-height window)
                                             (* hanoi-margin 2)))
                        (+ nrings 4)))
(when (zerop ringheight)
      (error "Not enough height for display."))
(setq pegwidth (floor (- ringlargest (* ringdelta (1- nrings)
                                        2))
                      3))
;; put extra in base if it comes out closer to pegwidth.
(if (> pegwidth ringheight)
    (setq baseheight (min pegwidth (+ ringheight
                                      (- imageheight
                                         (* (+ nrings 4)
                                            ringheight)))))
    (setq baseheight ringheight))
(setq movementheight (+ (setq pegtop (+ hanoi-margin baseheight
                                        (* ringheight
                                           (1+ nrings))))
                        vertspeed))

(when font
      (setf (font bm-dm) font)
      (setf (font display-medium) font))

(setq pegs
      (do ((pleft (+ hanoi-margin (floor (- ringlargest pegwidth)
                                         2))
                  (+ pleft ringlargest))
           (i 1 (1+ i)))
          ((= i 4)
           (reverse pegs))
        (push (make-peg :region (make-rectangle
                                  :left pleft
                                  :bottom (+ baseheight hanoi-margin)
                                  :width pegwidth
                                  :height (* ringheight (1+ nrings))))
                       :rings ;; BASE RING
                       (list (make-ring
                               :region (make-rectangle
                                         :left hanoi-margin
                                         :bottom hanoi-margin
                                         :width basewidth
                                         :height baseheight)
                               :number 'base)))
              pegs)))
(setq sourcepeg (pegn 1))
(setq ring-labels (if (listp rings)
                      (reverse rings)
                      (make-sequence 'list rings :initial-element nil)))
(do ((ringbottom (+ hanoi-margin baseheight)
                 (+ ringbottom ringheight))
     (ringleft (+ hanoi-margin (* ringlargest (1- 1)))
               (+ ringleft ringdelta))
     (labels ring-labels (cdr labels))
     (i 0 (1+ i)))
    ((null labels))
  (push (make-ring :region (make-rectangle
                             :left ringleft
```

```
                                :bottom ringbottom
                                :width (- ringlargest
                                          (* i 2 ringdelta))
                                :height ringheight)
                          :number (- nrings i)
                          :label  (car labels))
                  (peg-rings sourcepeg)))

;; allocate bitmaps for ring movement
        (setq horizringbm (make-bitmap
                            :width  (+ ringlargest max-horiz-speed)
                            :height ringheight
                            :galaxy galaxy))
        (setq upringbm (make-bitmap
                         :width ringlargest
                         :height (+ ringheight max-vert-speed)
                         :galaxy galaxy))
        (setq downringbm (make-bitmap
                           :width ringlargest
                           :height (+ ringheight max-vert-speed)
                           :galaxy galaxy))
        (setq topupringbm (make-bitmap
                            :width ringlargest
                            :height (+ ringheight max-vert-speed)
                            :galaxy galaxy))
        (setq topdownringbm (make-bitmap
                              :width ringlargest
                              :height (+ ringheight max-vert-speed )
                              :galaxy galaxy))

(clear-media display-medium)
        (displaypegsandrings pegs display-medium)
        (do* ((here 1 there)
              (there 3 (findother here there)))
             (nil)
             (dohanoi nrings here there display-medium)
             (cond (once (return))))))

(defun dohanoi (n src dst display-medium)
  (if (eq n 1)
      (movering src dst display-medium)
    (progn
      (dohanoi (1- n) src (findother src dst)
               display-medium)
      (movering src dst display-medium)
      (dohanoi (1- n)
               (findother src dst)
               dst display-medium))))

(defun findother (s d)
  (do ((z 1 (1+ z)))
      ((= z 4) nil)
      (if (not (or (eq z s) (eq z d)))
          (return z))))

(defun movering (src dst display-medium)
  (prog ((x (ring-region (car (peg-rings (pegn dst))))) ring)
        (push (movedis (setq ring (pop (peg-rings (pegn src))))
                       (+ (bottom x)
                          (height x))
                       (track src (ring-region ring))
                       (track dst (ring-region ring))
                       display-medium)
              (peg-rings (pegn dst)))))

(defun movedis (ring dy sx dx display-medium)

;; moves RING from its position on the source peg whose left is SX to
  ;; the peg whose left is DX at a height of DY (declare (special vertspeed horizspeed pegtop upringbm ringheight
                    topupringbm horizringbm ring-region topdownringbm
                    downringbm))

(let* ((ring-region (ring-region ring))
```

```
        (ringwidth (width ring-region))
        horizwidth moverightflg)

;; Set up bitmaps with right size ring
   (setupringbitmaps ring ringwidth (setq moverightflg (> dx sx)))

;; Ring travels up
   (do ((i (bottom ring-region) (+ i vertspeed)))
       ((>= i (- pegtop vertspeed))
        (copy-rectangle display-medium sx i
                        upringbm
                        0 (- i (- pegtop vertspeed))
                        ringwidth (+ ringheight vertspeed)))
     (copy-rectangle display-medium sx i
                     upringbm 0 0 ringwidth (+ ringheight vertspeed)))

(copy-rectangle display-medium sx pegtop
                   topupringbm 0 0 ringwidth (+ ringheight vertspeed))

;; Ring Across
   (do ((i (if moverightflg sx
               (- sx horizspeed))
           (funcall (if moverightflg #'+ #'-)
                    i horizspeed)))
       ((if moverightflg
            (>= i (1- (- dx horizspeed)))
            (<= i (1+ dx))))
     (copy-rectangle display-medium i (+ pegtop vertspeed)
                     horizringbm 0 0 (+ ringwidth horizspeed) ringheight))

(copy-rectangle display-medium (if moverightflg (- dx horizspeed) dx)
                   (+ pegtop vertspeed)
                   horizringbm 0 0 (+ ringwidth horizspeed) ringheight)

;; Down to the Peg
   (do ((i pegtop (- i vertspeed)))
       ((<= i (- pegtop ringheight 1)))
     (copy-rectangle display-medium dx i
                     topdownringbm 0 0 ringwidth (+ ringheight vertspeed)))

(copy-rectangle display-medium dx (- pegtop ringheight)
                   topdownringbm 0 0 ringwidth (+ ringheight vertspeed))

;; Down the Peg
   (do ((i (- pegtop (+ vertspeed ringheight))
           (- i vertspeed)))
       ((> dy i)
        ;; blt last ring image
        (copy-rectangle display-medium dx dy
                        downringbm
                        0 0 ringwidth (if (> vertspeed ringheight)
                                          (- (+ ringheight vertspeed)
                                             (- dy i))
                                          (+ ringheight vertspeed))))
     (copy-rectangle display-medium dx i
                     downringbm 0 0 ringwidth (+ ringheight vertspeed)))

;; Update the ring region
   (setf (left ring-region)   (+ (left ring-region) (- dx sx))
         (bottom ring-region) dy)

ring))

(defun displaypegsandrings (pegs display-medium)

;; displays the pegs and the rings on them.
  (dolist (peg pegs)
          (setf (shade display-medium) peg-shade)
          (fill-region display-medium (peg-region peg))
          (dolist (ring (peg-rings peg))
                  (setf (shade display-medium) (ring-shade (ring-number ring)))
                  (fill-region display-medium (ring-region ring))
```

```
            (when (ring-label ring)
                (print-string-justified
                    display-medium (ring-label ring)
                    (ring-region ring) :center :center)))))

(defun track (pn region)
  ;; returns the track offset for ring movement on a peg.
  (declare (special ringlargest))
  (+ hanoi-margin (+ (* ringlargest (1- pn))
                     (floor (- ringlargest (width region))
                            2))))
;;;
;;; BITMAP Routines
;;;

(defmacro fill-it (shade left bottom width height)
  '(progn (setf (shade bm-dm) ,shade)
          (fill-rectangle bm-dm ,left ,bottom ,width ,height)))

(defun setupringbitmaps (ring ringwidth moverightflg)

;; sets up the ring bitmaps.  There are 5 ring bitmaps: up while on
  ;; peg, up above peg, horizontal, down above peg and down while on peg.

(let* ((pegoffset (floor (- ringwidth pegwidth) 2))
         (ring-region (ring-region ring))
         (ringn (ring-number ring)))

(declare (special bm-dm ringheight pegwidth vertspeed horizspeed
                      upringbm topupringbm downringbm
                      topdownringbm horizringbm ))

;; UpRingBM
    (setf (target bm-dm) upringbm)
    (clear-media bm-dm)
    (fill-it (ring-shade ringn) 0 vertspeed ringwidth ringheight)
    (if (ring-label ring)
        (print-in-center (ring-label ring) 0 vertspeed ringwidth ringheight))
    (fill-it peg-shade pegoffset 0 pegwidth vertspeed)

;; TopUpRingBM
    (setf (target bm-dm) topupringbm)
    (clear-media bm-dm)
    (fill-it (ring-shade ringn) 0 vertspeed ringwidth ringheight)
    (if (ring-label ring)
        (print-in-center (ring-label ring) 0 vertspeed ringwidth ringheight))

;; DownRingBM
    (setf (target bm-dm) downringbm)
    (clear-media bm-dm)
    (fill-it (ring-shade ringn) 0 0 ringwidth ringheight)
    (if (ring-label ring)
        (print-in-center (ring-label ring) 0 0 ringwidth ringheight))
    (fill-it peg-shade pegoffset ringheight pegwidth vertspeed)

;; TopDownRingBM
    (setf (target bm-dm) topdownringbm)
    (clear-media bm-dm)
    (fill-it (ring-shade ringn) 0 0 ringwidth ringheight)
    (if (ring-label ring)
        (print-in-center (ring-label ring)  0 0 ringwidth ringheight))

;; HorizRingBM
    (setf (target bm-dm) horizringbm)
    (clear-media bm-dm)

(fill-it (ring-shade ringn)
             (if moverightflg horizspeed 0) 0 ringwidth ringheight)
    (if (ring-label ring)
        (print-in-center (ring-label ring)
                         (if moverightflg horizspeed 0) 0
                         ringwidth ringheight))))
```

What is claimed:

1. A system comprising:
   a display;
   a user input device for providing input signals from a user;
   memory for storing data; the memory storing a plurality of display system data units; and
   a processor connected for receiving the input signals from the user, for accessing the display system data units, and for providing output signals to the display;
   the display system data units comprising:
     workspace data units, each being for use in presenting a respective workspace on the display, each respective workspace including, when presented, respective display features that are perceptible as having respective relative positions; the workspace data units including a first workspace data unit for use in presenting a first one of the respective workspaces on the display; and
     a first functional data unit that includes first function data for use in performing a first characteristic function in relation to the first workspace;
   the processor comprising:
     first function means for using the first function data in performing the first characteristic function in relation to the first workspace;
     second function means for using second function data in performing a second characteristic function in relation to the first workspace, the second characteristic function being different than the first characteristic function; the first and second characteristic functions being alternative functions, the first and second characteristic functions both being:
       input functions according to which input signals are received from the user while the first workspace is presented;
       output functions according to which output signals are provided to the display while the first workspace is presented; or
       relationship functions according to which the first workspace is related to another of the respective workspaces when both workspaces are presented; and
     replacing means for replacing the first functional data unit by a second functional data unit without structurally modifying other display system data units stored in the memory, the second functional data unit including the second function data so that before the replacing means replaces the first functional data unit the first function means uses the first function data to perform the first characteristic function in relation to the first workspace and so that after the replacing means replaces the first functional data unit the second function means uses the second function data to perform the second characteristic function in relation to the first workspace.

2. The system of claim 1 in which the memory further stores a hierarchy of node data units, the node data units including the workspace data units.

3. The system of claim 1 in which the first workspace data unit includes, before the replacing means replaces the first functional data unit, a pointer to the first functional data unit and includes, after the replacing means replaces the first functional data unit, a pointer to the second functional data unit.

4. The system of claim 1 in which the display system data units further include an auxiliary data unit, the first workspace data unit including a pointer to the auxiliary data unit; the auxiliary data unit including, before the replacing means replaces the first functional data unit, a pointer to the first functional data unit and including, after the replacing means replaces the first functional data unit, a pointer to the second functional data unit.

5. The system of claim 1 in which the first and second characteristic functions are alternative input functions according to which input signals are received from the user while the first workspace is presented.

6. The system of claim 1 in which the first and second characteristic functions are alternative output functions according to which output signals are provided to the display while the first workspace is presented.

7. The system of claim 1 in which the first and second characteristic functions are alternative relationship functions according to which the first workspace is related to another of the respective workspaces when both workspaces are presented.

8. A system comprising:
   a display;
   a user input device for providing input signals from a user;
   memory for storing data; the memory storing a plurality of display system data units; and
   a processor connected for receiving the input signals from the user, for accessing the display system data units, and for providing output signals to the display;
   the display system data units comprising:
     workspace data units, each being for use in presenting a respective workspace on the display, each respective workspace including, when presented, respective display features that are perceptible as having respective relative positions; the workspace data units including a first workspace data unit for use in presenting a first one of the respective workspaces on the display; and
     a first functional data unit that includes first function data for use in performing a first characteristic function in relation to the first workspace;
   the processor being for:
     using the first function data in performing the first characteristic function in relation to the first workspace;
     using second function data in performing a second characteristic function in relation to the first workspace, the second characteristic function being different than the first characteristic function; the first and second characteristic functions being alternative functions, the first and second characteristic functions both being:
       input functions according to which input signals are received from the user while the first workspace is presented;
       output functions according to which output signals are provided to the display while the first workspace is presented; or
       relationship functions according to which the first workspace is related to another of the respective workspaces when both workspaces are presented; and replacing the first functional data unit by a second functional data unit without structurally modifying other dispaly system data units stored in the memory;

the second functional data unit including the second function data so that before the processor replaces the first functional data unit the processor uses the first function data to perform the first characteristic function in relation to the first workspace and so that after the processor replaces the first functional data unit the processor uses the second function data to perform the second characteristic function in relation to the first workspace.

* * * * *